(12) United States Patent
Hong

(10) Patent No.: US 10,921,952 B2
(45) Date of Patent: Feb. 16, 2021

(54) DYNAMIC BUTTON WITH VISUAL INDICATION OF APPLICATION ACTION RESULT

(71) Applicant: SAP SE, Walldorf (DE)

(72) Inventor: Richard Hong, San Jose, CA (US)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 15/348,227

(22) Filed: Nov. 10, 2016

(65) Prior Publication Data
US 2017/0329465 A1 Nov. 16, 2017

Related U.S. Application Data

(60) Provisional application No. 62/334,651, filed on May 11, 2016.

(51) Int. Cl.
*G06F 3/0481* (2013.01)
*G06F 3/0482* (2013.01)
*G06F 3/0488* (2013.01)
*G06T 13/00* (2011.01)

(52) U.S. Cl.
CPC ........ *G06F 3/04817* (2013.01); *G06F 3/0482* (2013.01); *G06F 3/04883* (2013.01); *G06F 3/04886* (2013.01); *G06T 13/00* (2013.01)

(58) Field of Classification Search
CPC ............... G06F 3/04817; G06F 3/0482; G06F 3/04883; G06T 13/00
See application file for complete search history.

(56) References Cited

U.S. PATENT DOCUMENTS

| 5,909,678 A | 6/1999 | Bergman et al. |
| D425,497 S | 5/2000 | Eisenberg et al. |
| D446,790 S | 8/2001 | Wang |
| D454,574 S | 3/2002 | Wasko et al. |
| D521,521 S | 5/2006 | Jewitt et al. |
| 7,954,064 B2 * | 5/2011 | Forstall .................. G06F 9/451 715/779 |
| D641,372 S | 7/2011 | Gardner et al. |
| D644,662 S | 9/2011 | Gardner et al. |
| D669,497 S | 10/2012 | Lee et al. |
| D671,136 S | 11/2012 | Barnett et al. |

(Continued)

OTHER PUBLICATIONS

IT World Canada, Adobe acquires Canadian makers of PhoneGap, Nitobi, https://www.itworldcanada.com/article/adobe-acquires-canadian-makers-of-phonegap-nitobi/44606 (Oct. 11, 2011) (Year: 2011).*

(Continued)

*Primary Examiner* — Justin R. Blaufeld
(74) *Attorney, Agent, or Firm* — Schwegman Lundberg & Woessner, P.A.

(57) ABSTRACT

In an example embodiment, a dynamic button as a dynamic button user interface element is rendered in a graphical user interface, the dynamic button corresponding to an application action when selected by a user via the graphical user interface. Then, in response to detection of selection of the dynamic button by the user via the graphical user interface, the application action is caused to be executed, producing an application action result, and a visual indication of the application action result is displayed inside the dynamic button user interface element.

20 Claims, 63 Drawing Sheets

(56) References Cited

U.S. PATENT DOCUMENTS

| | | |
|---|---|---|
| D726,214 S | 4/2015 | Wantland et al. |
| D737,310 S | 8/2015 | Ma |
| D739,872 S | 9/2015 | Bang et al. |
| D740,834 S | 10/2015 | Song |
| D740,835 S | 10/2015 | Song |
| D749,626 S | 2/2016 | Park et al. |
| D750,098 S | 2/2016 | Song |
| D750,125 S | 2/2016 | Yang et al. |
| D753,676 S | 4/2016 | Oh et al. |
| D754,728 S | 4/2016 | Akana et al. |
| D758,394 S | 6/2016 | Weber |
| D758,420 S | 6/2016 | Zhou |
| D759,677 S | 6/2016 | Oguntebi |
| 9,369,333 B1 | 6/2016 | Chiu et al. |
| D762,226 S | 7/2016 | Yang et al. |
| D764,520 S | 8/2016 | Lee et al. |
| D766,252 S | 9/2016 | Miyazaki et al. |
| D768,185 S | 10/2016 | Lee et al. |
| D771,060 S | 11/2016 | Miyazaki et al. |
| D773,502 S | 12/2016 | Park et al. |
| D773,531 S | 12/2016 | Toth et al. |
| D776,124 S | 1/2017 | Lee et al. |
| D780,769 S | 3/2017 | Mensinger et al. |
| D782,503 S | 3/2017 | Lee et al. |
| D783,657 S | 4/2017 | Pitman et al. |
| D784,366 S | 4/2017 | Lee et al. |
| D789,976 S | 6/2017 | Gibson et al. |
| D797,793 S | 9/2017 | Nichols et al. |
| D798,334 S | 9/2017 | Dye et al. |
| 9,798,450 B1 | 10/2017 | Urasaki et al. |
| D802,607 S | 11/2017 | Apodaca et al. |
| D806,093 S | 12/2017 | Lee et al. |
| D807,907 S | 1/2018 | Dellinger et al. |
| D809,006 S | 1/2018 | Mehta et al. |
| D813,900 S | 3/2018 | Karunamuni |
| D814,504 S | 4/2018 | Lee et al. |
| D819,043 S | 5/2018 | Yamaura et al. |
| D820,307 S | 6/2018 | Jian et al. |
| D835,669 S | 12/2018 | Hong |
| D835,670 S | 12/2018 | Hong |
| D835,671 S | 12/2018 | Hong |
| D836,134 S | 12/2018 | Hong |
| 2007/0130205 A1* | 6/2007 | Dengler ............... G06F 9/451 |
| 2009/0319921 A1* | 12/2009 | Abel ............... G06F 40/174 715/760 |
| 2011/0119637 A1 | 5/2011 | Tuli et al. |
| 2012/0019861 A1* | 1/2012 | Okada ............... G06K 15/4075 358/1.15 |
| 2012/0096383 A1 | 4/2012 | Sakamoto et al. |
| 2013/0235044 A1* | 9/2013 | Kaleta ............... G06F 3/0481 345/473 |
| 2014/0019889 A1* | 1/2014 | Klinger ............... G06F 8/38 715/762 |
| 2014/0137010 A1* | 5/2014 | Matas ............... G06T 13/80 715/764 |
| 2014/0192229 A1 | 7/2014 | Kim et al. |
| 2014/0192232 A1 | 7/2014 | Park et al. |
| 2014/0223411 A1* | 8/2014 | Slone ............... G06F 8/34 717/105 |
| 2014/0253301 A1* | 9/2014 | Hirayama ............... G08C 23/04 340/12.54 |
| 2015/0205511 A1* | 7/2015 | Vinna ............... G06F 3/0481 715/716 |
| 2015/0277750 A1* | 10/2015 | Sakaguchi ......... H04N 1/00411 345/173 |
| 2015/0312180 A1* | 10/2015 | Taler ............... G06F 3/04895 715/752 |
| 2015/0370444 A1 | 12/2015 | Jitkoff et al. |
| 2016/0110085 A1 | 4/2016 | Barton et al. |
| 2016/0188171 A1* | 6/2016 | Dye ............... G06F 3/04817 715/810 |
| 2017/0024121 A1* | 1/2017 | Park ............... G06F 3/04812 |
| 2017/0329464 A1 | 11/2017 | Hong |

OTHER PUBLICATIONS

"U.S. Appl. No. 15/348,166, Examiner Interview Summary dated Jan. 22, 2019", 3 pgs.

"U.S. Appl. No. 15/348,166, Examiner Interview Summary dated Apr. 4, 2019", 3 pgs.

"U.S. Appl. No. 15/348,166, Examiner Interview Summary dated Jul. 31, 2018", 3 pgs.

"U.S. Appl. No. 15/348,166, Final Office Action dated Jun. 13, 2019", 17 pgs.

"U.S. Appl. No. 15/348,166, Final Office Action dated Nov. 16, 2018", 13 pgs.

"U.S. Appl. No. 15/348,166, Non Final Office Action dated Feb. 7, 2019", 12 pgs.

"U.S. Appl. No. 15/348,166, Non Final Office Action dated May 17, 2018", 12 pgs.

"U.S. Appl. No. 15/348,166, Reponse filed Jan. 16, 2019 to Final Office Action dated Nov. 16, 2018", 14 pgs.

"U.S. Appl. No. 15/348,166, Response filed May 2, 2019 to Non Final Office Action dated Feb. 7, 2019", 12 pgs.

"U.S. Appl. No. 15/348,166, Response Filed Aug. 7, 2018 toNon Final Office Action dated May 17, 2018", 12 pgs.

"U.S. Appl. No. 29/578,621, Notice of Allowance dated Jul. 25, 2018", 8 pgs.

"U.S. Appl. No. 29/578,625, Notice of Allowance dated Jul. 25, 2018", 8 pgs.

"U.S. Appl. No. 29/578,626, Notice of Allowance dated Jul. 25, 2018", 12 pgs.

"U.S. Appl. No. 29/578,628, Notice of Allowance dated Jul. 25, 2018", 12 pgs.

"How to create a circular progress button pags 1-4", Mary Lou "Lou", [Online] Retrieved from the internet: <https://tympanus.net/codrops/2014/04/09/how-to-create-a-circular-progress-button/>, (Apr. 9, 2014), 17 pgs.

Martinius, Tamino, "Submit Button", Dribble Dribble, [Online] Retrieved from the internet: <https://dribbble.com/shots/1673204-Submit-Button>, (Aug. 6, 2014), 5 pgs.

* cited by examiner

FIG. 2G (Rotated screenshot showing Edit Product interface)

- PRODUCTS (124)
- SEARCH
- 10' PORTABLE DVD PLAYER — 449.99 USD
- 7' WIDESCR... PORTABLE D... — 249.99 USD
- ASTRO LAPTOP 1516 — 989.00 USD
- ASTRO PHONE 6 — 649.99 USD
- BENDA LAPTOP 1408 — 976.00 USD
- BENDING SCREEN 21 — 250.00 USD
- BJPIAT CSHEN TV VIDEO — 1,080.00 USD

EDIT PRODUCT
*SUPPLIER: TESSILE CASE DI ROMA

TECHNICAL DATA
*BASE UNIT: EACH
LENGTH: 18.00 CENTIMETER
WIDTH: 30.000 CENTIMETER
HEIGHT: 3.000 CENTIMETER
WEIGHT: 4.2 KILOGRAM

ATTACHMENTS (4)

206A — DELETE | CANCEL — 214B
214A

- SEP 7, 2015 1:000:27 PM PAUL MILLER
- SEP 7, 2015 1:000:27 PM PAUL MILLER
- SEP 7, 2015 1:000:27 PM PAUL MILLER
- SEP 7, 2015 1:000:27 PM PAUL MILLER

SAVE  CANCEL

EDIT PRODUCT >

← PRODUCTS (124)

SEARCH

- 10' PORTABLE DVD PLAYER — 449.99 USD
- 7' WIDESCR... PORTABLE D... — 249.99 USD
- ASTRO LAPTOP 1516 — 989.00 USD
- ASTRO PHONE 6 — 649.99 USD
- BENDA LAPTOP 1408 — 976.00 USD
- BENDING SCREEN 21 — 250.00 USD
- BJPIAT CSHEN TV VIDEO — 1,080.00 USD

*SUPPLIER: TESSILE CASE DI ROMA

TECHNICAL DATA

- *BASE UNIT: EACH
- LENGTH: 18.00 CENTIMETER
- WIDTH: 30.000 CENTIMETER
- HEIGHT: 3.000 CENTIMETER
- WEIGHT: 4.2 KILOGRAM

204A

ATTACHMENTS (4)   206A   +

- SEP 7, 2015 1:000:27 PM PAUL MILLER   DELETE | CANCEL
- SEP 7, 2015 1:000:27 PM PAUL MILLER   ✎ ⊗
- SEP 7, 2015 1:000:27 PM PAUL MILLER   ✎ ⊗
- SEP 7, 2015 1:000:27 PM PAUL MILLER   ✎ ⊗

SAVE   CANCEL

EDIT PRODUCT

**\*SUPPLIER:** TESSILE CASE DI ROMA

TECHNICAL DATA

| | | |
|---|---|---|
| **\*BASE UNIT:** | EACH | |
| LENGTH: | 18.00 | CENTIMETER |
| WIDTH: | 30.000 | CENTIMETER |
| HEIGHT: | 3.000 | CENTIMETER |
| WEIGHT: | 4.2 | KILOGRAM |

206B

ATTACHMENTS (4)

- SEP 7, 2015 1:000:27 PM PAUL MILLER
- SEP 7, 2015 1:000:27 PM PAUL MILLER
- SEP 7, 2015 1:000:27 PM PAUL MILLER

SAVE  CANCEL

---

PRODUCTS (124)

SEARCH

| | | |
|---|---|---|
| 10' PORTABLE DVD PLAYER | 449.99 | USD |
| 7' WIDESCR... PORTABLE D... | 249.99 | USD |
| ASTRO LAPTOP 1516 | 989.00 | USD |
| ASTRO PHONE 6 | 649.99 | USD |
| BENDA LAPTOP 1408 | 976.00 | USD |
| BENDING SCREEN 21 | 250.00 | USD |
| BJPIAT CSHEN TV VIDEO | 1,080.00 | USD |

*FIG. 2L*

| | SHOP ⌄ | | ⌕ ⌂ |
|---|---|---|---|
| ⌕ SEARCH | *FREE SHOPPING ON ORDERS OVER 1000 USD | | WISHLIST 13 |

HIDE CATEGORIES   MENS > TROUSERS & SHORTS > SLIM-FIT (7)

HIGHLIGHTS                                                                          ⇅  ▦  ✱

WOMAN
MENS

| | | 402A | | 406 | | 404A |
|---|---|---|---|---|---|---|
| IMAGE | NAME | AVERAGE RATING | PRICE | | | |
| 👖 | SLIM-FIT STRETCH CHINO 402B | ★★☆☆☆ | 115.99 USD | IN STOCK | ADD TO CART | 404B |
| 👖 | SLIM-FIT STRETCH CORDUROY PANTS 402C | ★★★★☆ | 125.99 USD | OUT OF STOCK | ADD TO CART | 404C |
| 👖 | SLIM-FIT WOOL TROUSERS 402D | ★★★★☆ | 249.99 USD | IN STOCK | ADD TO CART | 404D |
| 👖 | SLIM-FIT POPLIN PANTS 402E | ★★★★☆ | 125.99 USD | IN STOCK | ADD TO CART | 404E |
| 👖 | SLIM-FIT CHINO 402F | ★★★★★ | 110.99 USD | IN STOCK | ADD TO CART | 404F |
| 👖 | SLIM-FIT CORDUROY 402G | ★★★★☆ | 125.99 USD | IN STOCK | ADD TO CART | 404G |
| 👖 | SLIM-FIT STRETCH CHINO | ★★★★☆ | 125.99 USD | IN STOCK | ADD TO CART | |

SHIRTS
JUMPERS
JACKETS & OUTERWEAR
BLAZERS, SUITES & FOR...
HOODIES & SWEATSHIRTS
T-SHIRTS
TROUSERS & SHORTS
  CHINOS & CARGOS
  FORMAL
  SLIM-FIT
  STRAIGHT FIT
  CLASSIC FIT
  TRACKSUIT BOTTOMS
  SHORTS
  JEANS
UNDERWEAR
BIG & TALL

| IMAGE | NAME | AVERAGE RATING | PRICE | | |
|---|---|---|---|---|---|
| | SLIM-FIT STRETCH CHINO — 402B | ☆☆☆☆ | 115.99 USD | IN STOCK | ✓ ADDED — 404A |
| | SLIM-FIT STRETCH CORDUROY PANTS — 402C | ☆☆☆☆ | 125.99 USD | OUT OF STOCK | ADD TO CART — 404B / 404C |
| | SLIM-FIT WOOL TROUSERS — 402D | ☆☆☆☆ | 249.99 USD | IN STOCK | ADD TO CART — 404D |
| | SLIM-FIT POPLIN PANTS — 402E | ☆☆☆☆ | 125.99 USD | IN STOCK | ADD TO CART — 404E |
| | SLIM-FIT CHINO — 402F | ☆☆☆☆ | 110.99 USD | IN STOCK | ADD TO CART — 404F |
| | SLIM-FIT CORDUROY — 402G | ☆☆☆☆ | 125.99 USD | IN STOCK | ADD TO CART — 404G |
| | SLIM-FIT STRETCH CHINO | ☆☆☆☆ | 125.99 USD | IN STOCK | ADD TO CART |

400

SHOP ∨    WISHLIST 13

*FREE SHOPPING ON ORDERS OVER 1000 USD

HIDE CATEGORIES    MENS > TROUSERS & SHORTS > SLIM-FIT (7)

HIGHLIGHTS

- WOMAN
- MENS
  - SHIRTS
  - JUMPERS
  - JACKETS & OUTERWEAR
  - BLAZERS, SUITES & FOR...
  - HOODIES & SWEATSHIRTS
  - T-SHIRTS
  - TROUSERS & SHORTS
    - CHINOS & CARGOS
    - FORMAL
    - SLIM-FIT
      - STRAIGHT FIT
      - CLASSIC FIT
  - TRACKSUIT BOTTOMS
  - SHORTS
  - JEANS
  - UNDERWEAR
  - BIG & TALL

FIG. 4E

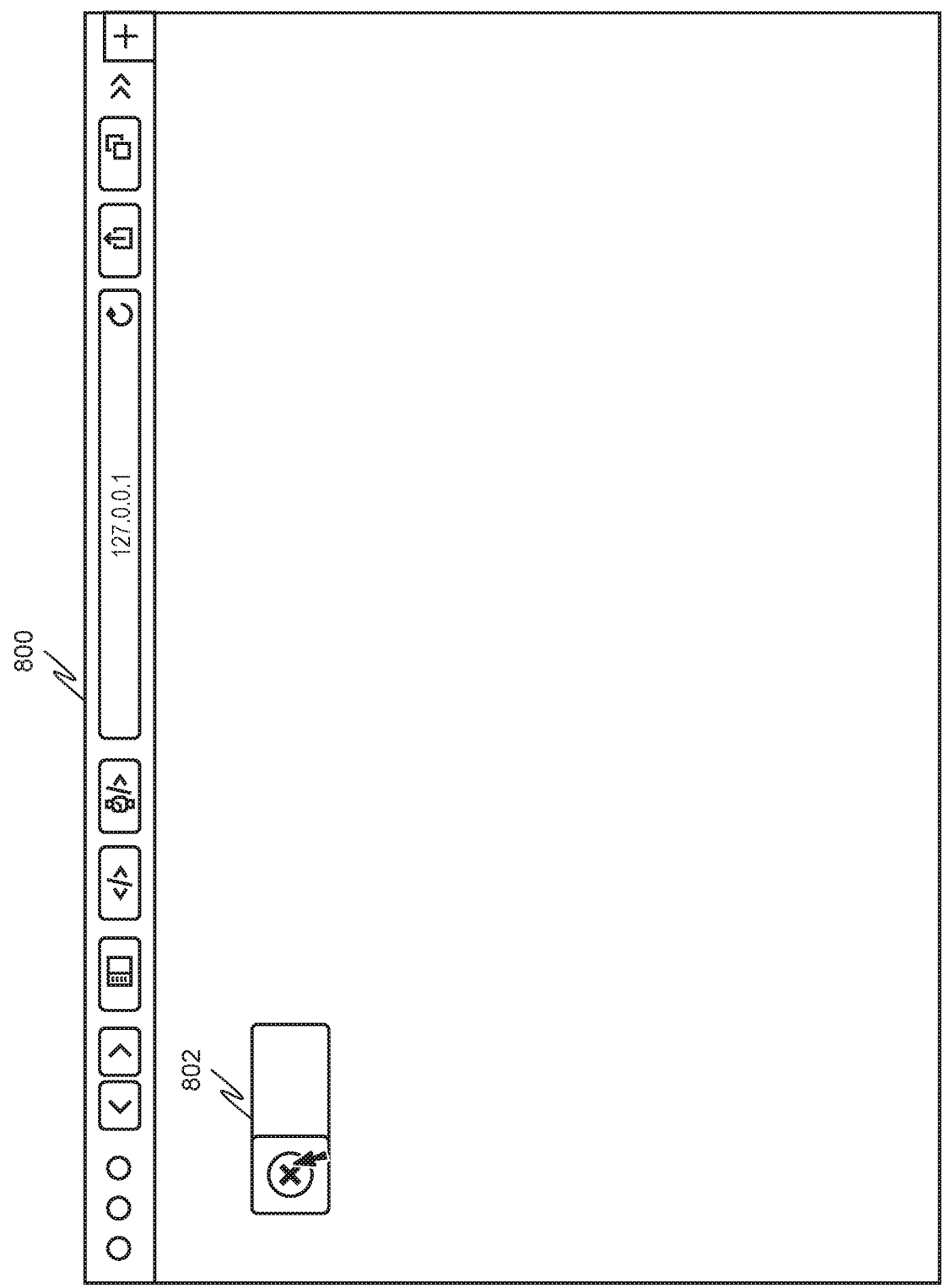

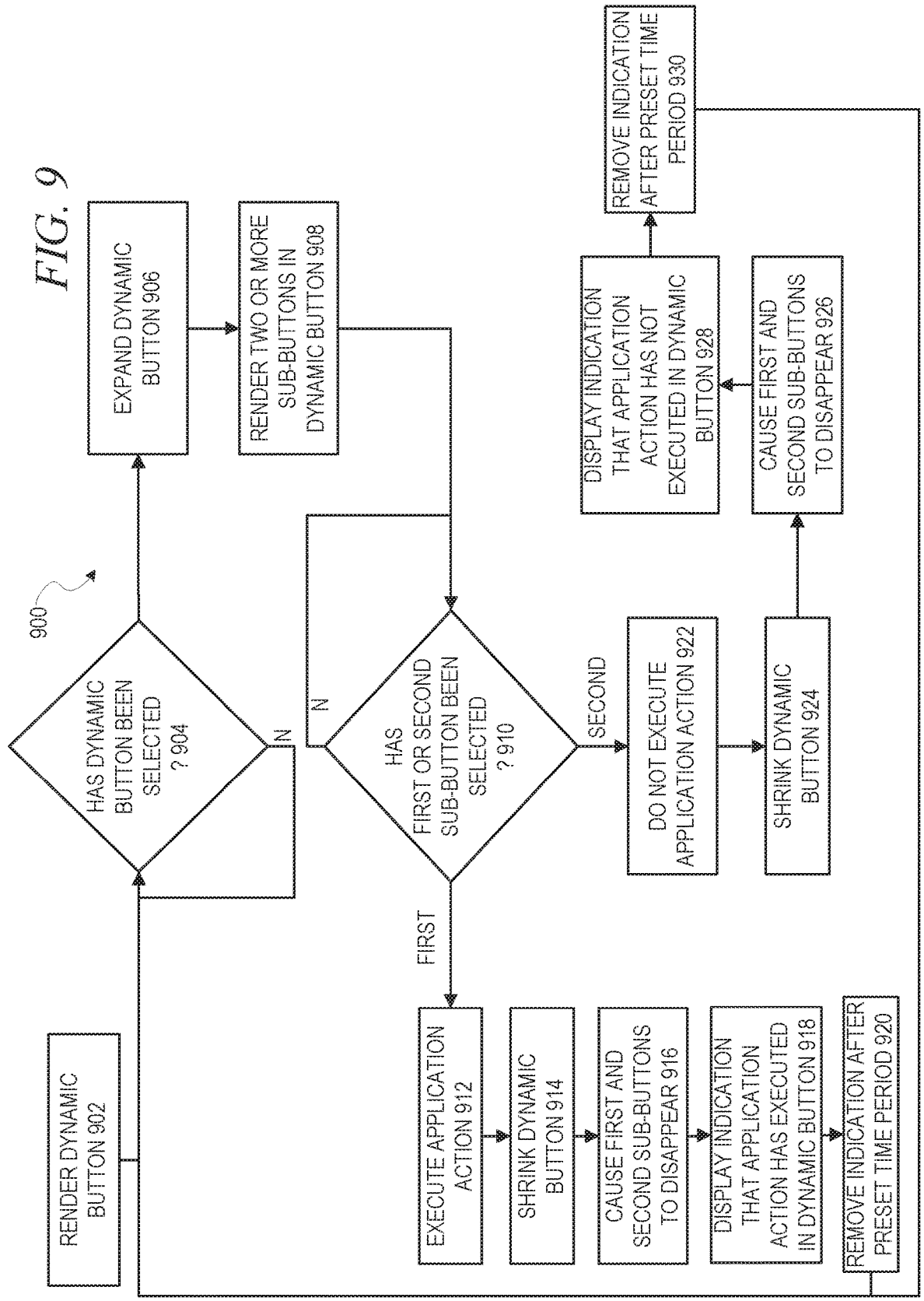

STEP 1 - BOOTSTRAPPING UI5:                                      1300

```
<!DOCTYPE HTML>
<HTML>
<HEAD>
    <TITLE>DYNAMIC BUTTON IN UI5</TITLE>
    <SCRIPT ID="SAP-UI-BOOTSTRAP"
        SRC="RESOURCES/SAP-UI-CORE.JS"
        DATA-SAP-UI-THEME="SAP_BLUECRYSTAL"
        DATA-SAP-UI-LIBS="SAP.M"
        DATA-SAP-UI-PRELOAD="ASYNC">
    </SCRIPT>
    <SCRIPT>
        SAP.UI.GETCORE().ATTACHINIT(FUNCTION () {
            JQUERY("#CONTENT").HTML("UI5 IS READY");
        });
    </SCRIPT>
</HEAD>
<BODY CLASS="SAPUIBODY">
    <DIV ID="CONTENT"></DIV>
</BODY>
</HTML>
```

STEP 2 - USING OPENUI5 CONTROLS:                                 1302

```
<!DOCTYPE HTML>
<HTML>
<HEAD>
    <TITLE>DYNAMIC BUTTON IN UI5</TITLE>
    <SCRIPT ID="SAP-UI-BOOTSTRAP"
        SRC="RESOURCES/SAP-UI-CORE.JS"
        DATA-SAP-UI-THEME="SAP_BLUECRYSTAL"
        DATA-SAP-UI-LIBS="SAP.M">
    </SCRIPT>
    <SCRIPT>
        SAP.UI.GETCORE().ATTACHINIT(FUNCTION () {
            NEW SAP.M.DYNAMICBUTTON ({
                DYNBUTTON.TEXT:"ACTION"
            }).PLACEAT("CONTENT");
        });
    </SCRIPT>
</HEAD>
<BODY CLASS="SAPUIBODY">
    <DIV ID="CONTENT"></DIV>
</BODY>
</HTML>
```

*FIG. 13A*

STEP 3 - XML VIEWS: 1304

```
<MVC:VIEW
    XMLNS="SAP.M"
    XMLNS:MVC="SAP.UI.CORE.MVC">
    <DYNBUTTON TEXT="ACTION"/>
</MVC:VIEW>
<!DOCTYPE HTML>
<HTML>
<HEAD>
<TITLE>DYNAMIC BUTTON IN UI5</TITLE>
<SCRIPT ID="SAP-UI-BOOTSTRAP"
    SRC="RESOURCES/SAP-UI-CORE.JS"
    DATA-SAP-UI-THEME="SAP_BLUECRYSTAL"
    DATA-SAP-UI-LIBS="SAP.M"
    DATA-SAP-UI-RESOURCEROOTS='{
        "SAP.UI.DEMO.WT":"."
    }'
    DATA-SAP-UI-PRELOAD="ASYNC">
</SCRIPT>
<SCRIPT>
    SAP.UI.GETCORE().ATTACHINIT(FUNCTION () {
        NEW SAP.UI.XML.VIEW({
            VIEWNAME:"SAP.UI.DEMO.WT.APP"
        }).PLACEAT("CONTENT");
    });
</SCRIPT>
</HEAD>
<BODY CLASS="SAPUIBODY">
<DIV ID="CONTENT"></DIV>
</BODY>
</HTML>
```

STEP 4 - CONTROLLERS: 1306

```
<MVC:VIEW
    CONTROLLERNAME="SAP.UI.DEMO.WT.APP"
    XMLNS="SAP.M"
    XMLNS:MVC="SAP.UI.CORE.MVC">
    <BUTTON
        TEXT="ACTION"
        PRESS="ONSHOWANIMATION"/>
</MVC:VIEW>

SAP.UI.DEFINE([
    "SAP/UI/CORE/MVC/CONTROLLER"
], FUNCTION (CONTROLLER) {
    "USE STRICT";

RETURN CONTROLLER.EXTEND("SAP.UI.DEMO.WT.APP", {
        ONSHOWANIMATION: FUNCTION () {
            //DYNAMIC BUTTON INSTANCE ANIMATES FOR 500 MS
            DYNBUTTON.ANIMATE(500);
        }
    });
});
```

*FIG. 13B*

STEP 5 - DATA BINDING:

1308

```
SAP.UI.DEFINE([
    "SAP/UI/CORE/MVC/CONTROLLER",
    "SAP/UI/MODEL/JSON/JSONMODEL"
], FUNCTION (CONTROLLER, JSONMODEL) {
    "USE STRICT";

RETURN CONTROLLER.EXTEND("SAP.UI.DEMO.WT.APP", {
        ONINIT: FUNCTION () {
            // SET DATA MODEL ON VIEW
            VAR ODATA = {
                RECIPIENT: {
                    NAME: "DYNAMIC BUTTON DEMO"
                }
            };
            VAR OMODEL = NEW JSONMODEL(ODATA);
            THIS.GETVIEW().SETMODEL(OMODEL);
        },

ONSHOWANIMATION: FUNCTION () {
            // SHOW A NATIVE JAVASCRIPT ALERT
            ALERT("DYNAMIC BUTTON IS READY!");
        }
    });
});
```

```html
<!DOCTYPE HTML>
<HTML>
<HEAD>
<TITLE>DYNAMIC BUTTON IN UI5</TITLE>
<SCRIPT ID="SAP-UI-BOOTSTRAP"
    SRC="RESOURCES/SAP-UI-CORE.JS"
    DATA-SAP-UI-THEME="SAP_BLUECRYSTAL"
    DATA-SAP-UI-LIBS="SAP.M"
    DATA-SAP-UI-BINDINGSYNTAX="COMPLEX"
    DATA-SAP-UI-RESOURCEROOTS='{
        "SAP.UI.DEMO.WT" : "./"
    }'
    DATA-SAP-UI-PRELOAD="ASYNC">
</SCRIPT>
<SCRIPT>
    SAP.UI.GETCORE().ATTACHINIT(FUNCTION() {
        NEW SAP.UI.XMLVIEW({
            VIEWNAME: "SAP.UI.DEMO.WT.APP"
        }).PLACEAT("CONTENT");
    });
</SCRIPT>
</HEAD>
<BODY CLASS="SAPUIBODY">
<DIV ID="CONTENT"></DIV>
</BODY>
</HTML>
```

```
1602
SAP.UI.COMMONS.BUTTON.EXTEND("DYNAMICBUTTON", [ // CALL THE NEW CONTROL TYPE "DYNAMICBUTTON"
                                                // AND LET IT INHERIT FROM SAP.UI.COMMONS.BUTTON
  METADATA:{
    PROPERTIES:{                  // SETTER AND GETTER ARE CREATED BEHIND THE SCENES,
                                  // INCL. DATA BINDING AND TYPE VALIDATION
      "SCALEX" : "STRING",        // INCL. DATA BINDING AND TYPE VALIDATION
      "SCALEY" : "STRING",        // IN SIMPLE CASES, JUST DEFINE THE TYPE
      "OPACITY" : {TYPE:"SAP.UI.CORE.CSSOPACITY",DEFAULTVALUE:"1"}
                                  // YOU CAL ALSO GIVE A DEFAULT VALUE AND MORE
    },
    EVENTS:{
      "CLICK" : {} // THIS BUTTON HAS ALSO A "CLICK" EVENT, IN ADDITION TO "PRESS" OF THE NORMAL BUTTON
    },
  },
  // THE HOVER EVENT HANDLER:
  ONMOUSEOVER : FUNCTION(EVT) // IS CALLED WHEN THE BUTTON IS HOVERED - NO EVENT REGISTRATION REQUIRED
    THIS.FIREHOVER();
  },
  RENDERER: {} // ADD NOTHING, JUST INHERIT THE BUTTONRENDERER AS IS;
               // IN THIS CASE (SINCE THE RENDERER IS NOT CHANGED) YOU COULD ALSO SPECIFY THIS EXPLICITLY WITH: RE
NDERER:"SAP.UI.COMMONS.BUTTONRENDERER"
               // (MEANS YOU REUSE THE BUTTONRENDERER INSTEAD OF CREATING A NEW VIEW
});

VAR MYCONTROL - NEW DYNAMICBUTTOIN ("MYBTH", {
  TEXT: "CLICK ME",
  CLICK:FUNCTION(EVT [ ]
    ALERT("BUTTON" - EVT.GETSOURCE().GETID() - "WAS CLICKED.");
  }
});
MYCONTROL.PLACEAT("CONFRONT");
```

DYNAMIC BUTTON WITH VISUAL INDICATION OF APPLICATION ACTION RESULT

CROSS-REFERENCE TO RELATED APPLICATION

This application is a Non-Provisional of and claims the benefit of priority under 35 U.S.C, § 119(e) from U.S. Provisional Application Ser. No. 62/314,651, entitled "DYNAMIC BUTTON," filed on May 11, 2016 which is hereby incorporated by reference herein in its entirety.

TECHNICAL FIELD

This document generally relates to methods and systems for use with graphical user interfaces on computing devices. More particularly, this document relates to a dynamic button with a visual indication of an application action result.

BACKGROUND

Graphical user interfaces (GUIs) are interfaces that allow users to interact with computing devices through graphical icons and visual indicators displayed on a computing display. User interactions may be performed via various user input devices, such as keyboards, mice, or even the computing display itself in the case of touchscreen displays, but the depictions of the elements the user interacts with are graphical in nature.

One commonly used graphical element in GUIs is a virtual button, or simply a button (although as distinguished from a physical button on the computing device itself). Buttons are often provided by software/operating system designers to allow users to perform simple tasks or actions. For example, a button labeled "delete" may be provided which allows the user to delete some object or file that is currently selected or is simply in view.

Oftentimes there are follow-up elements displayed in the graphical user interface upon selection of certain important buttons. For example, in the case where the button is a "delete" button, selection of this button by the user does not automatically cause deletion of the selected element or file, lest the user accidentally erases valuable data due to selecting the button inadvertently or without knowledge of what it would do. Typically a confirmation dialog is opened, which explains the potential results of the user's action (e.g., "this will delete file XYZ") and prompts the user for a confirmatory action before completing the selected process ("Select YES if you wish to proceed"). One or more buttons for the confirmatory action (and typically a denial action) also appears in the confirmation dialog, allowing the user to select to proceed or to cancel the operation.

The confirmation dialog typically is presented as a pop-up window that appears over the previous screen in which the user selected the initial button (e.g., DELETE). To the extent the pop-up window does not cover an area of the previous screen, the previous screen appears as faded in the background. Because of this, the user is separated from the contextual information associated with the content on which the action is being triggered. This can be a problem, as the user is then asked to confirm the action without being able to refer to the contextual information that led to the selection of the button in the first place.

Additionally, opening a confirmation dialog is not always an option given available screen real estate and the computing device. In such cases, a completely new page is served to the user containing the confirmation dialog. In addition to making the lack of contextual information more pronounced, this has the added effect of slowing down the user interface flow by creating additional steps for the user. This is even more pronounced if the user needs to perform the operation many times a day, as most professional business users would. The workflow becomes tedious and inefficient.

Additionally, on large displays (or in systems where the user is operating multiple displays simultaneously), the confirmation dialog can often appear far away from where the initial button was selected, or even in a background window not visible on any display, resulting in the user missing the confirmation dialog, leading to confusion and misunderstandings about whether the operation was or was not performed.

BRIEF DESCRIPTION OF DRAWINGS

The present disclosure is illustrated by way of example and not limitation in the figures of the accompanying drawings, in which like reference numbers indicate similar elements and in which:

FIGS. 2A-2L are screen captures depicting different frames of a sequence of interacting with a dynamic button in accordance with a first example embodiment.

FIGS. 4A-4F are screen captures depicting different frames of a sequence of interacting with a dynamic button in accordance with a second example embodiment.

FIGS. 6A-6M are screen captures depicting different frames of a sequence of interacting with a dynamic button in accordance with a third example embodiment.

FIGS. 8A-8F are screen captures depicting different frames of a sequence of interacting with a dynamic button in accordance with a fourth example embodiment.

FIG. 9 is a flow diagram illustrating a method for providing a dynamic button in a user interface in accordance with the fourth example embodiment.

FIGS. 13A-13C are diagrams illustrating code for a dynamic button control applied in a web application in accordance with example embodiments.

Figure 14C:
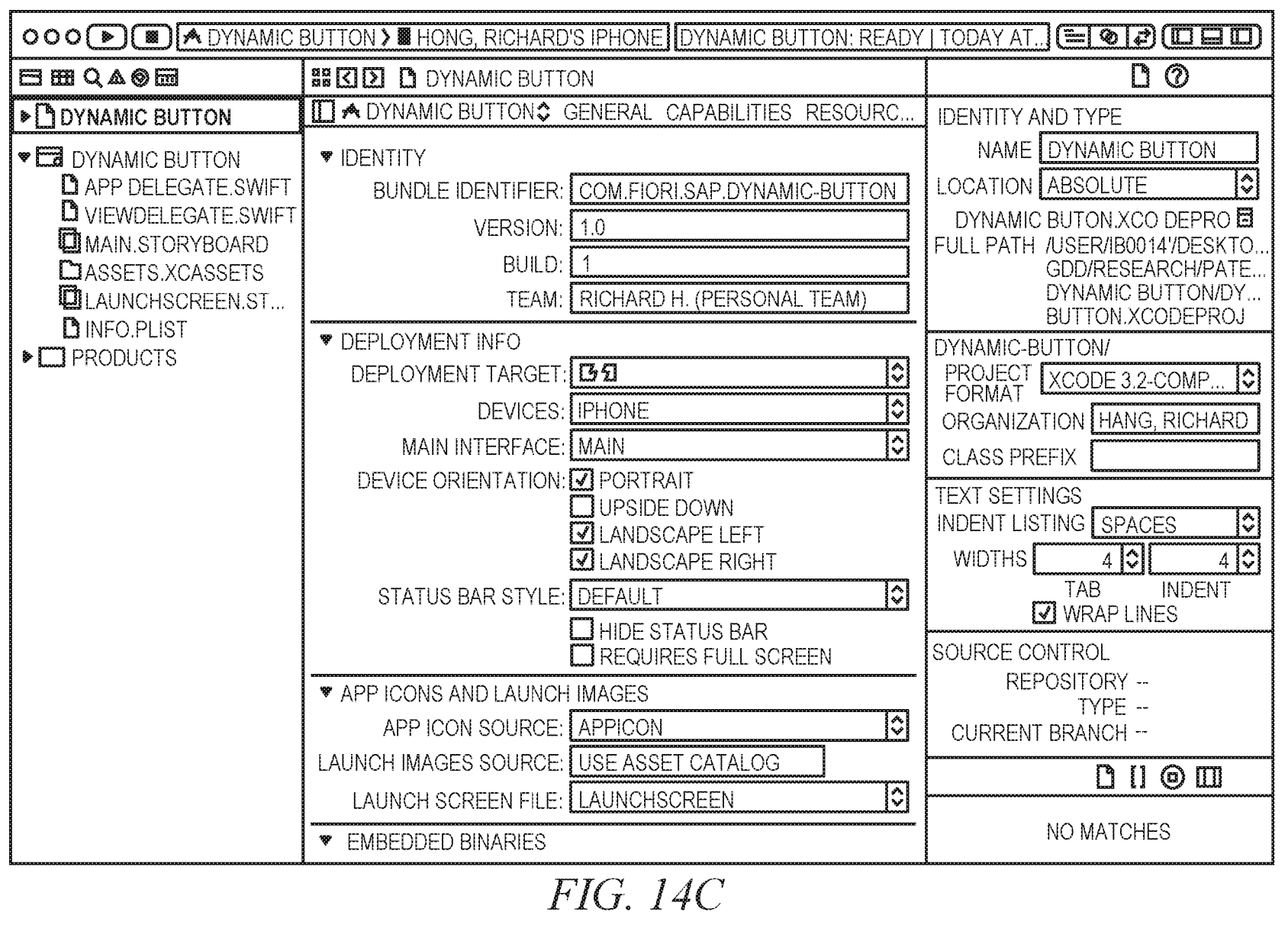
Figure 14E:
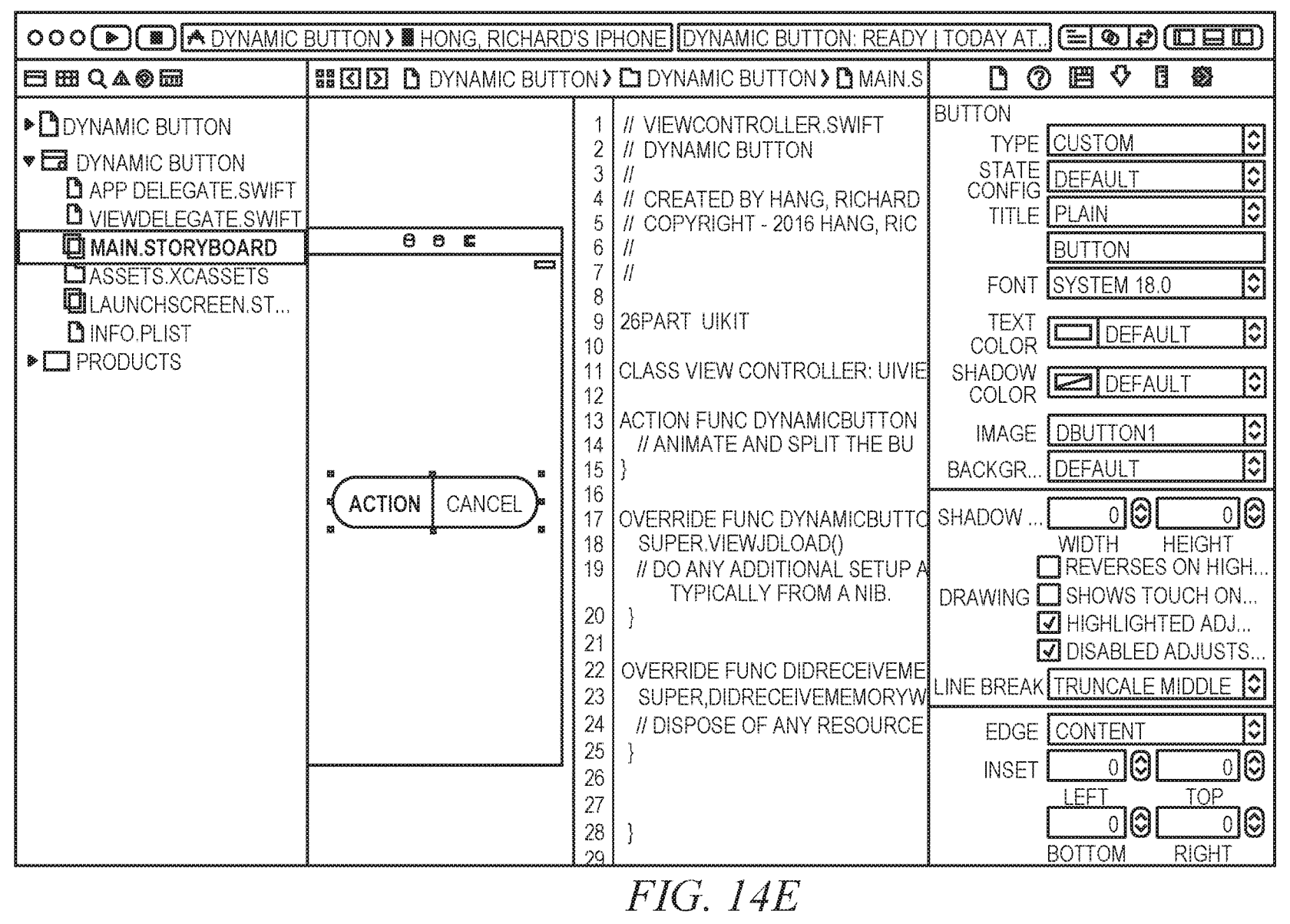

FIGS. 14A-14E are diagrams illustrating development of an iOS™ application (also known as an "app") with a dynamic button, in accordance with an example embodiment.

FIGS. 16A and 16B illustrate an example flow and code sample for such an embodiment.

FIGS. 17A-17D are screen captures illustrating deployment of a watch application containing the dynamic button, in accordance with an example embodiment.

FIG. 18 is a screen capture illustrating activation of multiple dynamic buttons simultaneously in accordance with an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a dynamic button is provided as a graphical user interface (GUI) element that combines action, data content, action confirmation, and action status in one in-place GUI element. This allows the dynamic button to address one or more issues which cannot be addressed by conventional buttons. It allows for use of the button for both input and output to bring data forward with natural streamlined interactions. This allows the dynamic button to dramatically simplify workflow and improve user experience.

Figure 1:
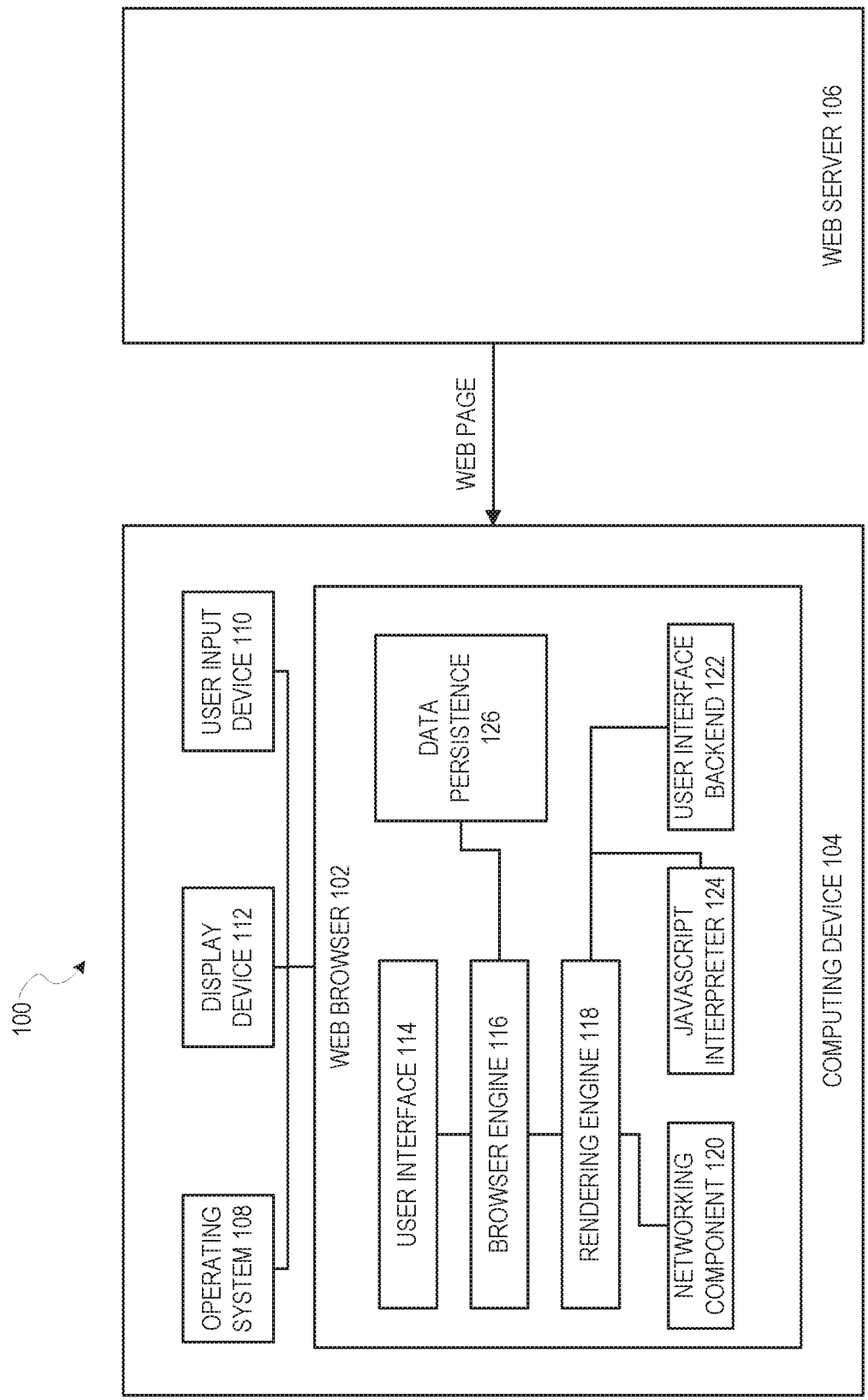
FIG. 1 is a block diagram illustrating a system including a web browser in accordance with an example embodiment.

FIG. 1 is a block diagram illustrating a system 100 including a web browser 102 in accordance with an example embodiment. The system 100 represents one example system that can be used to implement the dynamic button. Specifically, in this embodiment, the dynamic button is implemented as a Javascript or similar scripting language element, executed in a web browser 102 on a computing device 104. Other example systems on which the dynamic button may be implemented will be discussed in more detail later. For ease of discussion, many of the aspects of the dynamic button will be discussed in terms of this Javascript or similar scripting language implementation. Nevertheless, these aspects could also be implemented on the other example systems described later, and nothing in this disclosure should be interpreted as limiting these aspects to the Javascript or similar scripting language implementation.

The computing device 104 may be, for example, a desktop computer, laptop computer, tablet computer, smart phone, smart watch or any other computing device capable of displaying a graphical user interface via a scripting language and web browser combination. It should be noted, however, that in fact the further systems described later need not be limited to those computing devices capable of displaying a graphical user interface via a scripting language and web browser combination and can, in fact, extend to any computing devices capable of displaying a graphical user interface.

The system 100 includes computing device 104 as well as a web server 106. Web server 106 delivers a web page to the computing device 104 upon request. This request may either be explicit by the user of the computing device 104, such as navigating the web browser 102 to a specific web address, or may be implicit or automatic. The web page may, for example, be in the form of Hypertext Markup Language (HTML) code or other markup language code, which may incorporate various calls and/or scripts through languages such as Cascade Style Sheets (CSS) and Javascript.

An operating system 108 on the computing device 104 controls interactions between the web browser 102 and a user input device 110. In other words, the operating system 108 can detect when a user interacts with the web browser 102 via input to the user input device 110 and transmits such interactions to the web browser 102. Examples of user input devices 110 include mice, keyboards, touchpads, touchscreens, microphones, and any other device capable of receiving user input. The web browser 102 can output rendered GUI elements on a display device 112 of the computing device 104. In some example embodiments, the display device 112 and the user input device 110 are the same device, such as in the case of a touchscreen.

The web browser 102 contains its own user interface 114 (which may display, for example, an address bar, back/forward button, bookmaking menu, etc.). A browser engine 116 marshals actions between the user interface 114 and a rendering engine 118. The rendering engine 118 is responsible for rendering content (e.g., web pages). The rendering engine 118 may contain one or more specialized parsers (e.g., HTML parser, CSS parser) for this purpose.

A networking component 120 handles calls such as Hypertext Transfer Protocol (HTTP) to and from the web server 106, using different implementations based on the platform, typically behind a platform-independent interface. A user interface backend 122 handles drawing basic web page components such as buttons and windows. A Javascript interpreter 124 is used to parse and execute Javascript code found in a web page parsed by the rendering engine 118. Finally, a data persistence layer 126 allows the web browser 102 to save various types of data locally, such as cookies.

In an example embodiment, specialized Javascript code is provided to the Javascript interpreter 124, either via a downloaded web page or by directly modifying one or more Javascript libraries utilized by the Javascript interpreter 124, which causes modification of a button GUI in the user interface backend 122. This modification causes the corresponding button element to, when displayed, act in a dynamic manner in response to a user interface to modify visual aspects of the button. These modifications may include, or precede, depiction of a confirmation area within the dynamic button, in lieu of launching a separate confirmation dialog window. This allows the user to maintain understanding of the full context of the web page, web browser 102, or other visual elements on the computing device 104 when deciding whether to confirm the action initiated by selection of the button.

What follows are examples of dynamic buttons in accordance with various example embodiments.

It should be noted that as used throughout this disclosure, the term "button" should be construed to mean buttons in a graphical user interface, also known as virtual buttons.

Figure 2A:
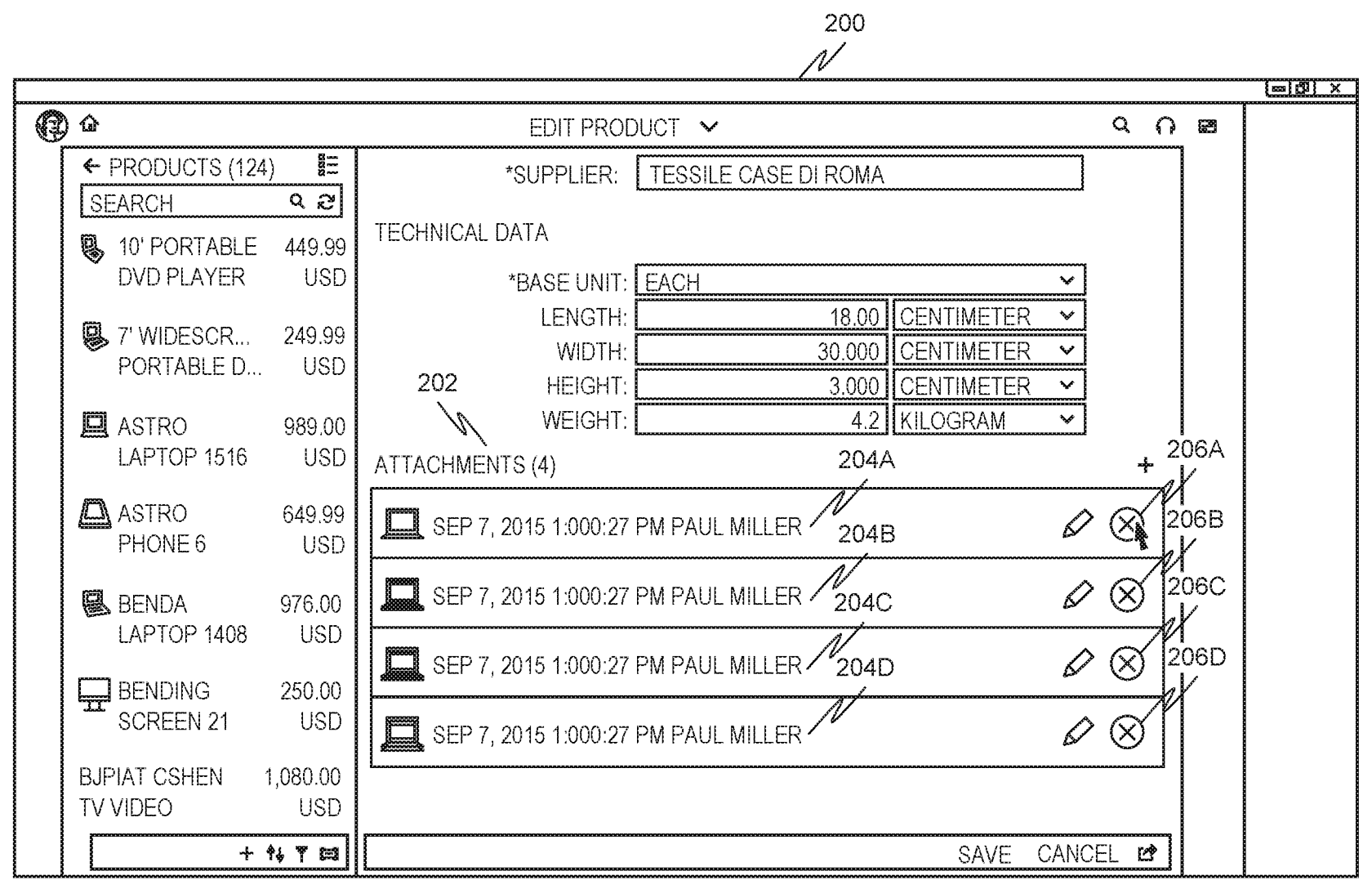

FIGS. 2A-2L are screen captures depicting different frames of a sequence of interacting with a dynamic button in accordance with a first example embodiment. Referring first to FIG. 2A, a browser window 200 includes an area 202 where four products 204A-204D have been attached. A dynamic button 206A-206D is provided for each of the four products 204A-204D. Here, the dynamic button 206A-206D is initially depicted as an "X" with a circle around it. This indicates to the user that selecting the dynamic button 206A-206D will cause removal or deletion of the corresponding product 204A-204D from the attachment list (e.g., area 202). Such an act of removal or deletion may require a confirmatory action on the part of the user to confirm that the indicated action should be taken. In prior art solutions, selection of such a button would launch a separate confirmation dialog that may cover up relevant contextual information, such as the attachment list in area 202 may be hidden, or may otherwise create problems for the user.

In an example embodiment, rather than a separate confirmation dialog, selection of the dynamic button 206A-206D causes a sequence of operations, including operations causing the selected dynamic button 206A-206D to morph into a different shape that provides the opportunity for the user to execute the confirmation action from within the dynamic button 206A-206D itself. Additionally, transition animations may be used to convey to the user that selection of the button has occurred as well as to indicate that the button is not being removed but is actually just changing into a different shape.

When the user selects dynamic button 206A, as will be depicted in subsequent figures, first a ripple effect may be depicted around dynamic button 206A to indicate that selection has occurred. This selection may have occurred, for example, by the user depressing a mouse button while the cursor hovered over dynamic button 206A.

Figure 2B:
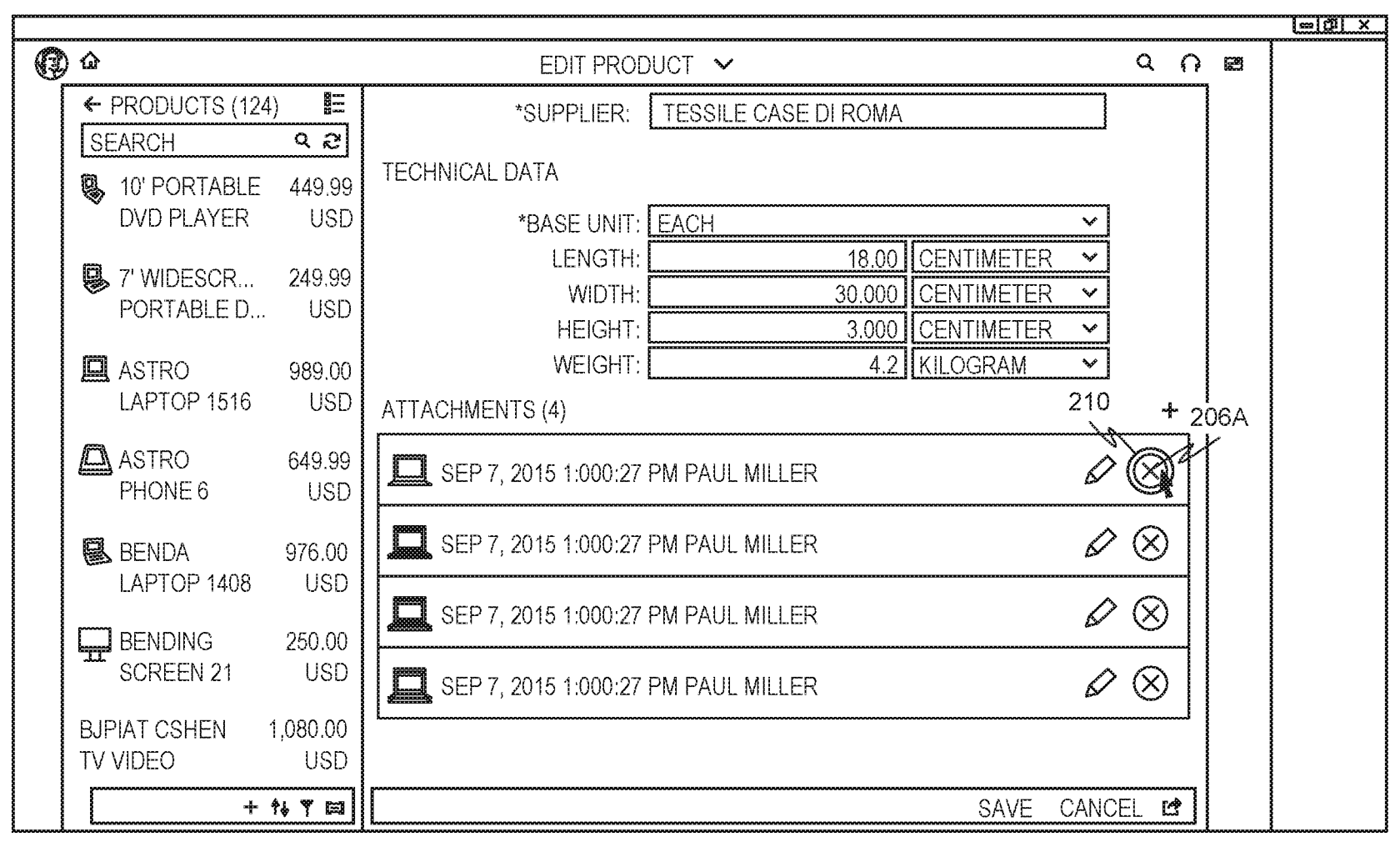
Figure 2C:
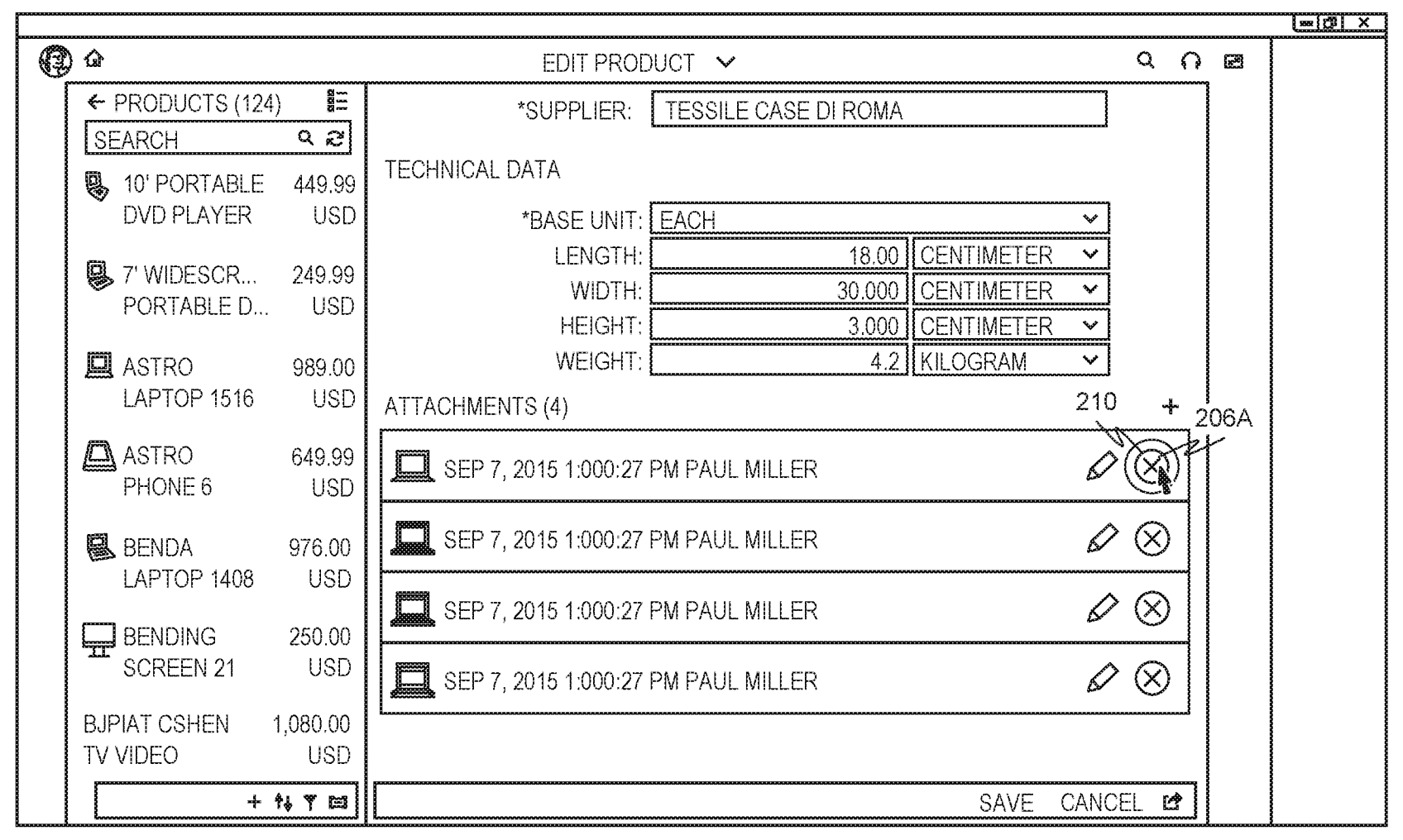

Referring to FIG. 2B, the selection of the dynamic button 206A is further indicated by the depiction of a "ripple" effect around the button 206A. FIG. 2B depicts an early frame in the ripple effect sequence. As can be seen, a concentric circle 210 is depicted around dynamic button 206A. FIG. 2C depicts how the concentric circle 210 expands further outwards from the dynamic button 206A and begins to fade, like a ripple in a pond caused when someone throws a rock.

Figure 2D:
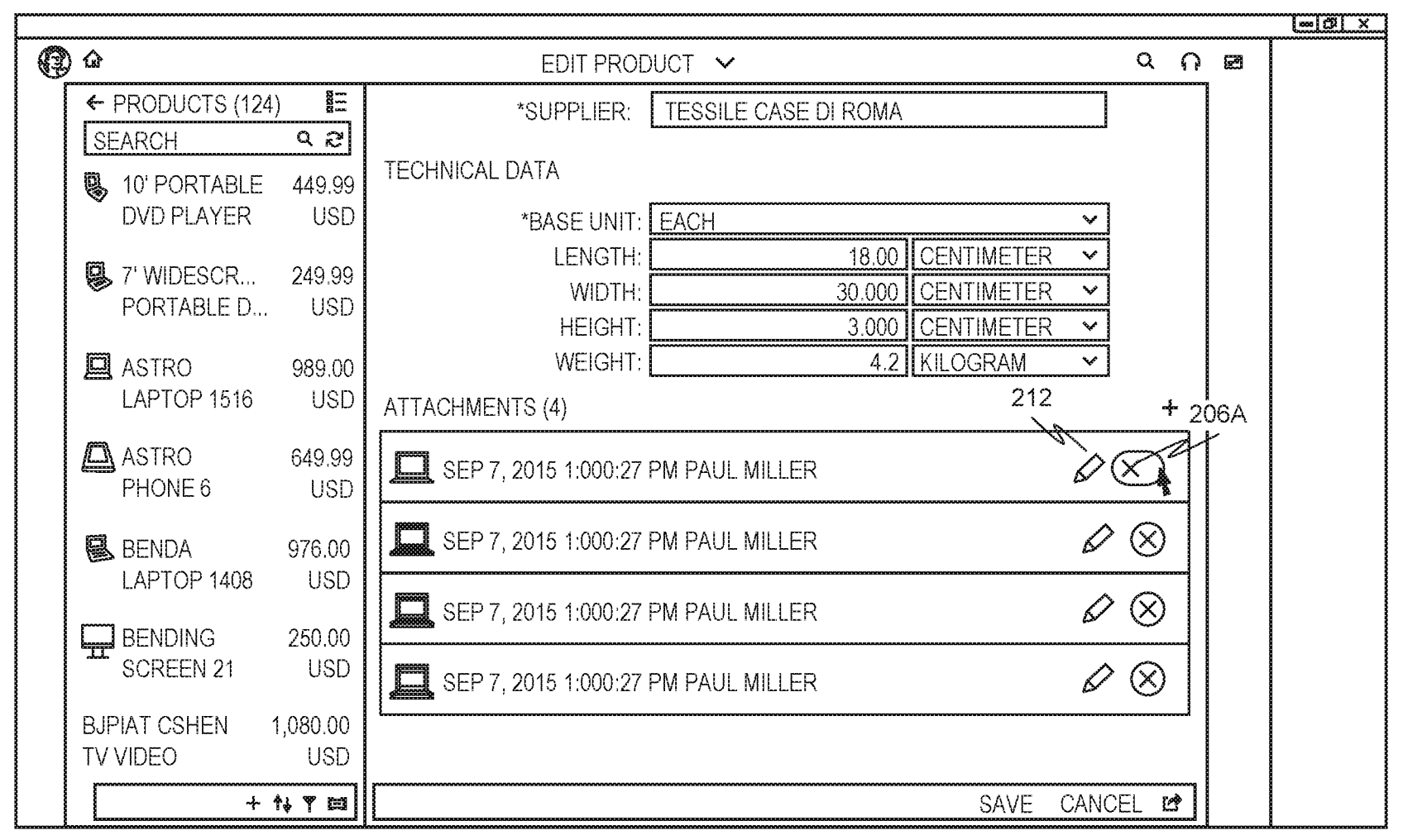
Figure 2E:
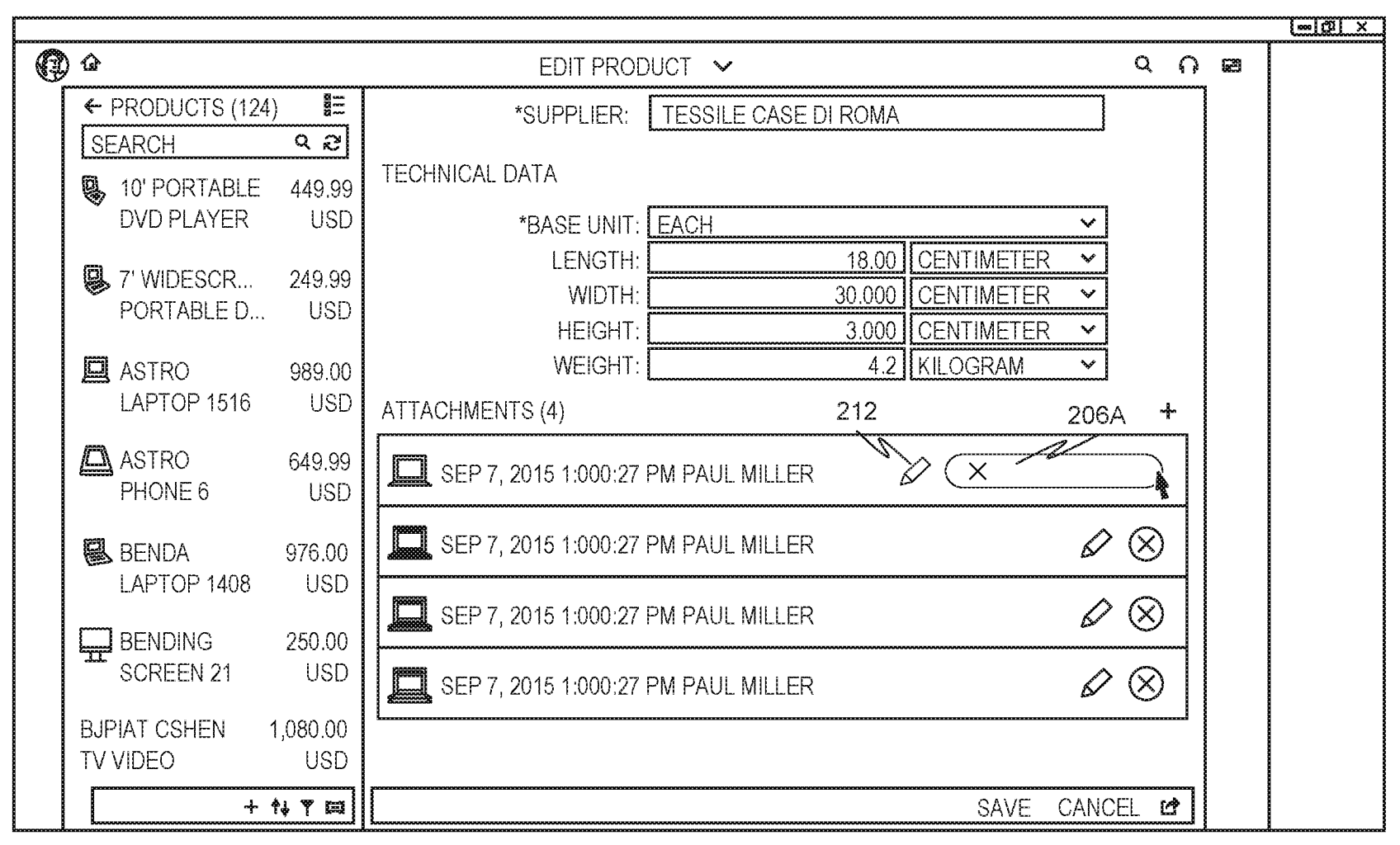

Referring now to FIG. 2D, the dynamic button 206A then begins to expand, pushing neighboring button 212 towards the left as the dynamic button 206A enlarges to the left. In FIG. 2E, the dynamic button 206A continues to grow, and the "X" in the dynamic button 206A begins to fade. Also fading is the neighboring button 212.

Figure 2F:
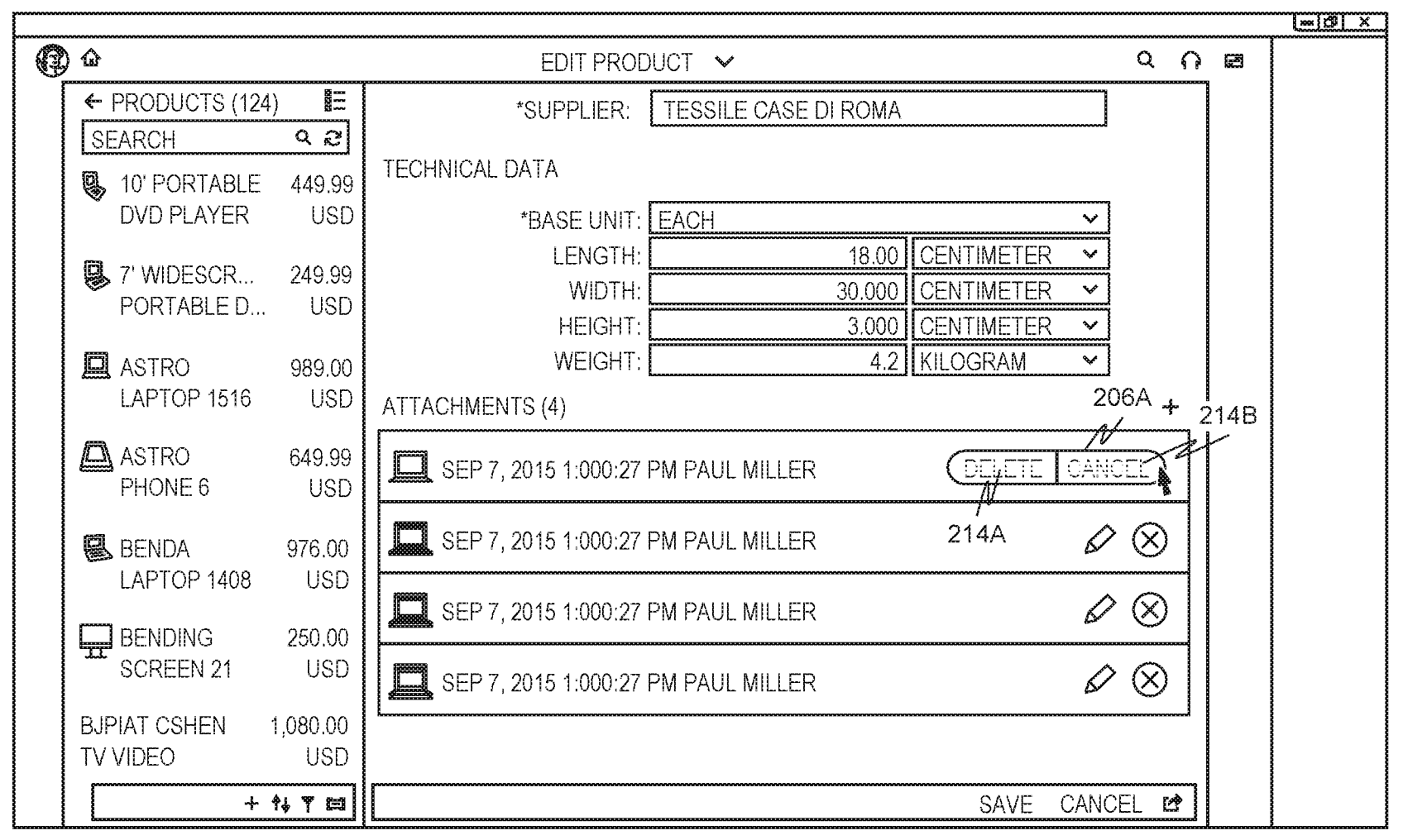
Figure 2H:
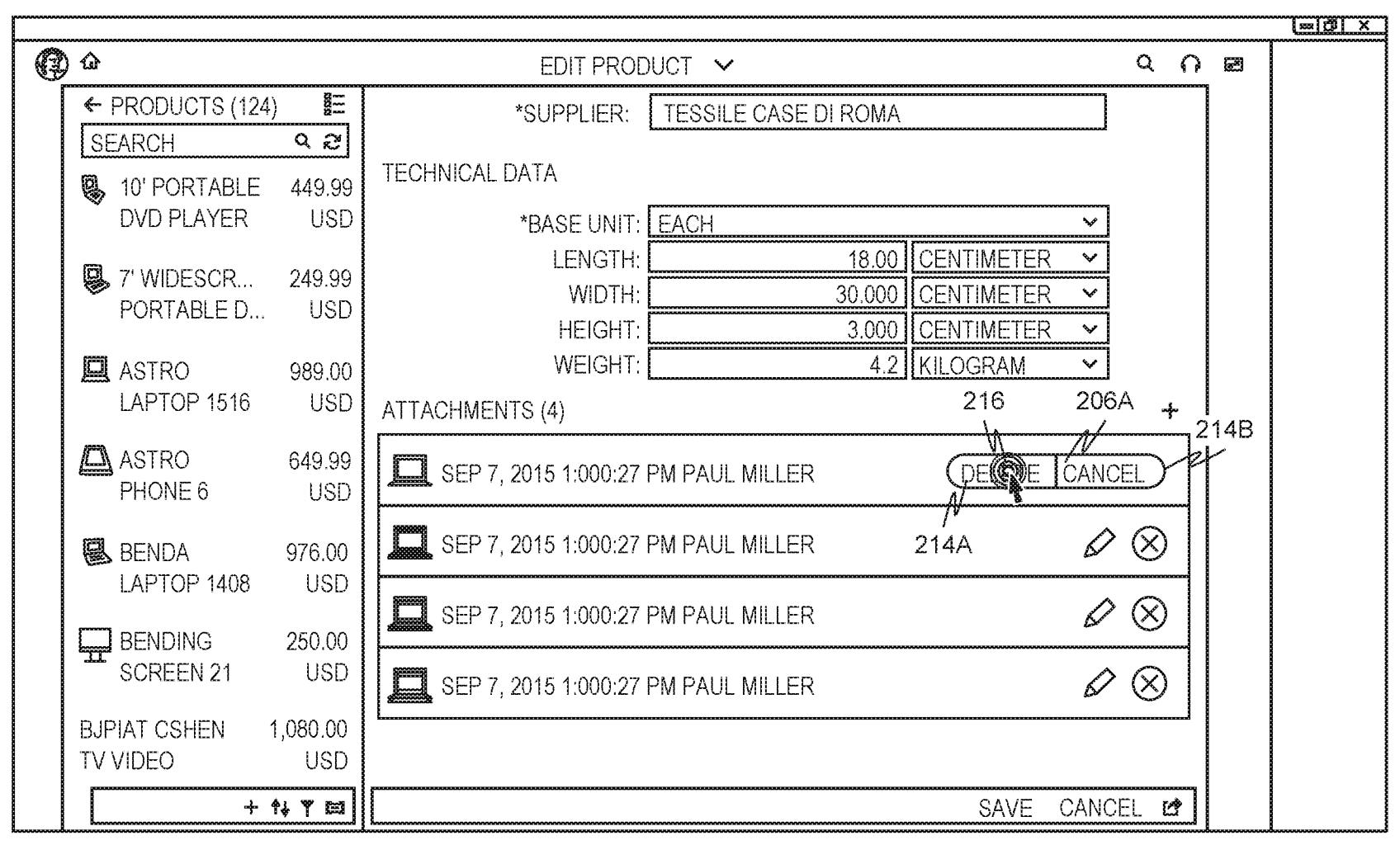

Referring to FIG. 2F, two sub-buttons 214A, 214B containing text have started to fade-in inside the dynamic button 206A. In FIG. 2G, the sub-buttons 214A, 214B have completely faded in, revealing the text "Delete" and "Cancel", respectively, indicating the functions of the sub-buttons 214A, 214B. Notably, the sub-buttons 214A, 214B have both formed within the area of the dynamic button 206A. In the underlying user interface, the sub-buttons 214A, 214B are both part of the UI element dedicated to the dynamic button 206A, and thus are not independent UI elements from the dynamic button 206A, such as would be the case if sub-buttons 214A, 214B had replaced dynamic button 206A or been overlaid on top of dynamic button 206A.

Referring now to FIG. 214, the user has now selected sub-button 214A, indicating a desire to confirm the deletion of the selected product 204A from the attachments list. This also causes a ripple effect 216 to begin, similar to the ripple effect described earlier. This ripple effect 216 continues while beginning to fade.

Referring now to FIG. 21, once the ripple effect 216 has completely faded, the dynamic button 206A as well as the whole row containing product 204A begins to shrink in the vertical direction, until disappearing completely.

Figure 2J:
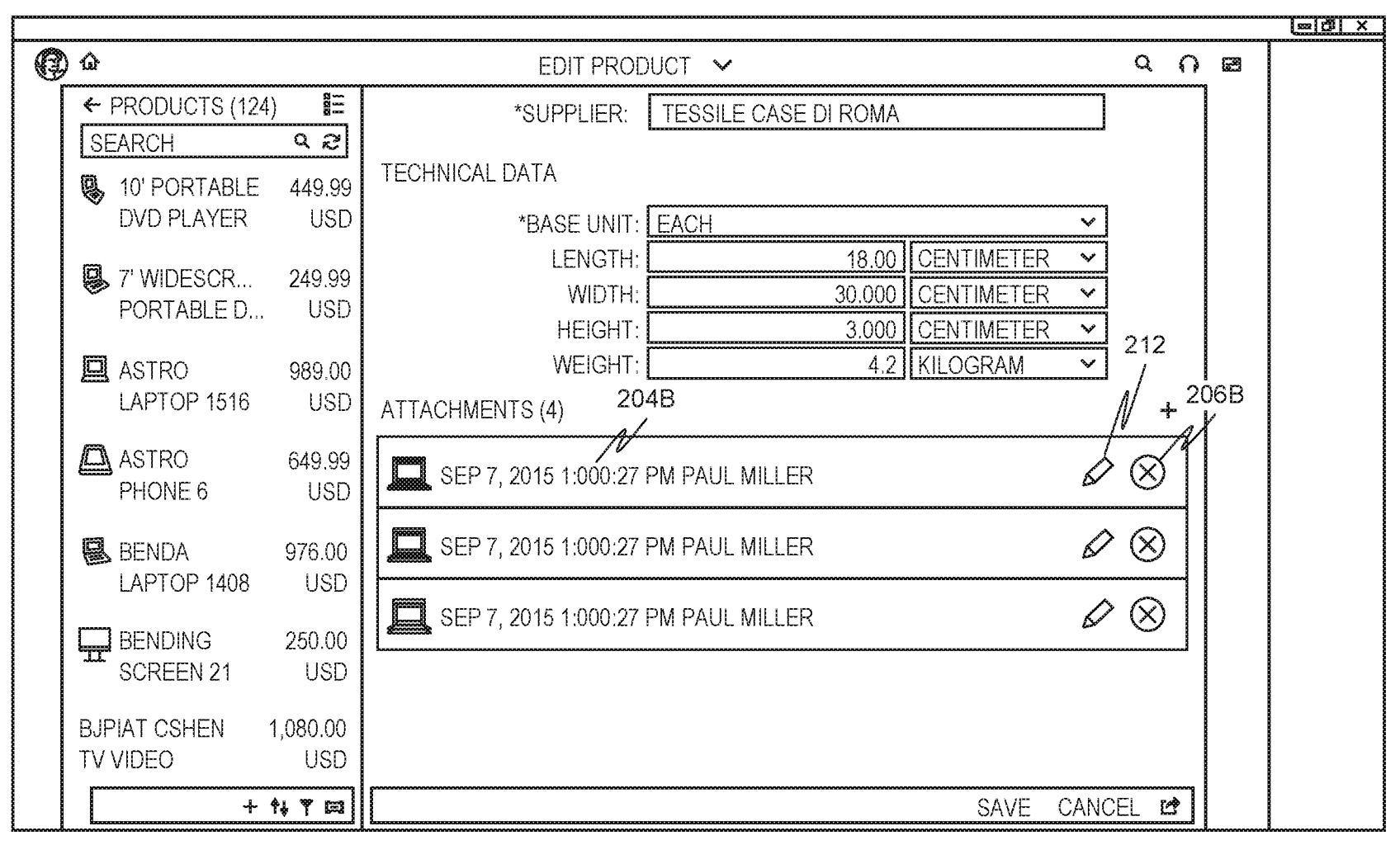
Figure 2K:
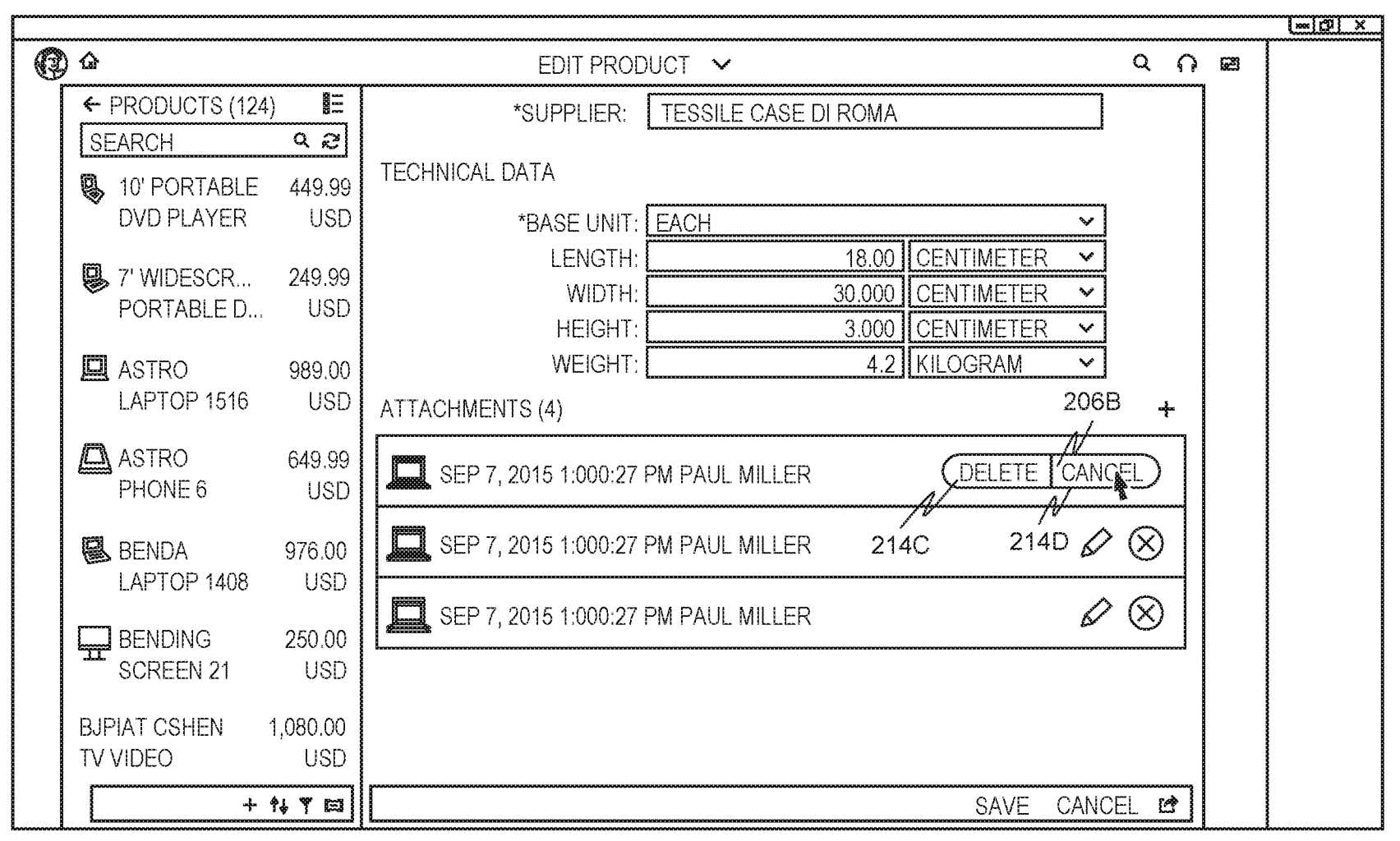

Referring now to FIG. 2J, this figure begins a sequence where the user selects dynamic button 206B to delete product 204B, but then elects not to confirm this deletion. In FIG. 2K, the user selects sub-button 214D, indicating a desire to cancel the earlier deletion request. A similar ripple effect as performed earlier may be performed here in response to the user's selection of sub-button 214D. Once this ripple effect has faded out, the sub-buttons 214C, 214D also fade out, and the dynamic button 206B then begins to shrink horizontally, as depicted in FIG. 2L. The sequence ultimately returns to FIG. 2J, with the dynamic button 206B shrinking more horizontally, and the return of the "X" inside the dynamic button 206B and the neighboring button 212.

Figure 3:
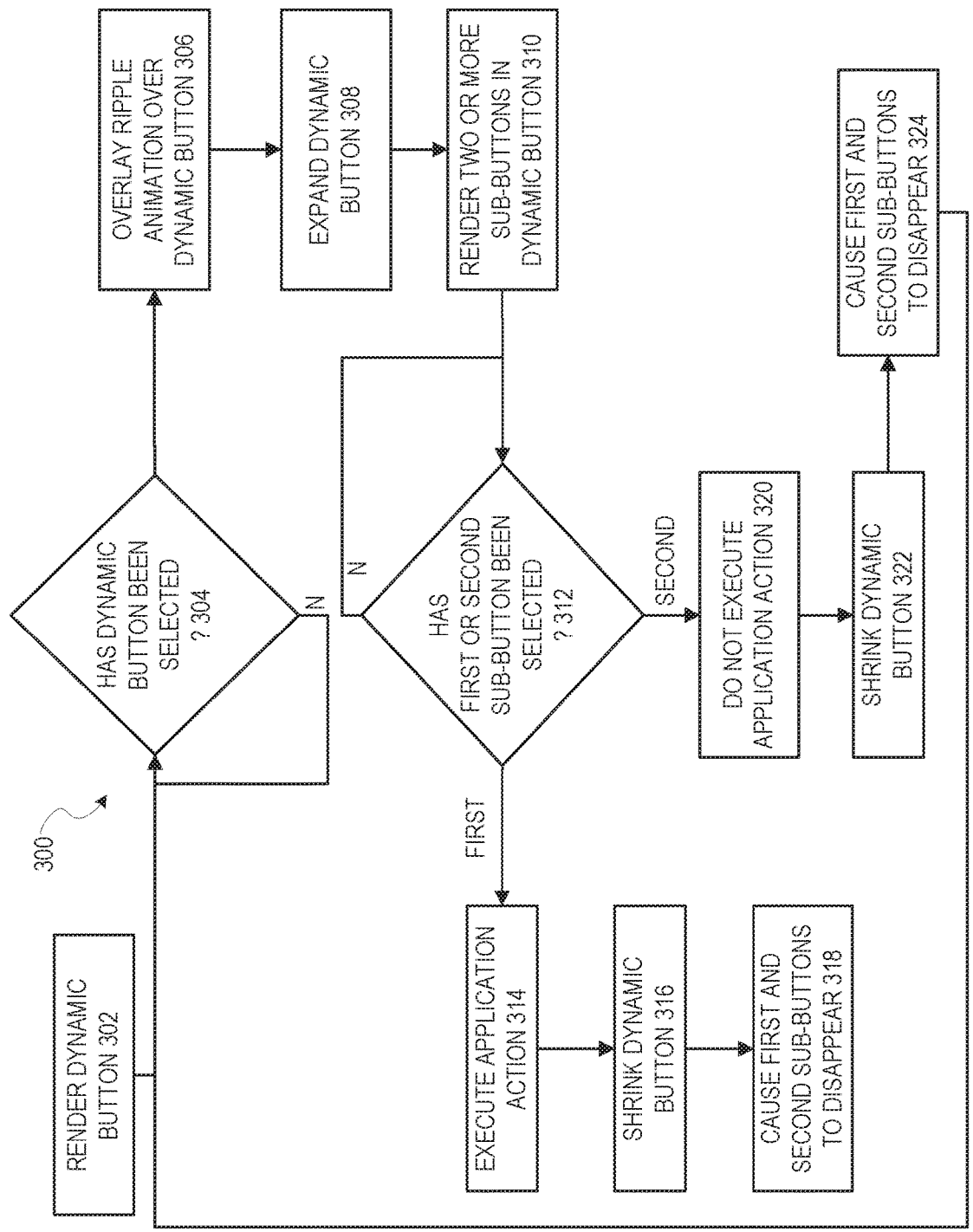
FIG. 3 is a flow diagram illustrating a method for providing a dynamic button in a user interface in accordance with the first example embodiment.

FIG. 3 is a flow diagram illustrating a method 300 for providing a dynamic button in a user interface in accordance with the first example embodiment. At operation 302, the dynamic button is rendered as a dynamic button user interface element in the user interface. This rendering may include rendering the dynamic button in a manner that an application action caused by selection of the dynamic button is conveyed. This may include, for example, placing the title of the application action (e.g., delete, add, etc.) in the rendering of the dynamic button, but could also or alternatively include using symbols to indicate the application action (e.g., an "X" with a circle to denote deletion).

At operation 304, it is determined if selection of the button through user input to the user interface is detected. If not, then the method 300 loops until such a selection is detected. Once the selection is detected, at operation 306 a ripple animation effect is overlaid on the dynamic button in the dynamic button user interface element in the user interface. At operation 308, the dynamic button expands. At operation 310, two or more sub-buttons are rendered in the dynamic button user interface element in the user interface.

The first of these sub-buttons may confirm the application action if selected, while the second of these sub-buttons may deny the application action if selected. At operation 312, it is determined if the first or second sub-button is selected, or if neither is selected. If neither is selected, the method 300 loops until a selection is detected.

If the first sub-button is selected, then at operation 314 the application action is executed. This may include, for example, the user interface sending a request to the underlying application to execute the action, or alternatively the user interface may be able to directly execute the action (such as, for example, in the case of a browser rendering a web page containing scripting elements that can be triggered by the user interface). At operation 316, the dynamic button shrinks. At operation 318, the first and second sub-buttons disappear. In some example embodiments, the dynamic button may also disappear, such as where the application action is a delete action and the dynamic button no longer has relevance Oven the deletion (e.g., its corresponding line in the user interface has been removed).

If, at operation 312, it is determined that the second sub-button is selected, then at operation 320, the application action is not executed (this may include, in some example embodiments, cancelling the application action if it has not executed yet). At operation 322, the dynamic button shrinks. It should be noted that this shrinking may occur in a different manner than the shrinking of operation 316. Whereas operation 316 may shrink the dynamic button in a manner suggesting it will disappear completely (such as may be in the case of a delete application action, such as by shrinking the dynamic button vertically when it had expanded horizontally in operation 308), operation 322 may shrink the dynamic button in a manner suggesting it will not disappear completely (such as by shrinking the dynamic button horizontally in the opposite direction of how it expanded horizontally in operation 308). At operation 324, the first and second sub-buttons disappear. The method 300 may then loop back to operation 302.

It should be noted that the ordering of many of the operations is not strict and indeed portions of these operations may be performed simultaneously with other portions, especially when effects are being presented (e.g., the ripple animation effect occurring while the dynamic button is growing).

It should also be noted that the term "application action" shall be interpreted broadly to mean any action in any application located on any device that is triggered by the dynamic button. This may include, as described above, an action executed in a script of a web page in a web browser, but may also include any other type of application action, such as execution of an action in a stand-alone (e.g., non-browser) application, or execution of an action on a remote server, such as a web server or application server.

FIGS. 4A-4F are screen captures depicting different frames of a sequence of interacting with a dynamic button in accordance with a second example embodiment. Unlike the first embodiment described above, in the second embodiment, no confirmatory or denial sub-buttons are presented in the dynamic button user interface element. Rather, the dynamic button user interface is used to communicate results of the underlying application action.

Referring first to FIG. 4A, a window 400 may depict a user interface where various products 402A-402G are depicted in a list form, each of the various products 402A-402G having a corresponding dynamic button 404A-404G. In FIG. 4A, the user navigates a cursor 406 over dynamic button 404A and selects it. Selection can occur in the same or similar manner as described above with respect to the first embodiment. Once selection of the button 404A occurs, the size of button 404A may first slightly enlarge in size, then slightly shrink to a size smaller than the original size, then finally enlarge again to the original size while at the same time the text and text color within the button 404A may alter to confirm that the application action has been executed.

Figure 4B:
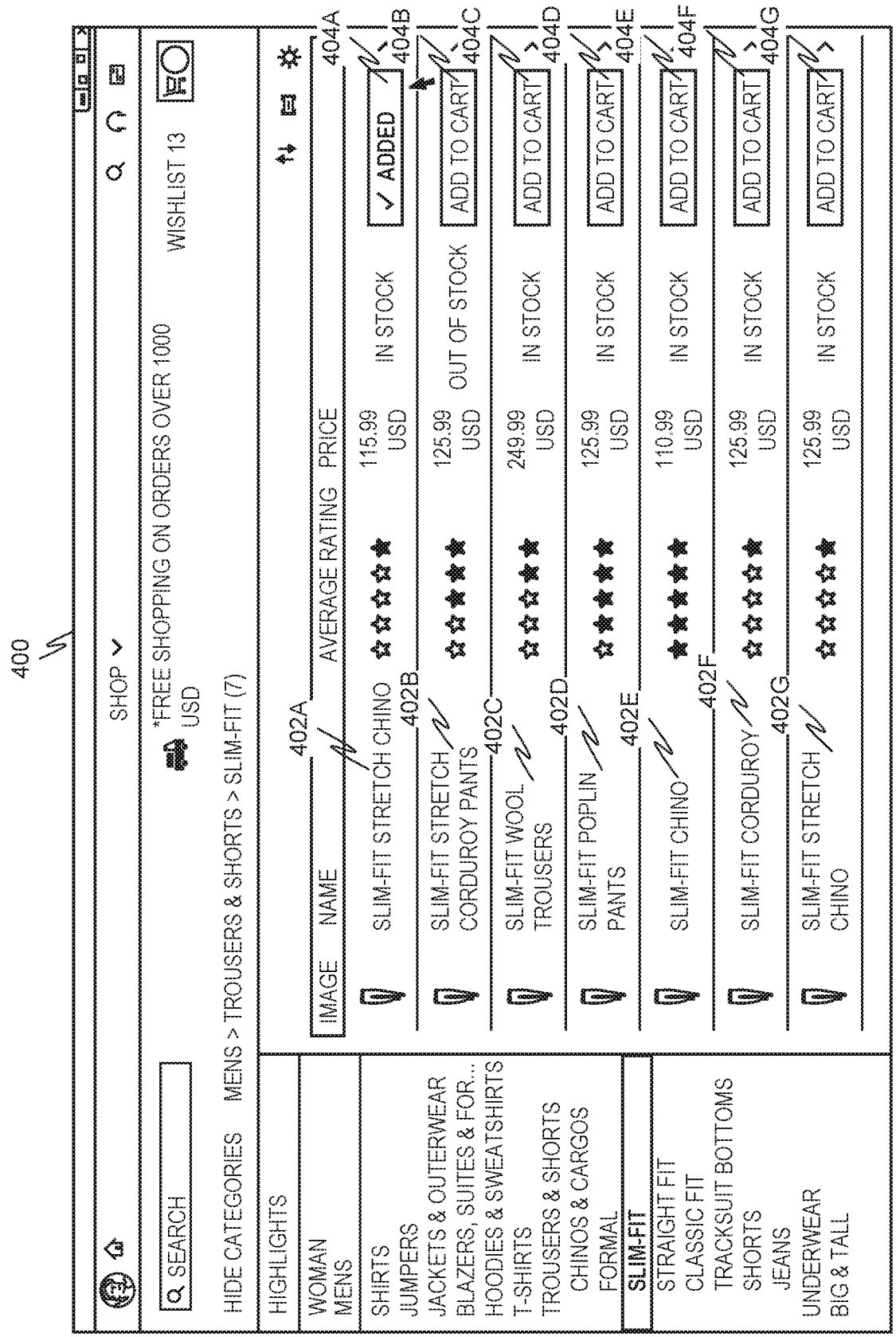

Referring now to FIG. 4B, dynamic button 404A now depicts the results of the application action. Here, the application action is "add to cart", which attempts to add the corresponding product 402A to an electronic shopping cart. Here, this action has been successful, and dynamic button 404A now depicts that the action has been successful (by, for example, indicating that the product 402A has been "Added" to the cart and a check sign being displayed. Coloring may also be used to indicate success, such as by using green for success for the color of the dynamic button 404A, check mark, and text).

Figure 4D:
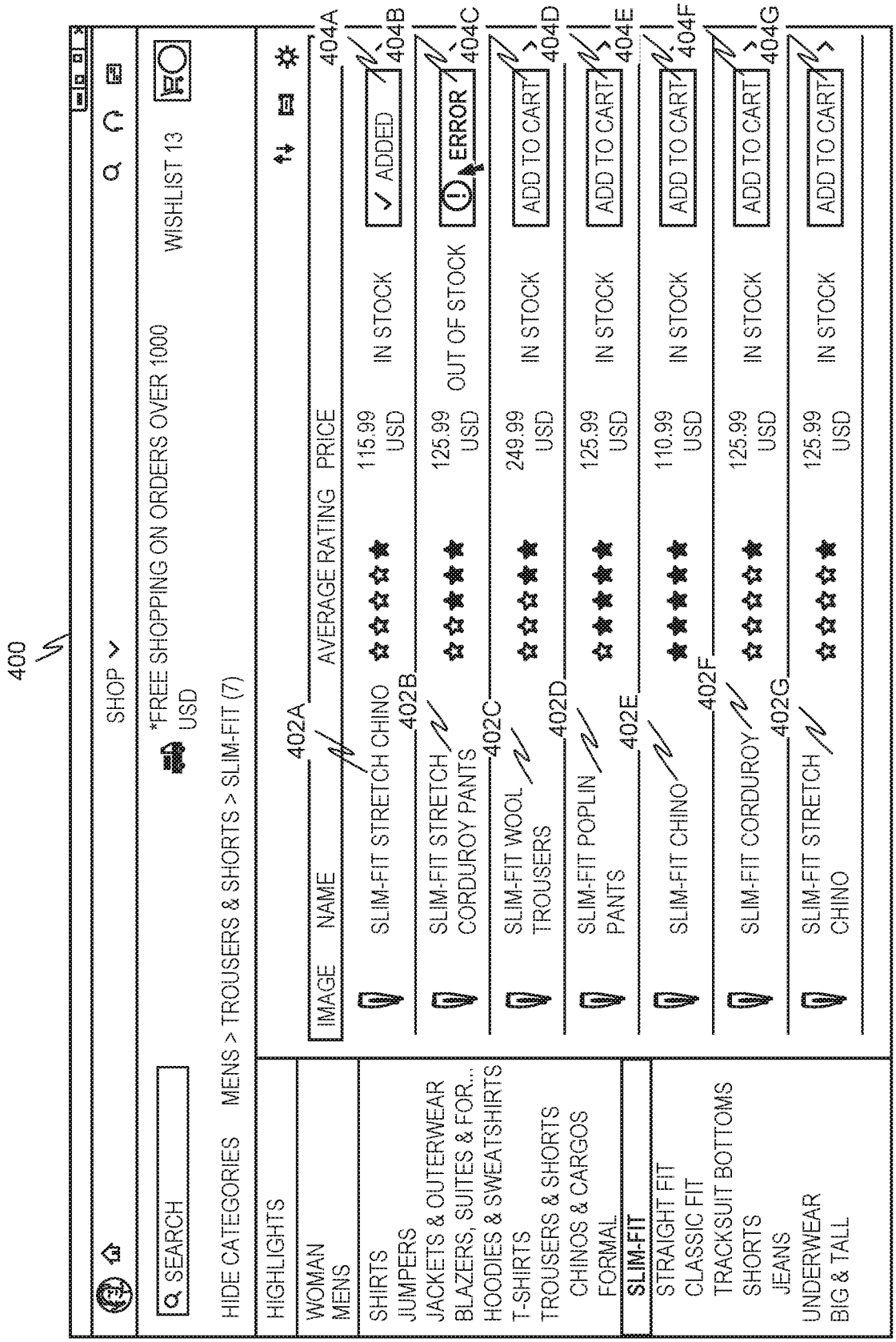
Figure 4E:
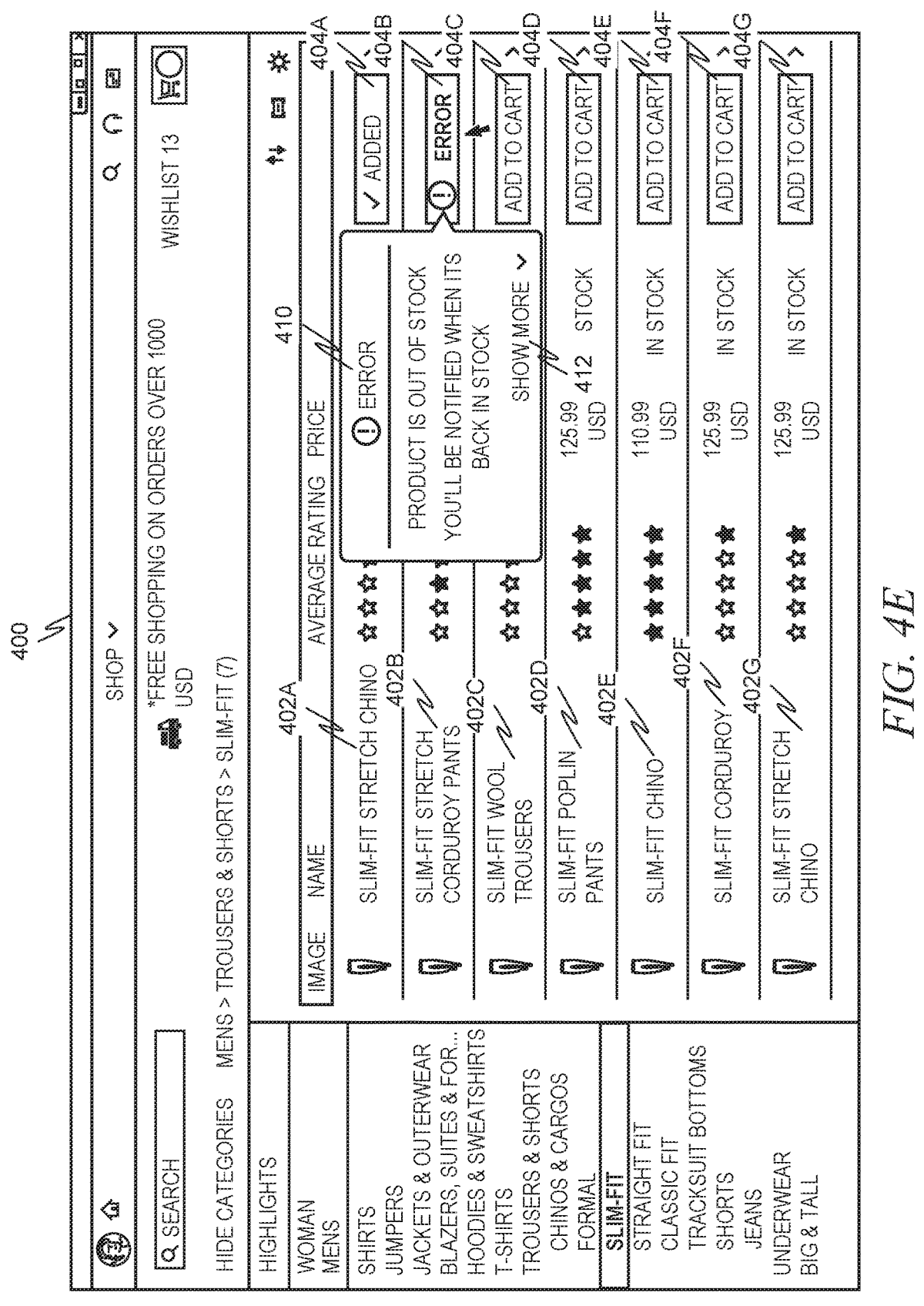
Figure 4F:
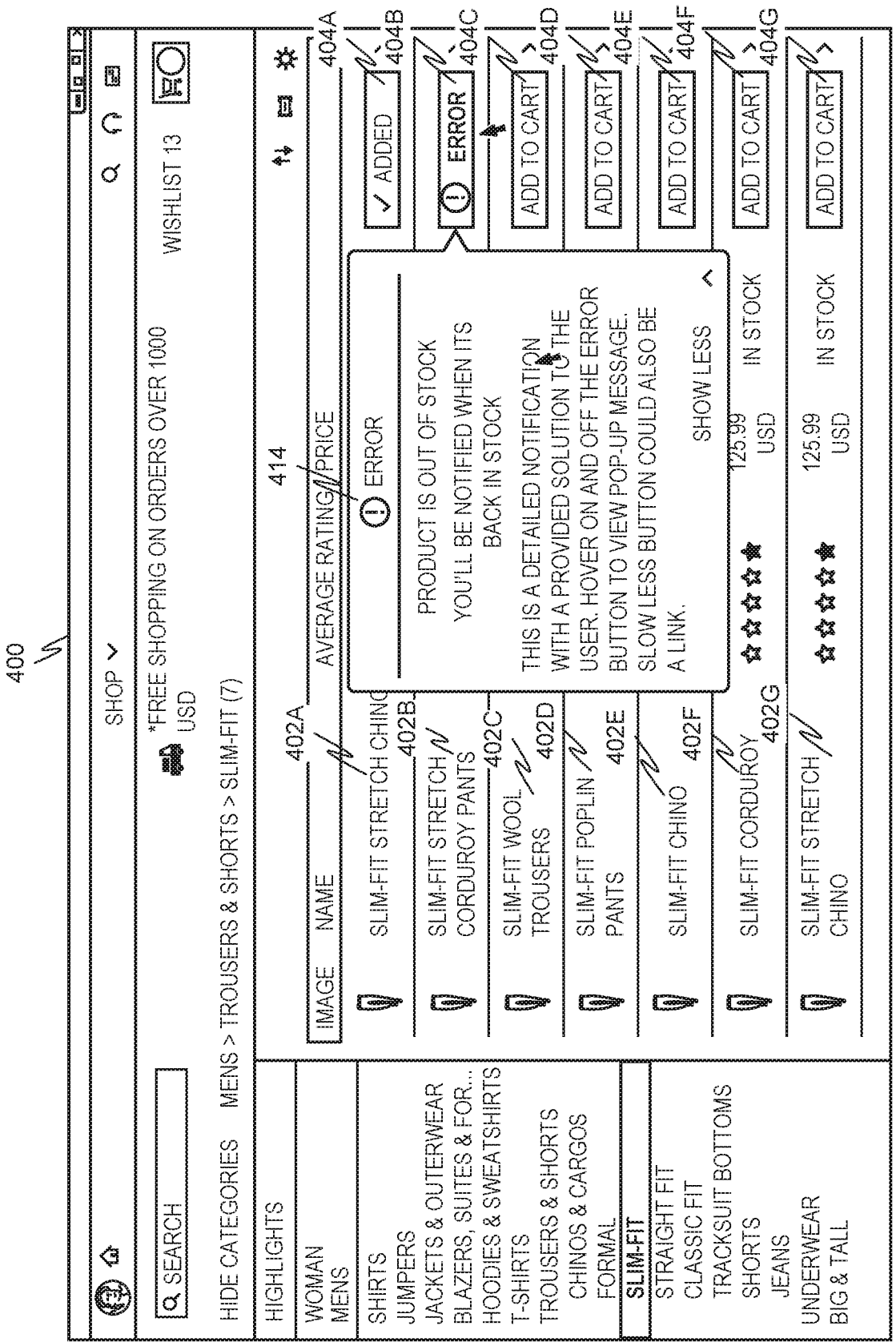

Referring now to FIG. 4C, the user has now moved the cursor to and selected dynamic button 404B, which corresponds to product 402B. As shown in FIG. 4D upon selecting dynamic button 402B the displayed text in the button may first change from "add to cart" to "error" which may be in red text along with an exclamation mark in a circle followed by an animation that slightly moves the button toward the right and back again indicating that the product 402B, is out of stock and cannot be moved to the cart. As such, the application action triggered by the dynamic button 404B cannot be completed. FIG. 4D shows how the dynamic button 404B changes to display that an error has occurred in the application action (by, for example, having the word "error" appear in the dynamic button 404B along with an exclamation point inside a circle. Coloring may also be used to indicate an error, such as by using red for error for the color of the dynamic button 404B, exclamation point, and text).

Referring now to FIG. 4E, following the dynamic button actions as described in FIG. 4D additional information about the cause of the error is displayed in a separate explanation window 410. More information can be displayed by selecting a "show more" button 412, which reveals modified explanation window 414 in FIG. 4F.

Figure 5:
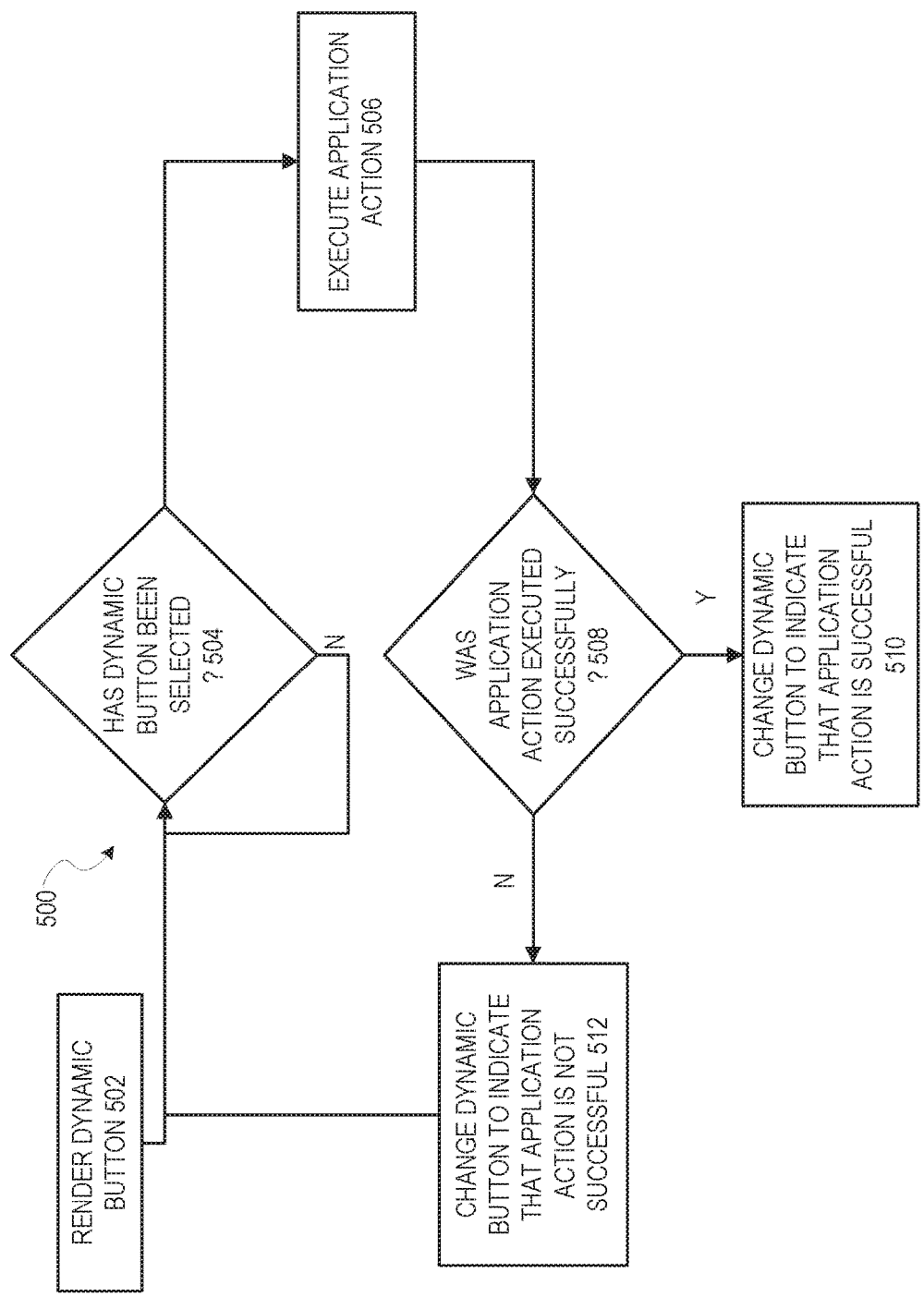
FIG. 5 is a flow diagram illustrating a method for providing a dynamic button in a user interface in accordance with the second example embodiment.

FIG. 5 is a flow diagram illustrating a method 500 for providing a dynamic button in a user interface in accordance with the second example embodiment. At operation 502, the dynamic button is rendered as a dynamic button user interface element in the user interface. This rendering may include rendering the dynamic button in a manner such that an application action caused by selection of the dynamic button is conveyed. This may include, for example, placing the title of the application action (e.g., delete, add, etc.) in the rendering of the dynamic button, but could also or alternatively include using symbols to indicate the application action (e.g., an "X" with a circle to denote deletion).

At operation 504, it is determined if selection of the button through user input to the user interface is detected. If not, then the method 500 loops until such a selection is detected. At operation 506, an application action is executed. At operation 508, it is determined if the application action is successful. If so, then at operation 510 the dynamic button changes to indicate that the application action is successful. This may include morphing the inside of the dynamic button to, for example, display text and/or symbols indicating that the application action was successful.

If at operation 508 it is determined that the application action was not successful, then at operation 512 the dynamic button changes to indicate that the application action is not successful. This may include morphing the inside of the dynamic button to, for example, display text and/or symbols indicating that the application action was not successful.

It should be noted that the ordering of many of the operations is not strict and indeed portions of these operations may be performed simultaneously with other portions, especially when effects are being presented (e.g., the ripple animation effect occurring while the dynamic button is changing its text).

Figure 6A:
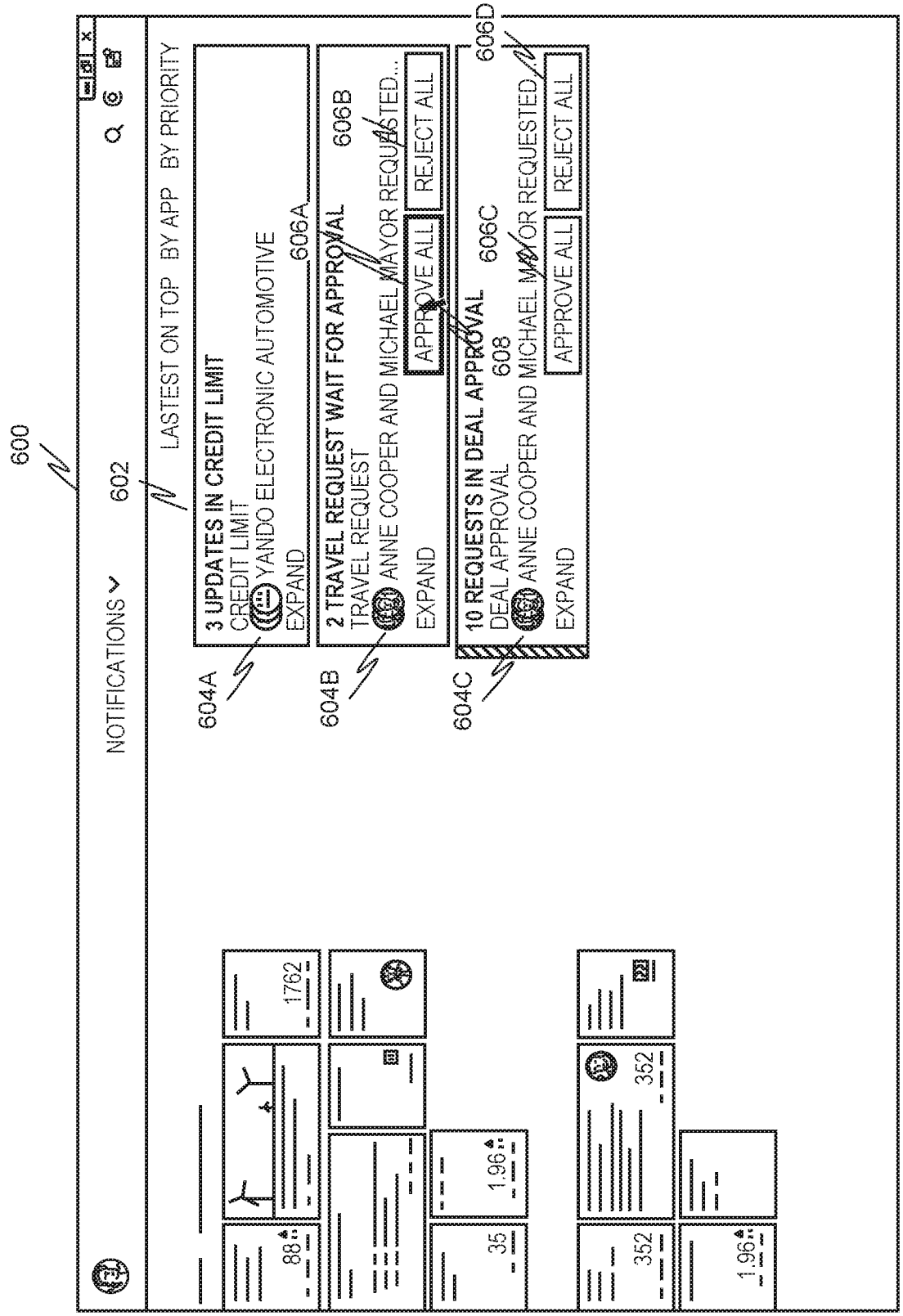
Figure 6B:
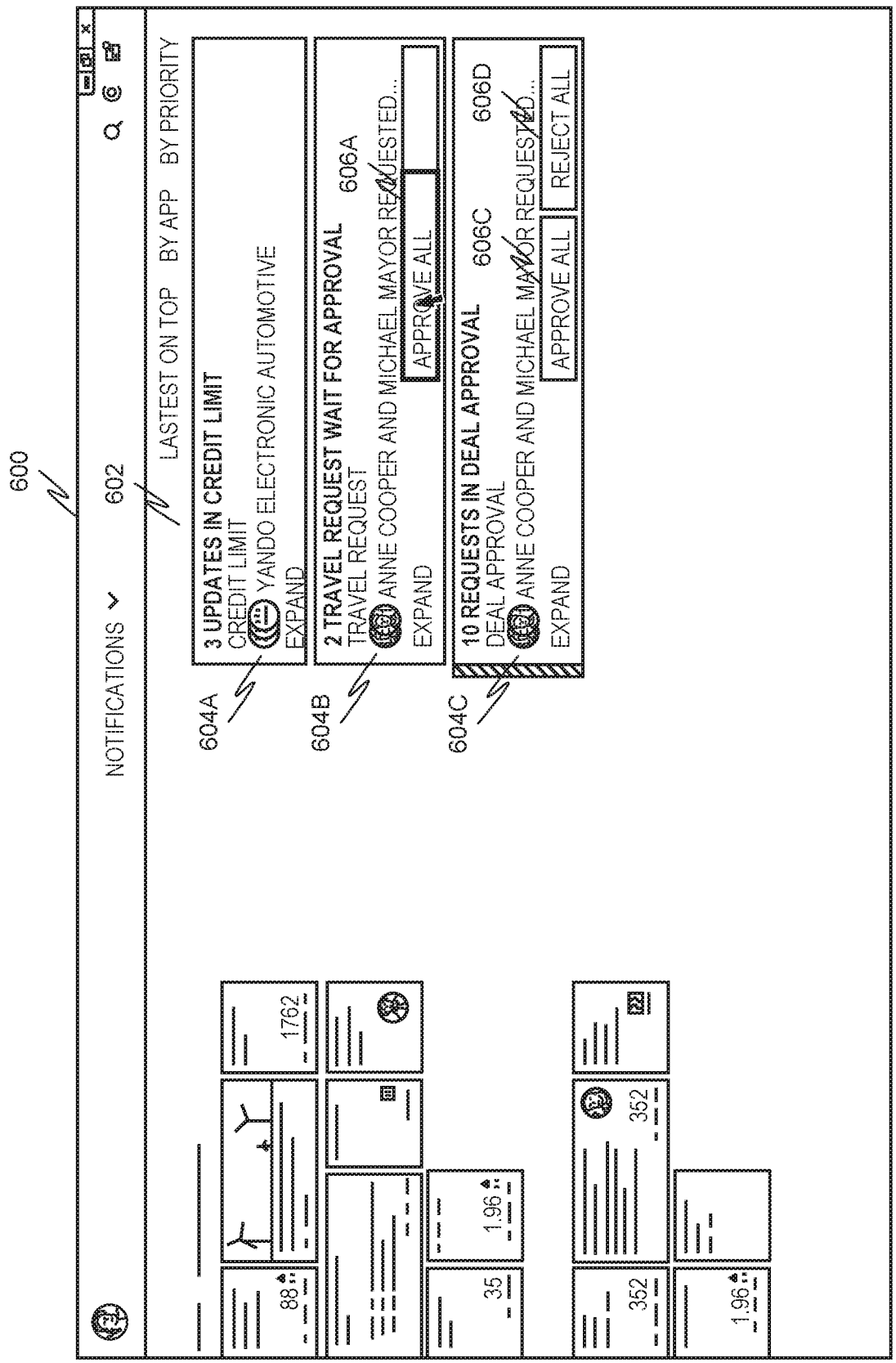

FIGS. 6A-6M are screen captures depicting different frames of a sequence of interacting with a dynamic button in accordance with a third example embodiment. Referring first to FIG. 6A, a user interface screen 600 includes an area 602 where multiple messages 604A-604C are displayed. Some of these messages 604B, 604C have multiple dynamic buttons 606A-606D. Specifically, message 604A has dynamic buttons 606A and 606B and message 604C has dynamic buttons 606C and 606D. Dynamic buttons 606A, 606C correspond to a first application action, here an "approve all" command to approve requests that are subjects of the corresponding messages 604B, 604C, while dynamic buttons 606B, 606D correspond to a second application action, here a "reject all" command to reject requests that are subjects of the corresponding message 604B, 604C.

Figure 6C:
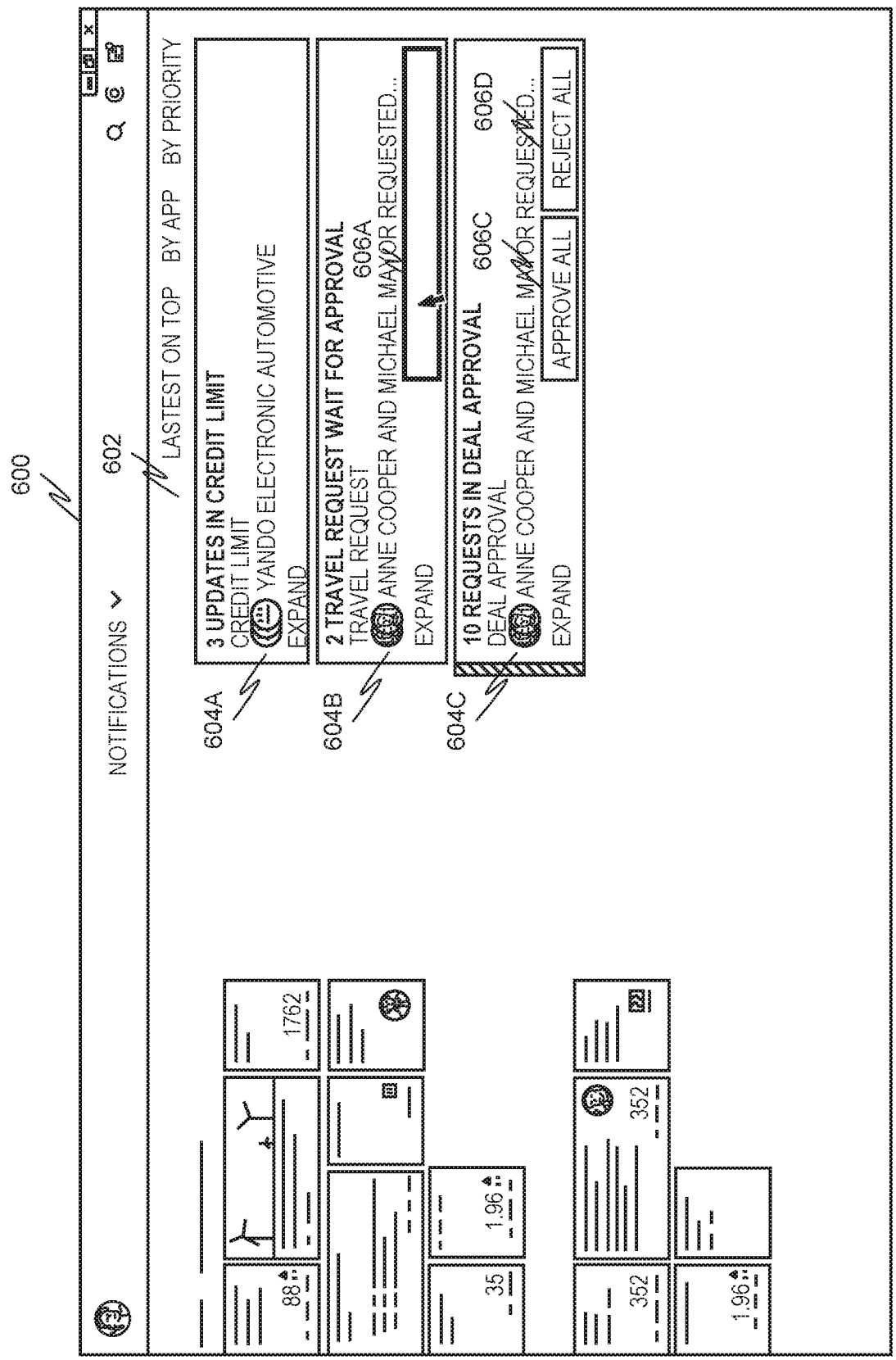
Figure 6D:
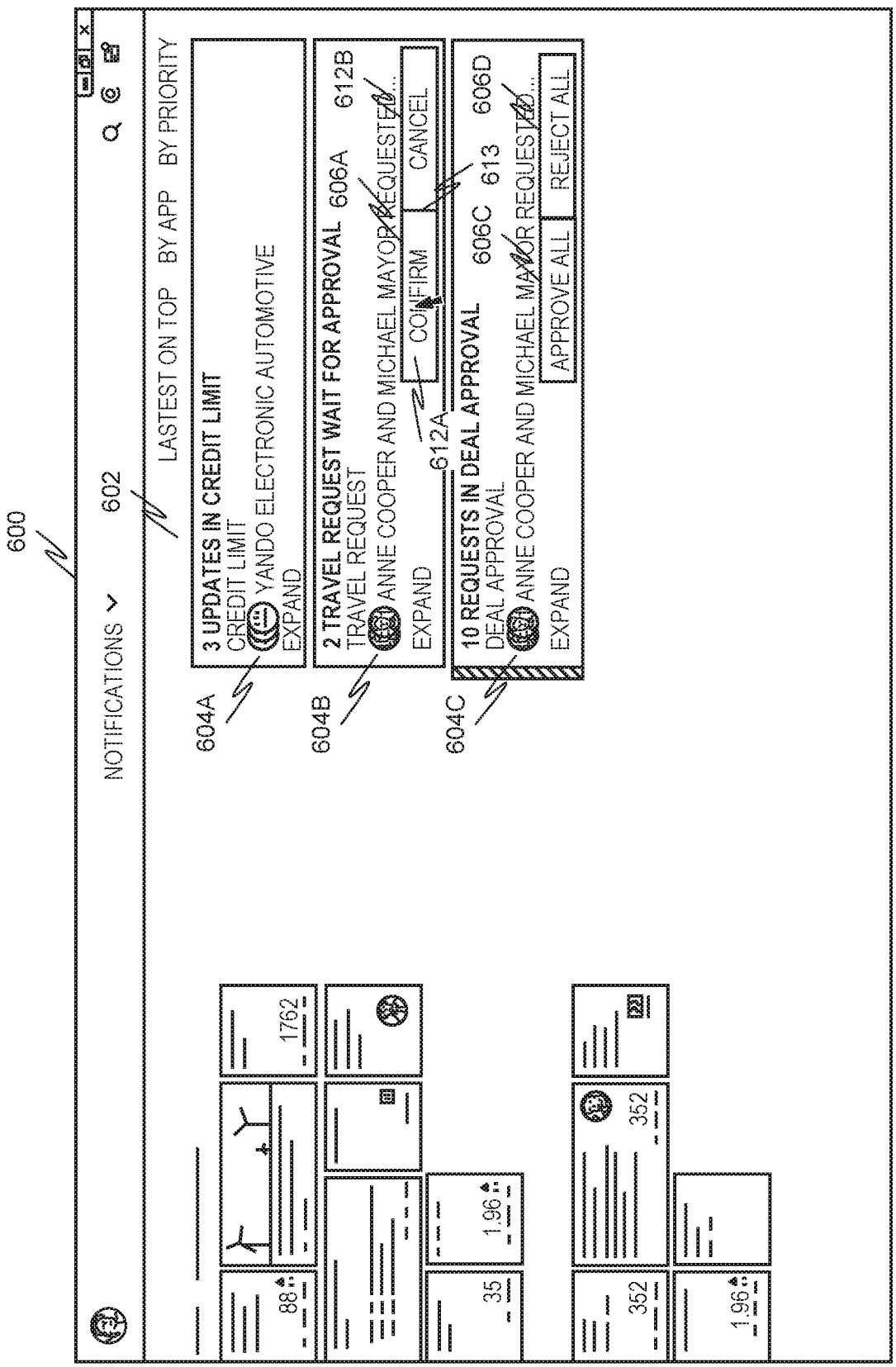
Figure 6E:
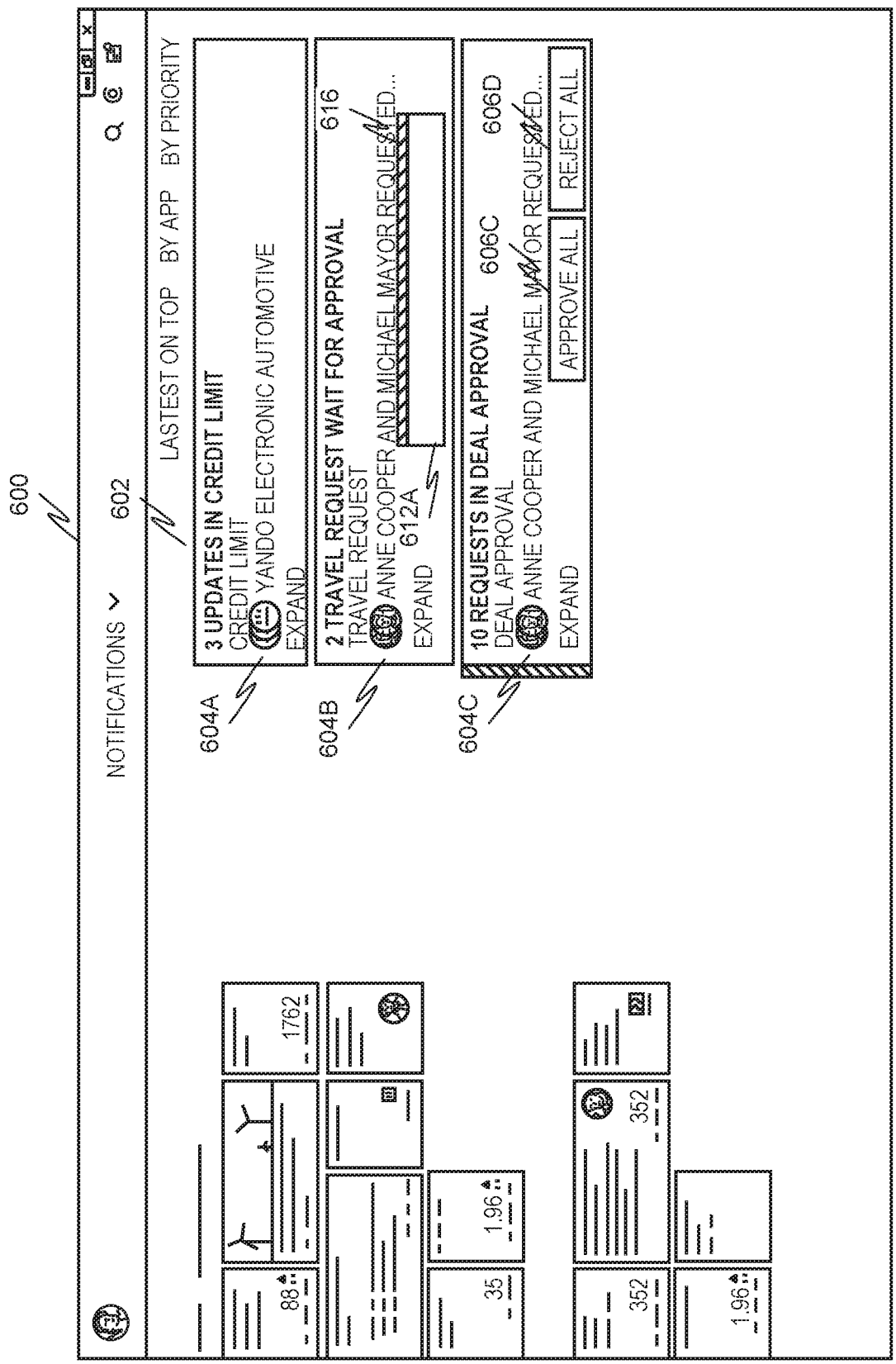

In FIG. 6A, the user has hovered cursor 608 over dynamic button 606A, which causes dynamic button 606A to change color or shading. Then the user selects dynamic button 606A. Selection of dynamic button 606A causes a ripple effect to start (not pictured), similar to that as described earlier. Once the ripple effect is complete, in FIG. 6B, dynamic button 606B begins to fade, and dynamic button 606A begins to grow horizontally in the direction of the dynamic button 606B. In FIG. 6C, dynamic button 606A has grown to completely replace dynamic button 606B. Notably, dynamic button 606A has an outer perimeter that lines up exactly with three of the four sides of previously displayed dynamic button 606B. This allows the remainder of the area 602 and indeed the user interface screen 600 to remain exactly as it was in FIG. 6A. Referring to FIG. 6D, rather than two separate buttons separated by a space, dynamic button 606A now includes two sub-buttons 612A, 612B, separated not by a space but by a dividing line 613.

In the underlying user interface, the sub-buttons 612A, 612B are both part of the UI element dedicated to the dynamic button 606A, and thus are not independent UI elements from the dynamic button 606A, such as would be the case if sub-buttons 612A, 612B had replaced dynamic button 606A or been overlaid on top of dynamic button 606A.

Sub-button 612A corresponds to a confirmatory action for the underlying application action of dynamic button 606A, whereas sub-button 612B corresponds to a denial action for the underlying application action of dynamic button 606A.

Figure 6F:
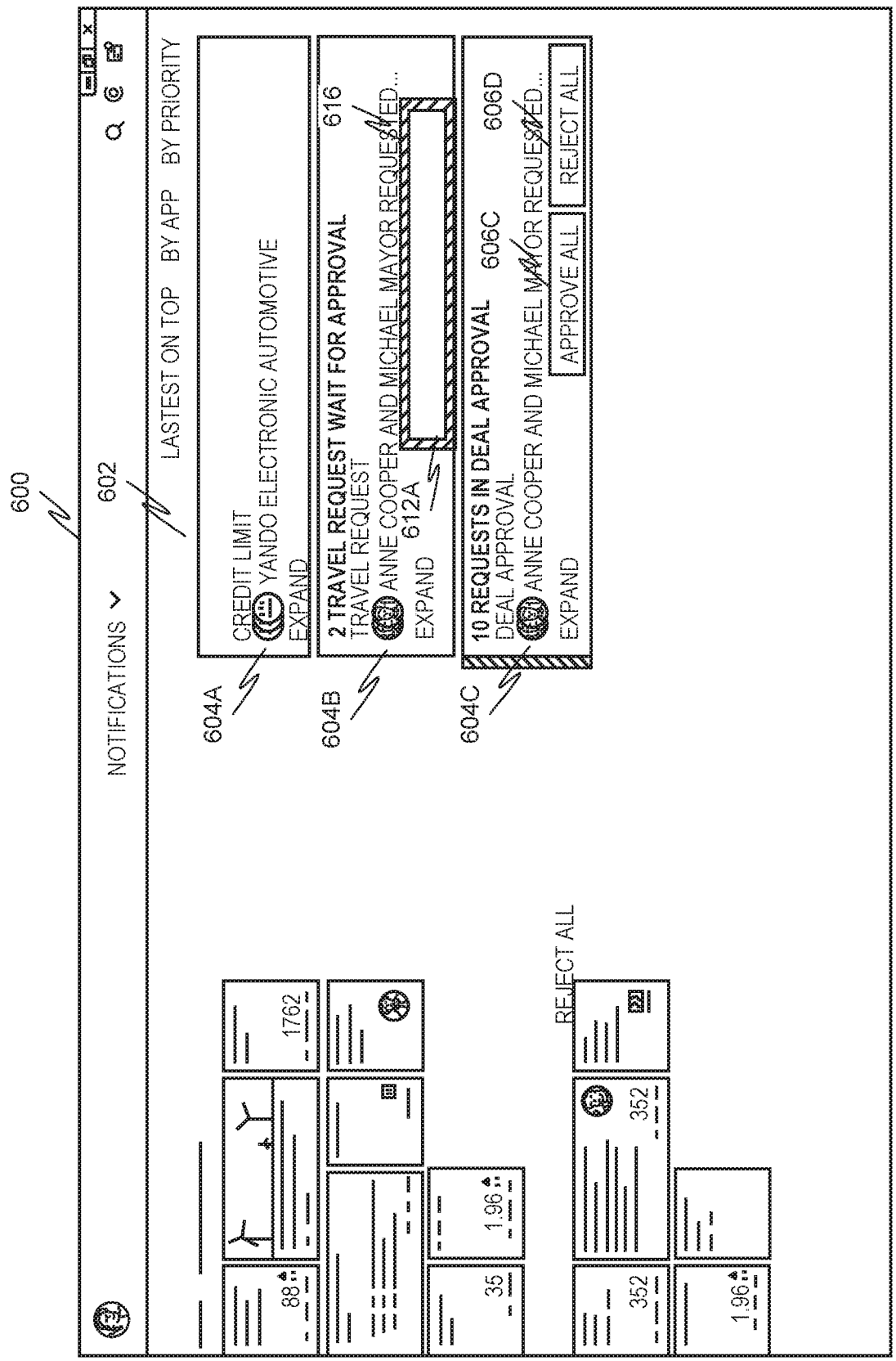
Figure 6G:
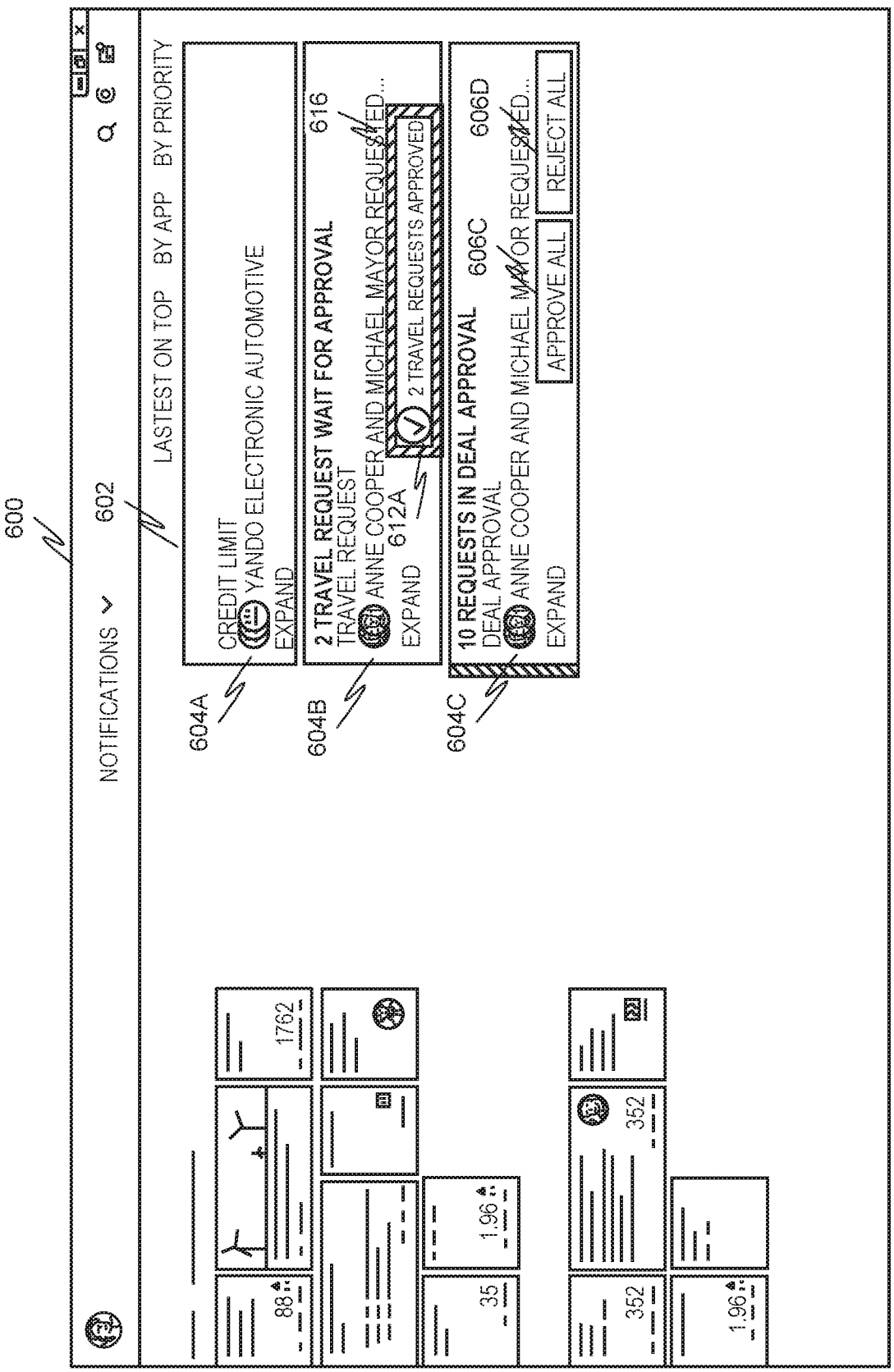

When the user has selected sub-button 612A, indicating a desire to confirm the application action corresponding to dynamic button 606A, another ripple effect will occur (also not pictured). Once this ripple effect is complete, in FIG. 6E, the text inside sub-buttons 612A and 612B has faded. Also in FIG. 6E, a looping effect 616 begins to circle dynamic button 606A. This looping effect 616 may signify that the underlying application action is being performed. As such, it may be presented in such a way to signify this fact, such as by being displayed in green. This looping effect 616 may include redrawing the perimeter of the dynamic button 606A in a counterclockwise animated fashion, replacing the original color of the perimeter with another color (such as green). In FIG. 6F, the looping effect 616 has now completely encircled the perimeter of dynamic button 606A. In FIG. 6G, an indication that the underlying application action has been completed may be displayed inside the dynamic button 606A. This may include presenting, for example, text and/or symbols indicating that the underlying application action has completed successfully. In some example embodiments, if the underlying application action was not successful, an error message or other negative indicator could be displayed inside the dynamic button 606A at this stage.

It should be noted that in some example embodiments, the looping effect 616 may continue until the user interface has received some sort of indication that the underlying application action has completed. In other words, the looping effect 616 may continue to go around and around the dynamic button 606A, only stopping when the application action has completed. In another example embodiment, the looping effect 616 may be timed based on intermediate updates based on the stages of completion of the application action. For example, if the underlying application action involves approving four different travel requests, as each travel request approval is completed, the looping effect 616 may be timed to advance another quarter-way around the perimeter of the dynamic button 606A. In this way, the looping effect 616 indicates to the user how close the entire application action is to completion.

Figure 6H:
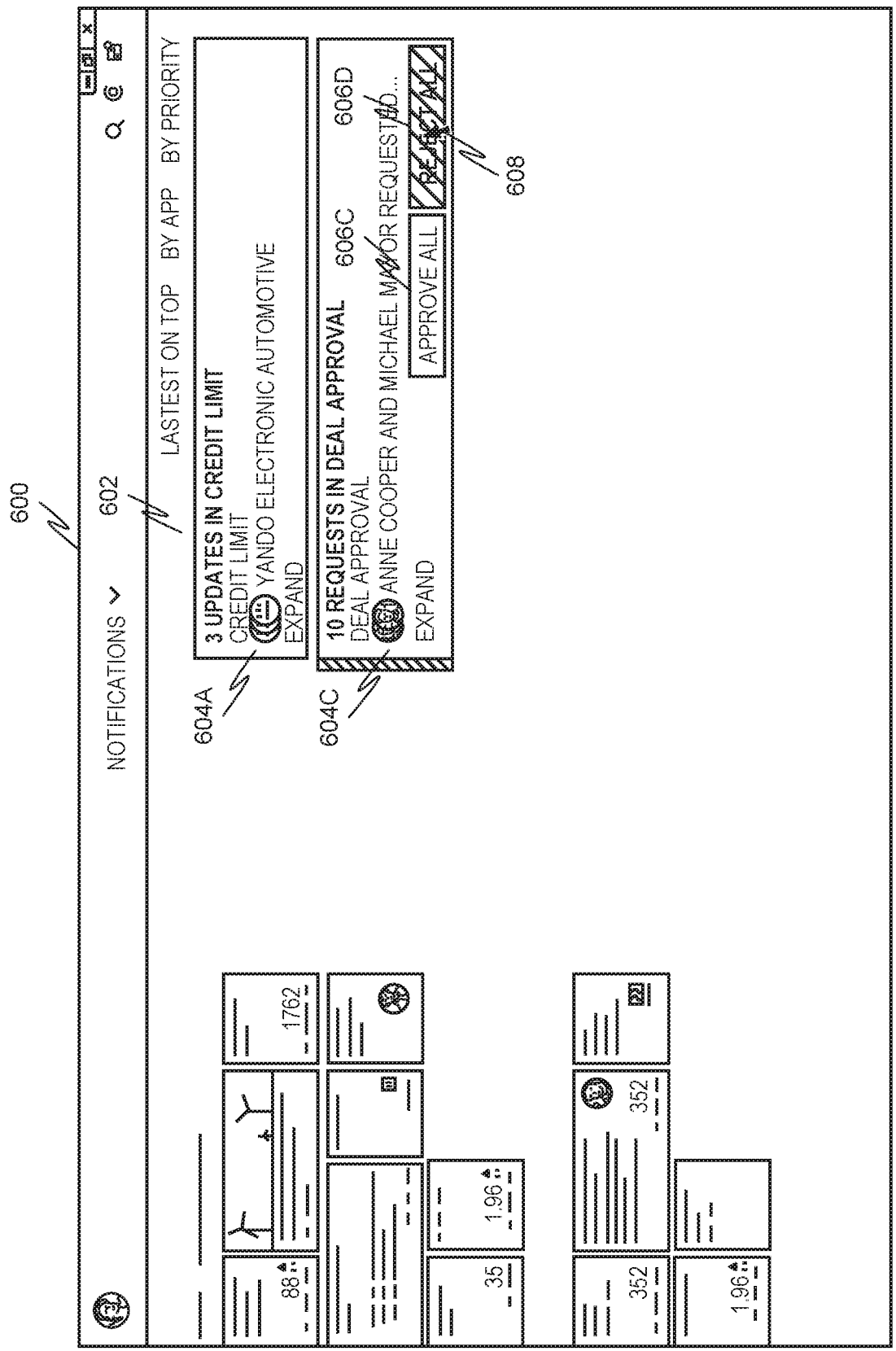
Figure 61:
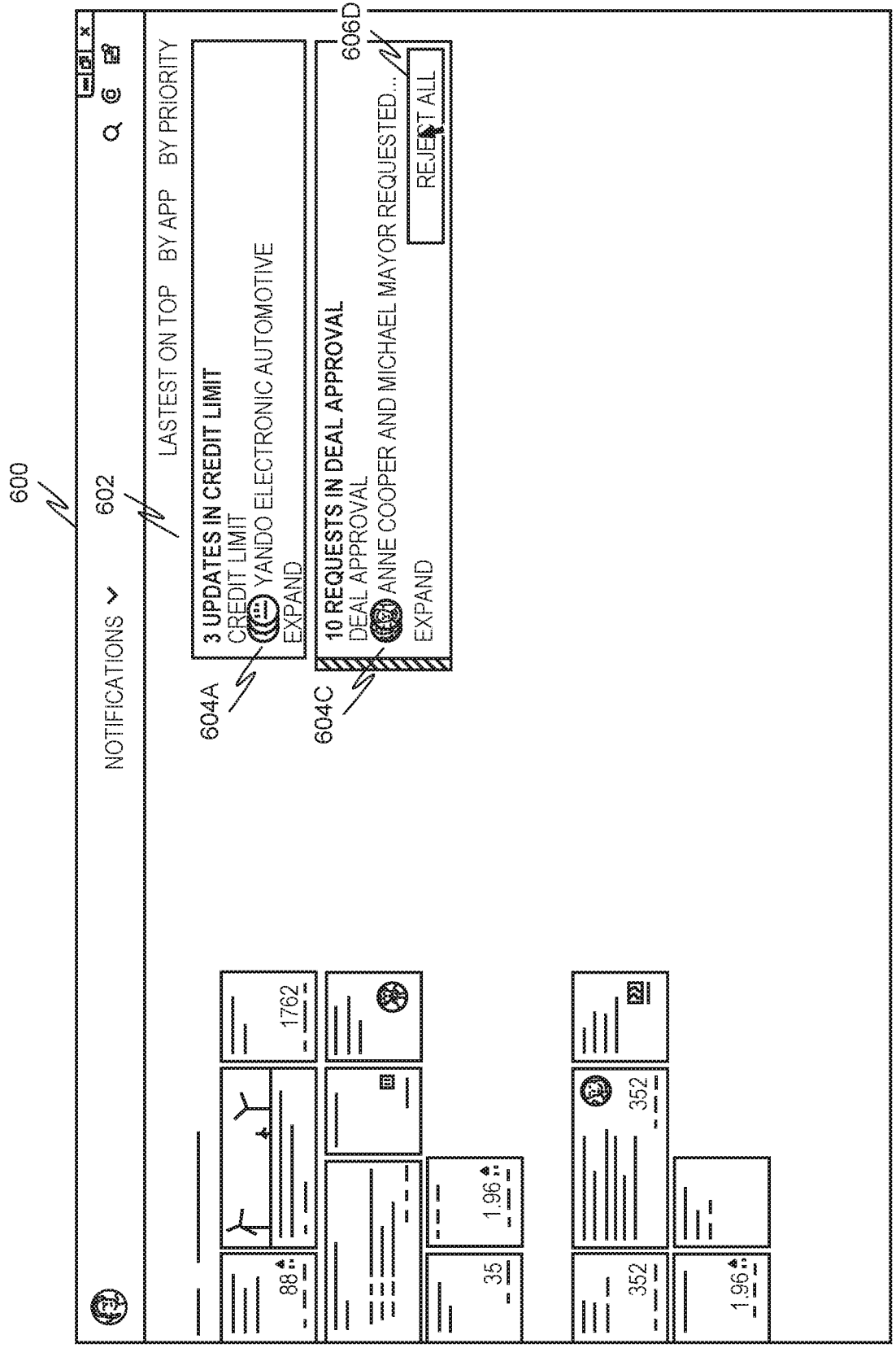

Referring now to FIG. 6H, here the message 604B has disappeared (as action has been taken on its underlying need, namely the travel requests have been approved), and message 604C has been moved up in area 602. The user has navigated the cursor 608 over dynamic button 606D, causing dynamic button 606D to appear in a different color or shading.

Figure 6J:
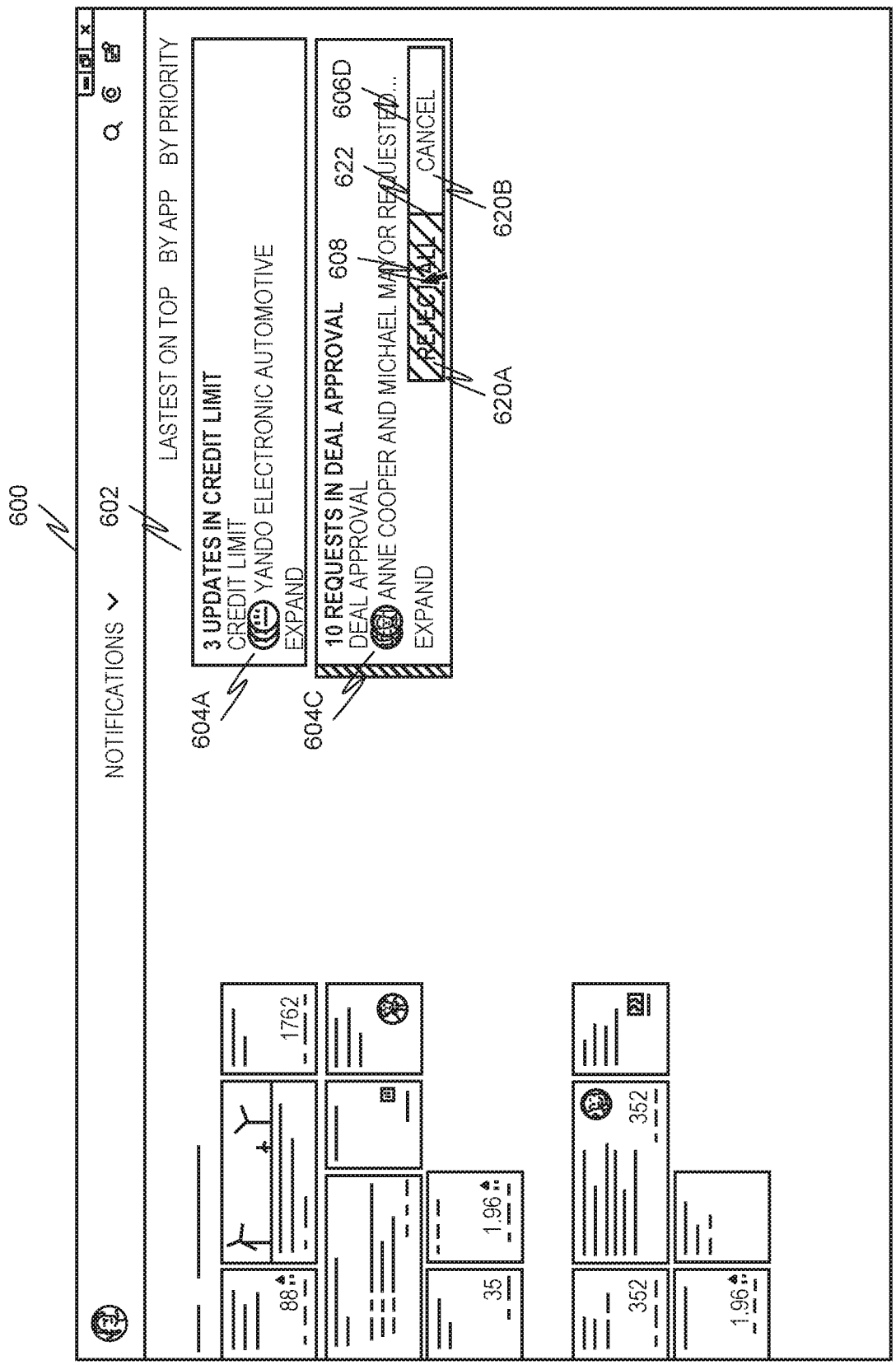

Then the user selects dynamic button 606D. Another ripple effect may occur in response to this selection. In FIG. 6I, dynamic button 606C fades out and dynamic button 606D begins to grow horizontally in the direction of the dynamic button 606C. In FIG. 6J, dynamic button 606D has grown to completely replace dynamic button 606C. Notably, dynamic button 606D has an outer perimeter that lines up exactly with three of the four sides of previously displayed dynamic button 606C. This allows the remainder of the area 602, and indeed the user interface screen 600, to remain exactly as it was in FIG. 6H. In FIG. 6J, rather than two separate buttons separated by a space, dynamic button 606D now includes two sub-buttons 620A, 620B, separated not by a space but by a dividing line 622.

In the underlying user interface, the sub-buttons 620A, 6209 are both part of the UI element dedicated to the dynamic button 606D, and thus are not independent UI elements from the dynamic button 606D, such as would be the case if sub-buttons 620A, 620B had replaced dynamic button 606D or been overlaid on top of dynamic button 606D.

Sub-button 620A corresponds to a confirmatory action for the underlying application action of dynamic button 606D, whereas sub-button 620B corresponds to a denial action for the underlying application action of dynamic button 606D. In FIG. 6J, the user has hovered the cursor 608 over sub-button 620A, and this hovering is depicted visually by changing the color or shading of sub-button 620A.

Figure 6K:
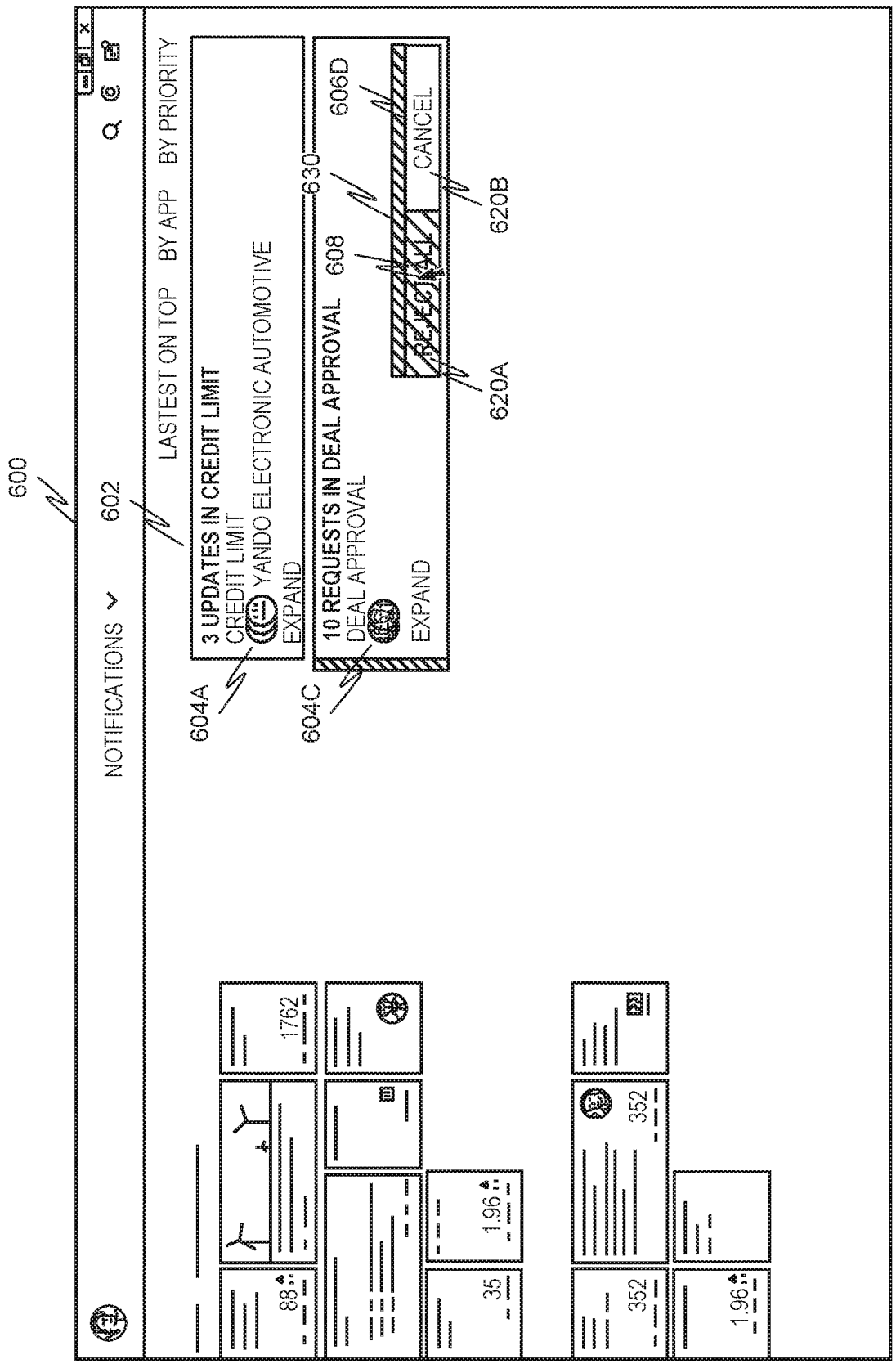
Figure 6L:
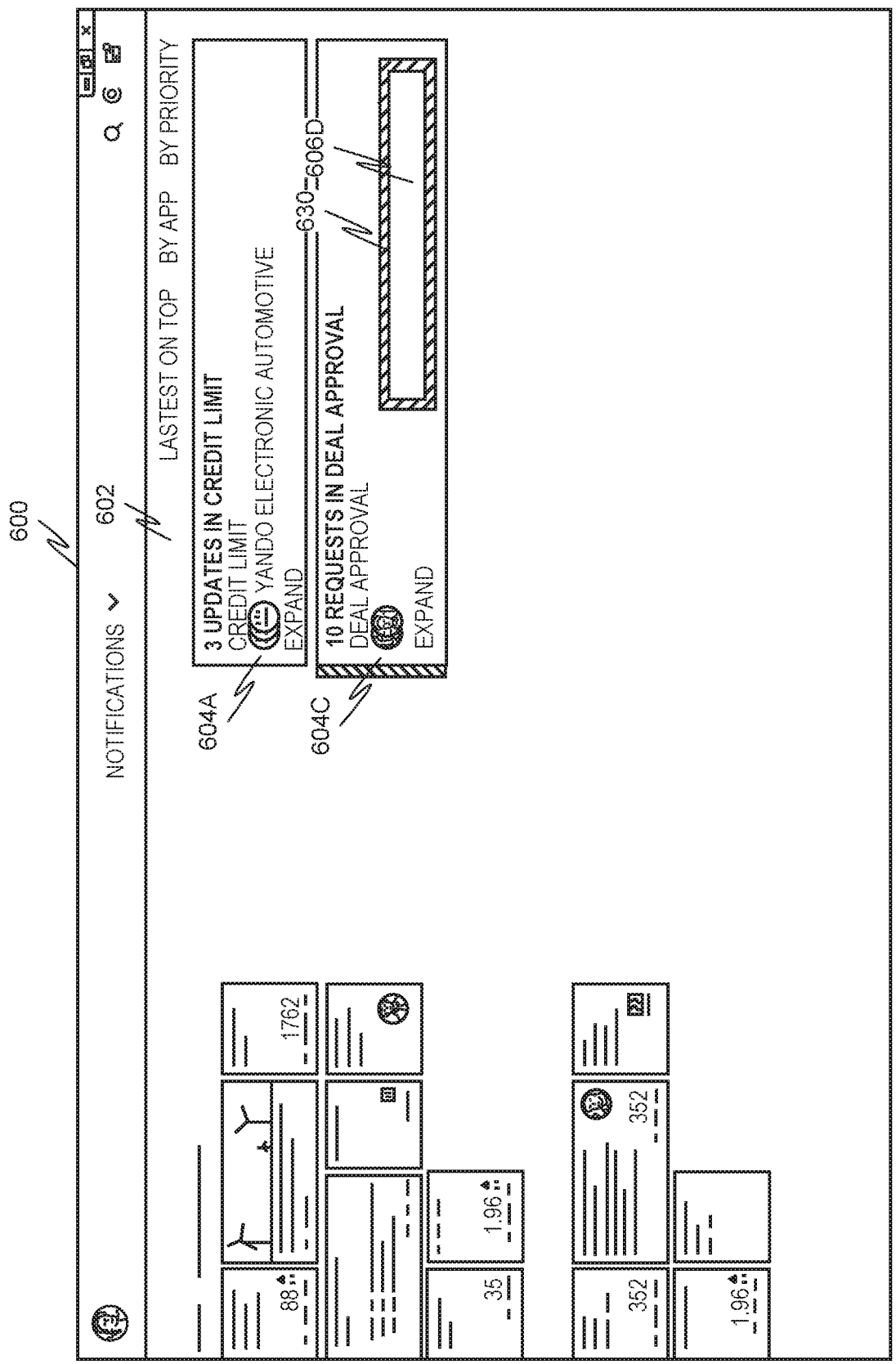
Figure 6M:
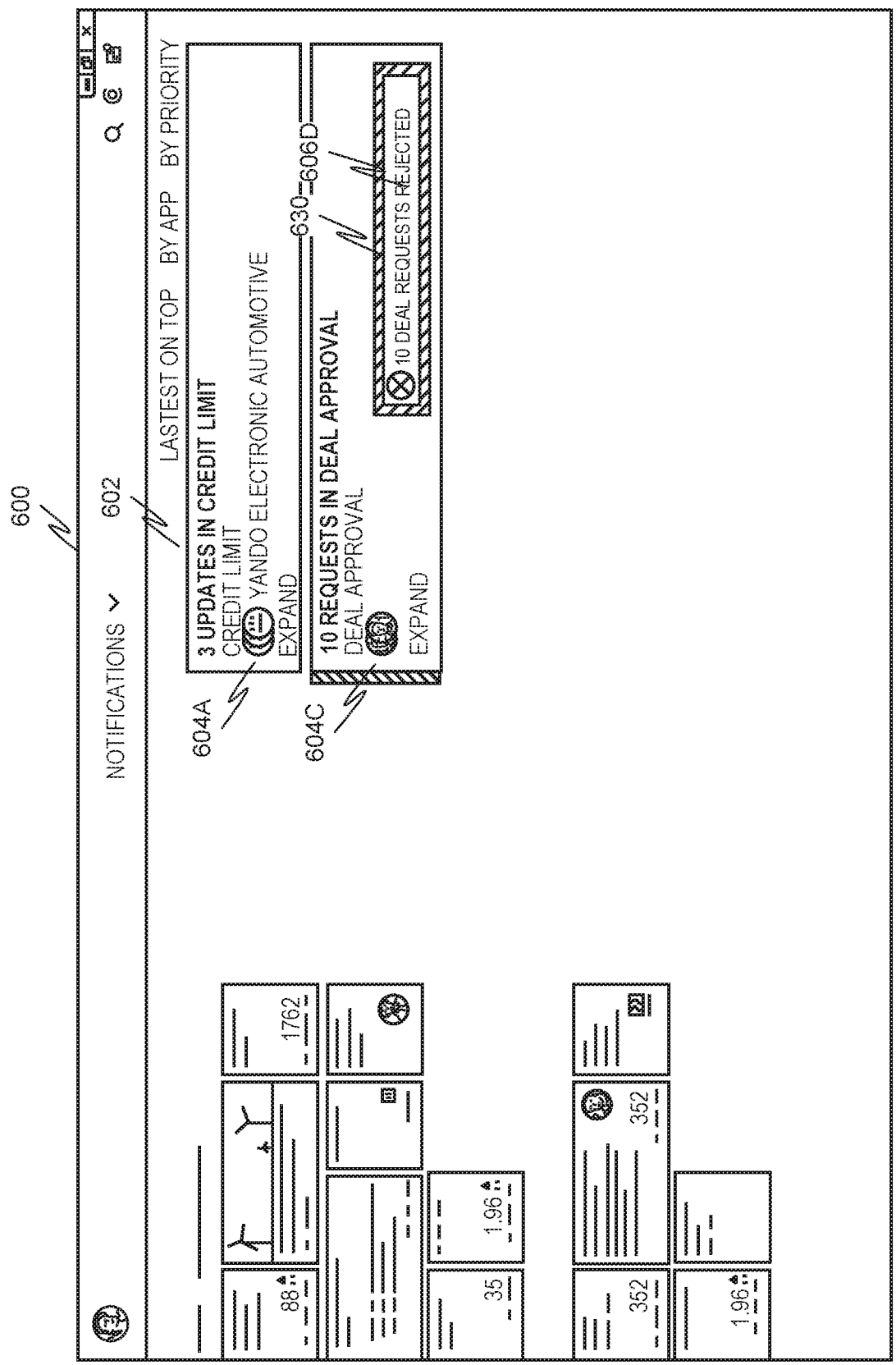

The user then selects selected sub-button 620A, indicating a desire to confirm the application action corresponding to dynamic button 606D. This is indicated through another ripple effect (not pictured). Once the ripple effect has completed, the text inside sub-buttons 620A and 6209 fades, and a looping effect 630 begins to circle dynamic button 606D, as depicted in FIG. 6K. This looping effect 630 may signify that the underlying application action is being performed. As such, it may be presented in such a way to signify this fact, such as by being displayed in red (indicating that a rejection is occurring). This looping effect 630 may include redrawing the perimeter of the dynamic button 606D in a counterclockwise animated fashion, replacing the original color of the perimeter with another color (such as red). In FIG. 6L, the looping effect 630 has now completely encircled the perimeter of dynamic button 606D. In FIG. 6M, an indication that the underlying application action has been completed may be displayed inside the dynamic button 606D. This may include presenting, for example, text and/or symbols indicating that the underlying application action has completed successfully. In some example embodiments, if the underlying application action was not successful, an error message or other negative indicator could be displayed inside the dynamic button 606D at this stage.

Figure 7:
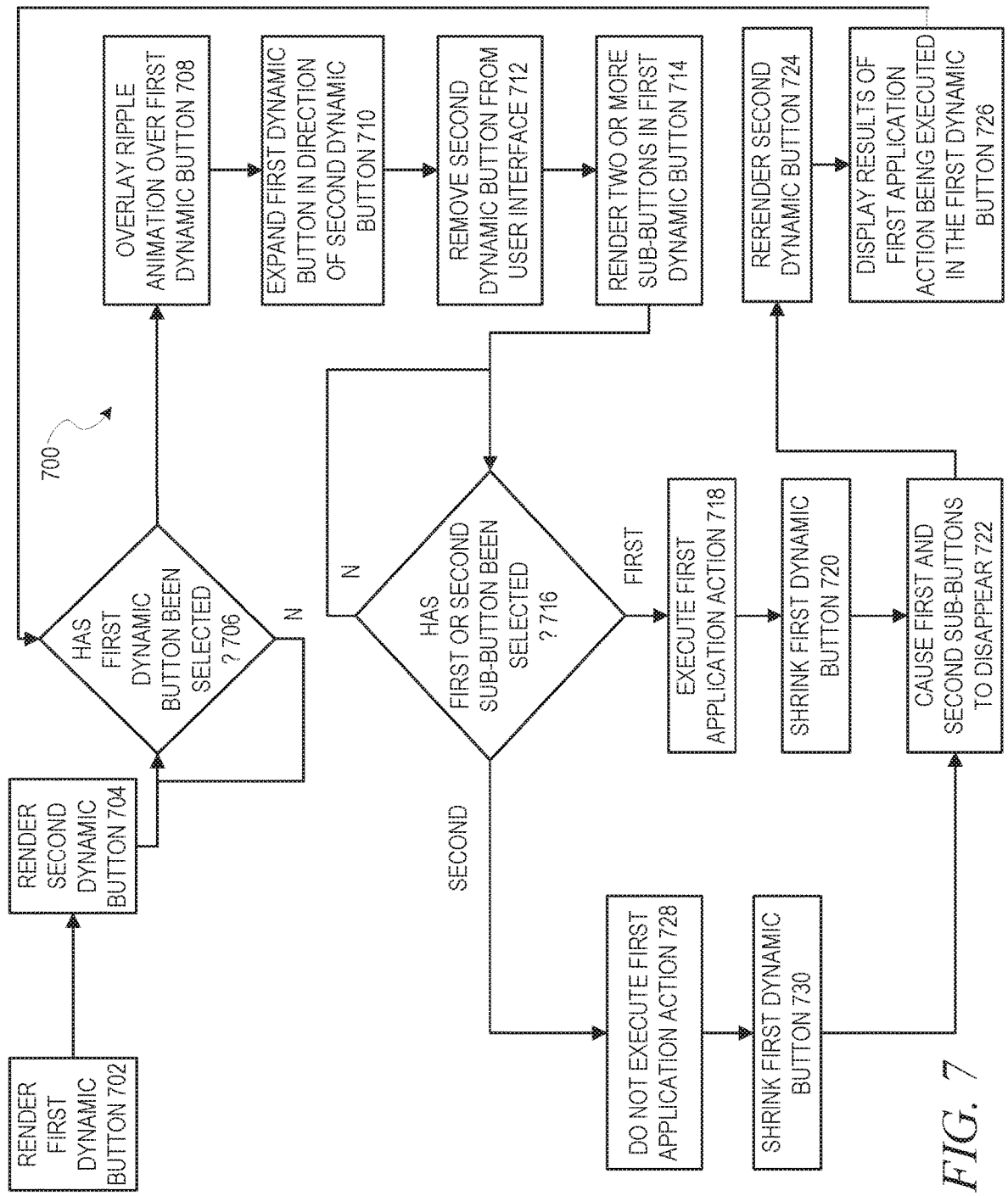
FIG. 7 is a flow diagram illustrating a method for providing a first dynamic button in a user interface in accordance with the third example embodiment.

FIG. 7 is a flow diagram illustrating a method 700 for providing a first dynamic button in a user interface in accordance with the third example embodiment. At operation 702, the first dynamic button is rendered as a dynamic button user interface element in the user interface. This rendering may include rendering the first dynamic button in such a manner that a first application action caused by selection of the first dynamic button is conveyed. This may include, for example, placing the title of the first application action (e.g., delete all, approve all, etc.) in the rendering of the first dynamic button, but could also or alternatively include using symbols to indicate the first application action (e.g., an "X" with a circle to denote deletion).

At operation 704, a second dynamic button is rendered as a dynamic button user interface element in the user interface.

This rendering may include rendering the second dynamic button in a manner that a second application action caused by selection of the second dynamic button is conveyed. The second application action may be, in some example embodiments, opposite of the first application action (e.g., if the first application action is to accept a request, the second application action may be to deny the request). This may include, for example, placing the title of the second application action (e.g., delete all, approve all, etc.) in the rendering of the second dynamic button, but could also or alternatively include using symbols to indicate the second application action (e.g., an "X" with a circle to denote deletion). In some example embodiments, the second dynamic button is rendered near, but not touching, the first dynamic button.

At operation 706, it is determined if selection of the first dynamic button through user input to the user interface is detected. If not, then the method 700 loops until such a selection is detected. Once the selection is detected, at operation 708 a ripple animation effect is overlaid on the first dynamic button in the corresponding dynamic button user interface element in the user interface. At operation 710, the first dynamic button expands in the direction of the second dynamic button, until the first dynamic button has a perimeter that includes at least a portion of a perimeter of the second dynamic button. In some example embodiments, this portion may include three of four sides of the second dynamic button.

At operation 712, the second dynamic button is removed from the user interface. At operation 714, two or more sub-buttons are rendered in the dynamic button user interface element corresponding to the first dynamic button in the user interface.

The first of these sub-buttons may confirm the first application action if selected, while the second of these sub-buttons may deny the first application action if selected. At operation 716, it is determined if the first or second sub-button is selected, or if neither is selected. If neither is selected, the method 700 loops until a selection is detected.

If the first sub-button is selected, then at operation 718 the first application action is executed. This may include, for example, the user interface sending a request to the underlying application to execute the action, or alternatively the user interface may be able to directly execute the action (such as, for example, in the case of a browser rendering a web page containing scripting elements that can be triggered by the user interface). At operation 720, the first dynamic button shrinks. At operation 722, the first and second sub-buttons disappear. At operation 724, the second dynamic button reappears. At operation 726, the results of the first application action being executed are displayed in the first dynamic button.

If at operation 716 it is determined that the second sub-button is selected, then at operation 728, the first application action is not executed (this may include, in some example embodiments, cancelling the first application action if it has not been executed). At operation 730, the first dynamic button shrinks.

The method 700 may then proceed to operation 722.

It should be noted that the ordering of many of the operations is not strict, and indeed portions of these operations may be performed simultaneously with other portions, especially when effects are being presented (e.g., the ripple animation effect occurring while the first dynamic button is growing).

Figure 8A:
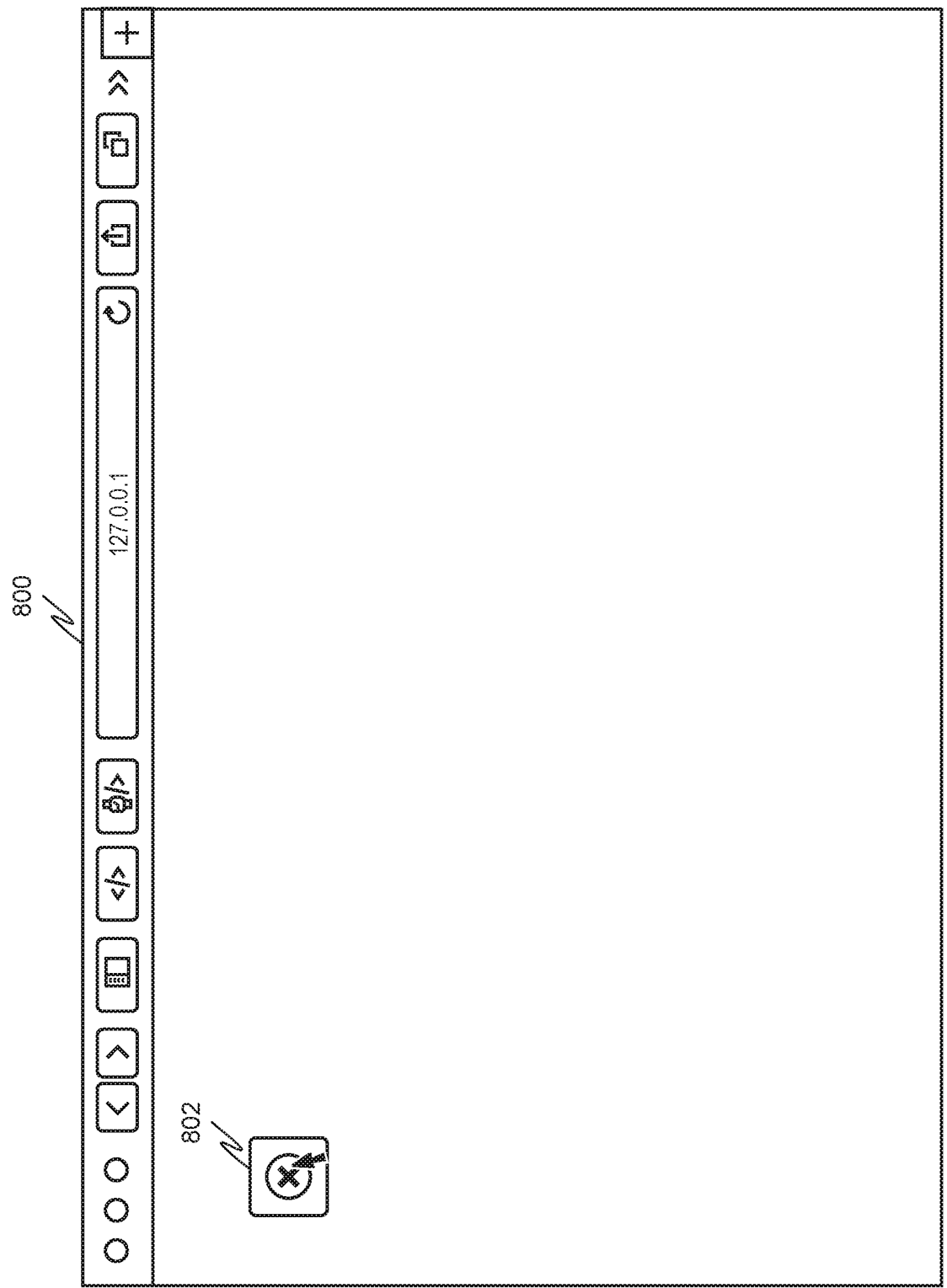

FIGS. 8A-8F are screen captures depicting different frames of a sequence of interacting with a dynamic button in accordance with a fourth example embodiment. Referring first to FIG. 8A, a browser window 800 includes a dynamic button 802. Here, the dynamic button 802 is initially depicted as an "X" with a circle around it. This indicates to the user that selecting the dynamic button 802 will cause removal or deletion of some item in the browser window 800. Such an act of removal or deletion may require a confirmatory action on the part of the user to confirm that the indicated action should be taken. In prior art solutions, selection of such a button would launch a separate confirmation dialog that may cover up relevant contextual information, or may otherwise create problems for the user.

In an example embodiment, rather than a separate confirmation dialog, selection of the dynamic button 802 causes a sequence of operations, including operations causing the selected dynamic button to morph into a different shape that provides the ability for the user to execute the confirmation action from within the dynamic button 802 itself. Additionally, transition animations may be used to convey to the user that selection of the button has occurred as well as to indicate that the button is not being removed but is actually just changing into a different shape.

Figure 8B:
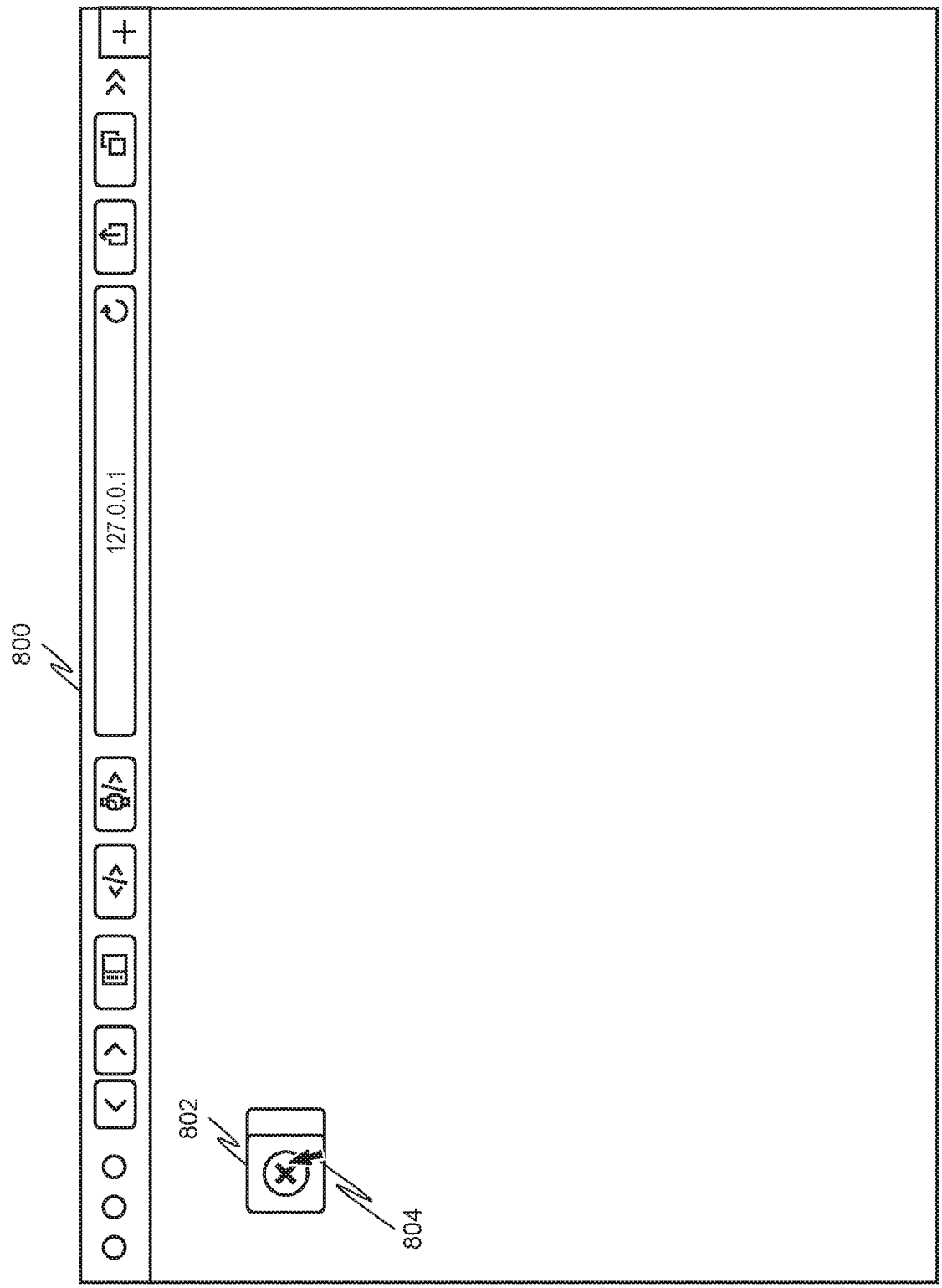

Referring now to FIG. 8B, here the user has now selected dynamic button 802, which begins to grow horizontally towards the right. This selection may have occurred, for example, by the user depressing a mouse button while the cursor 804 hovered over dynamic button 802.

Figure 8D:
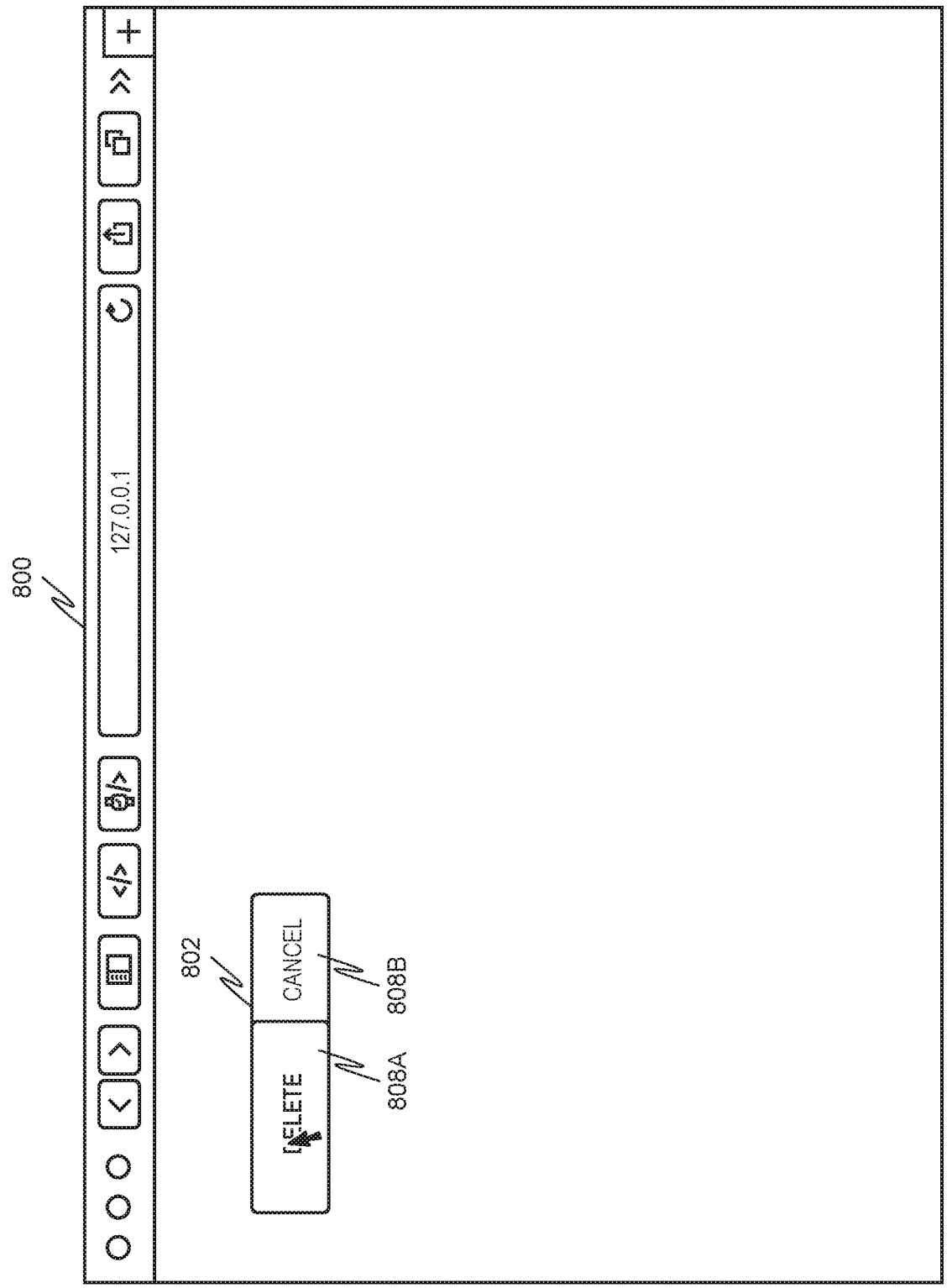

In FIG. 8C, dynamic button 802 continues to grow, and the "X" in the dynamic button 802 begins to fade. As the "X" fades, new text ("Delete") fades in in what is now a first sub-button 808A in the dynamic button 802. In FIG. 8D dynamic button has almost finished growing and the new text "Delete" has completely faded in, and new text "Cancel" begins to fade in in what is now a second sub-button 808B in the dynamic button 802.

Notably, the sub-buttons 808A, 808B have both formed within the area of the dynamic button 802. In the underlying user interface, the sub-buttons 808A, 808B are both part of the UI element dedicated to the dynamic button 802, and thus are not independent UI elements from the dynamic button 802, such as would be the case if sub-buttons 808A, 808B had replaced dynamic button 802 or been overlaid on top of dynamic button 802.

Figure 8E:
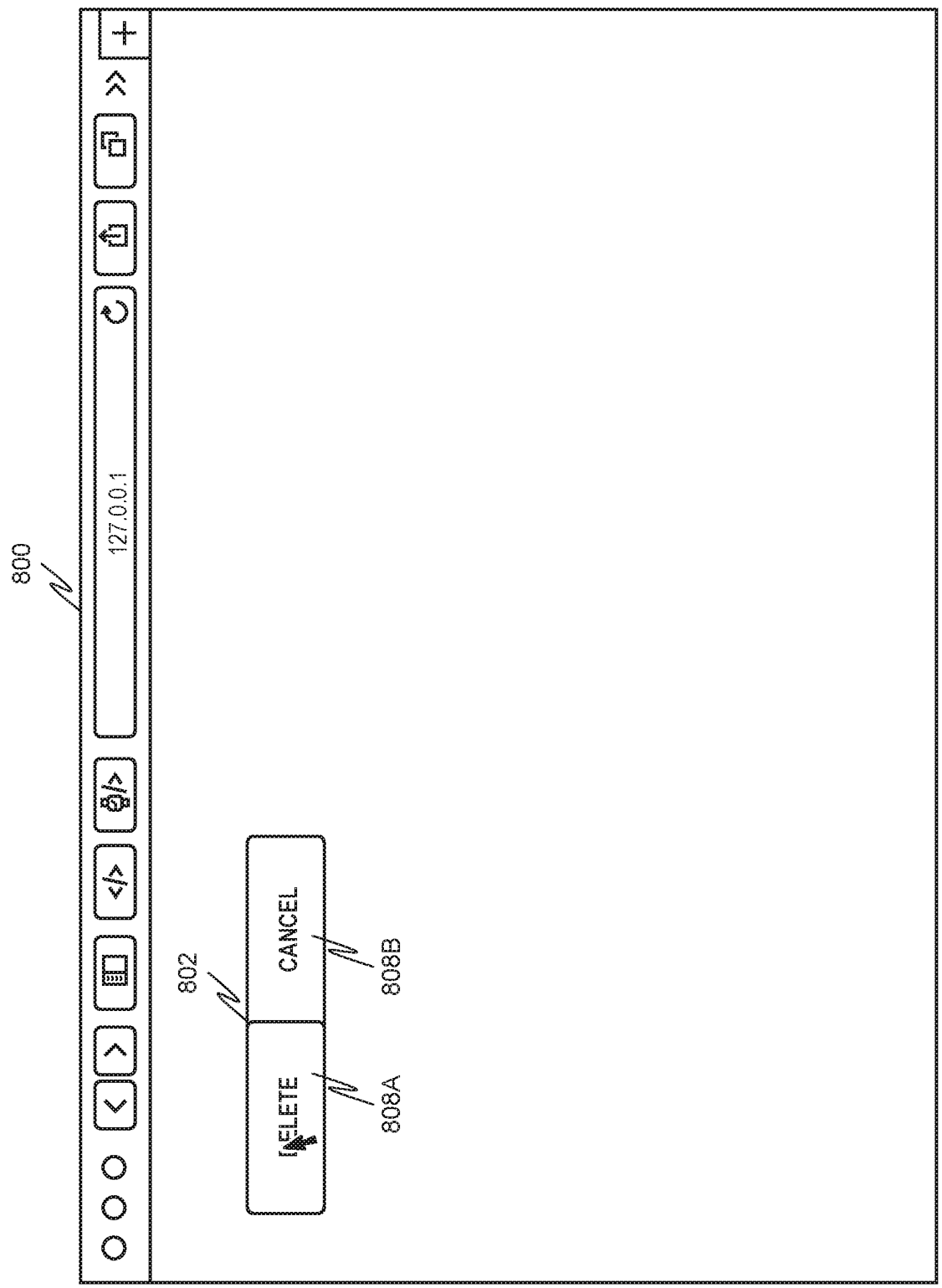
Figure 8F:
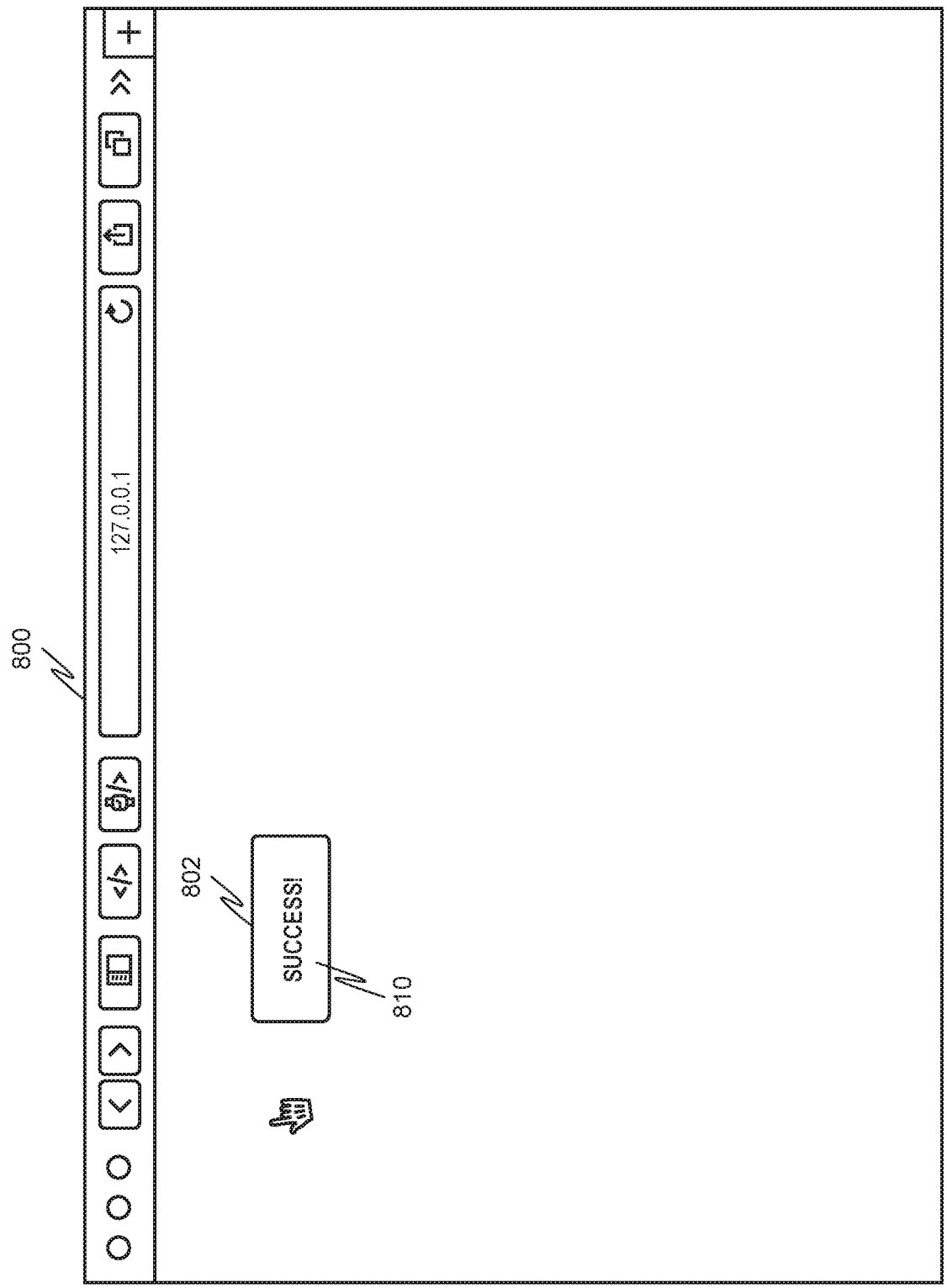

Referring now to FIG. 8E, the dynamic button has finished growing and the text "Cancel" has now completely faded in. The user then selects sub-button 808A, indicating a desire to confirm the deletion operation. This also causes the dynamic button 802 to begin to shrink, beginning with sub-button 808B. The shrinking of dynamic button 802 continues while the text in the dynamic button 802 also fades and is replaced by confirmation text 810 (e.g., "Success!") in FIG. 8F. Confirmation text 810 indicates successful operation of the underlying application action. Of course, if the underlying application action was not successfully performed, then an error or other denial message could be displayed here. Notably, this confirmation text 810 appears inside the dynamic button 802.

After a preset time period, the dynamic button 802 may then begin to shrink back down to its original form, replacing the confirmation text 810 with the original "x" symbol.

FIG. 9 is a flow diagram illustrating a method 900 for providing a dynamic button in a user interface in accordance with the fourth example embodiment. At operation 902, the dynamic button is rendered as a dynamic button user interface element in the user interface. This rendering may include rendering the dynamic button in such a manner that an application action caused by selection of the dynamic button is conveyed. This may include, for example, placing the title of the application action delete, add, etc.) in the rendering of the dynamic button, but could also or alternatively include using symbols to indicate the application action (e.g., an "X" with a circle to denote deletion).

At operation 904, it is determined if selection of the button through user input to the user interface is detected. If not, then the method 900 loops until such a selection is detected. Once the selection is detected, at operation 906, the dynamic button expands. At operation 908, two or more sub-buttons are rendered in the dynamic button user interface element in the user interface.

The first of these sub-buttons may confirm the application action if selected, while the second of these sub-buttons may deny the application action if selected. At operation 910, it is determined if the first or second sub-button is selected, or if neither is selected. If neither is selected, the method 900 loops until a selection is detected.

If the first sub-button is selected, then at operation 912 the application action is executed. This may include, for example, the user interface sending a request to the underlying application to execute the action, or alternatively the user interface may be able to directly execute the action (such as, for example, in the case of a browser rendering a web page containing scripting elements that can be triggered by the user interface). At operation 914, the dynamic button shrinks. At operation 916, the first and second sub-buttons disappear. In some example embodiments, the dynamic button may also disappear, such as where the application action is a delete action and the dynamic button no longer has relevance given the deletion (e.g., its corresponding line in the user interface has been removed).

At operation 918, the first dynamic button displays an indication that the application action has been executed. At operation 920, after a preset time period, the indication that the application action has been executed is removed, and the first dynamic button is rendered at operation 902.

If at operation 910 it is determined that the second sub-button is selected, then at operation 922, the application action is not executed (this may include, in some example embodiments, cancelling the application action if it has not been executed). At operation 924, the dynamic button shrinks. At operation 926, the first and second sub-buttons disappear. At operation 928, the first dynamic button displays an indication that the application action has not been executed. At operation 930, after a preset time period, the indication that the application action has not been executed is removed, and the first dynamic button is rendered at operation 902.

It should be noted that the ordering of many of the operations is not strict, and indeed portions of these operations may be performed simultaneously with other portions, especially when effects are being presented (e.g., the ripple animation effect occurring while the dynamic button is growing).

Figure 10:
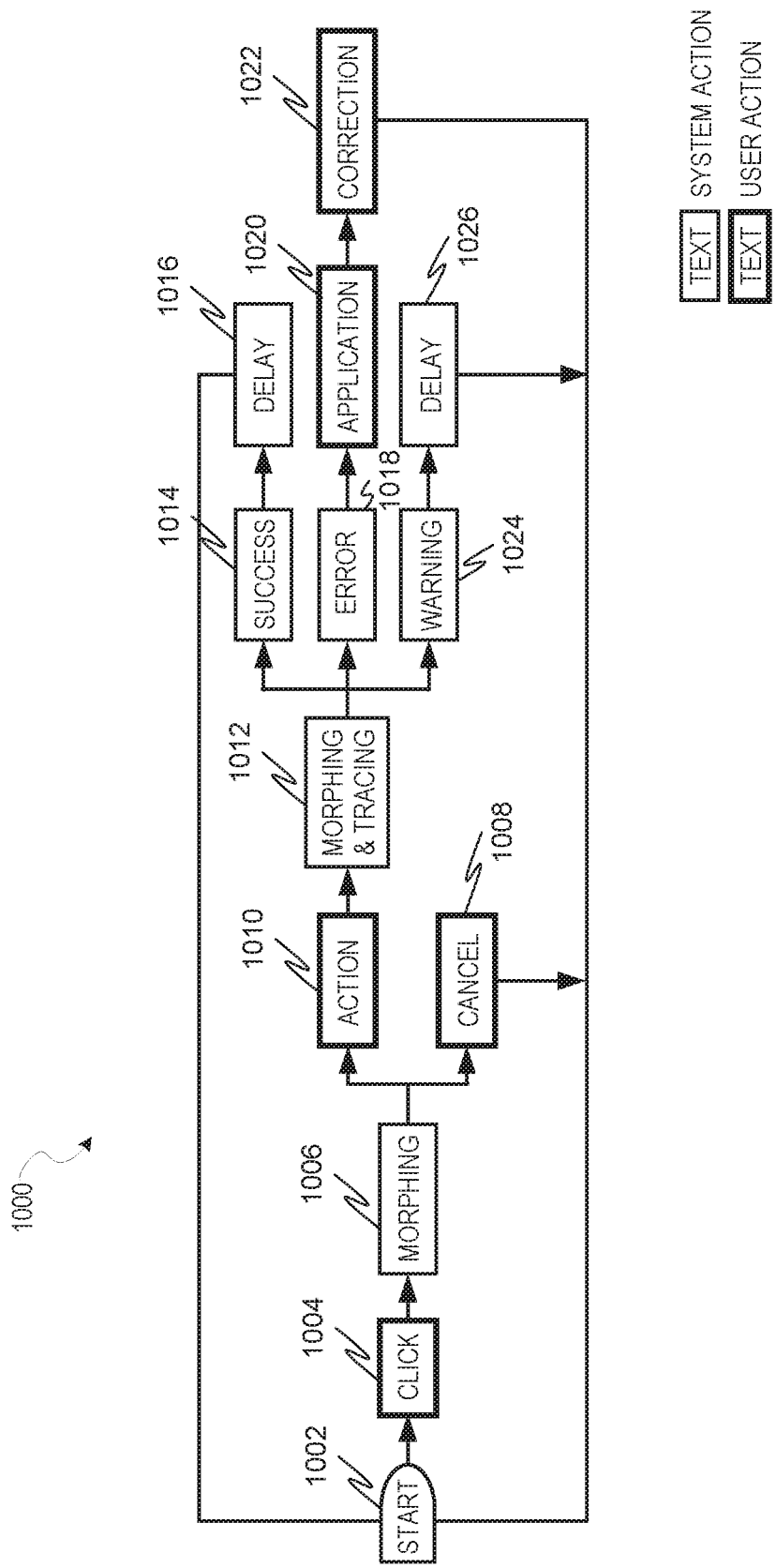
FIG. 10 is a flowchart depicting a dynamic button flow in accordance with an example embodiment.

FIG. 10 is a flowchart depicting a dynamic button flow 1000 in accordance with an example embodiment. At operation 1002, the dynamic button flow 1000 begins. This may include rendering the dynamic button in a graphical user interface. At operation 1004, a click command is received from a user via the graphical user interface. This click command indicates selection of the dynamic button. Notably, for purposes of this disclosure, any command indicating a selection of the dynamic button will be considered a click, even if the action does not involve pressing a mouse button, such as by tapping a touchscreen. At operation 1006, morphing is performed to change the dynamic button into two sub-buttons, an action sub-button and a cancel sub-button.

At operation 1008, the user has selected the cancel sub-button and the dynamic button flow 1000 returns to operation 1002. Alternatively, at operation 1010 the user has selected the action sub-button, and at operation 1012, the action sub-button morphs and is traced (the looping effect described earlier) while the underlying application action is executed.

There are three possible outcomes of the execution of the underlying action: success, error, and warning. At operation 1014, if the underlying action is successful, a success message is displayed in the dynamic button, followed by a delay 1016. Then the dynamic button flow 1000 returns to operation 1002. At operation 1018, if the underlying action produces an error, then an error message is displayed in the dynamic button, at operation 1020 the user accesses the application, and at operation 1022 corrects the error. Then the dynamic button flow 1000 returns to operation 1002. At operation 1024, if the underlying action produces a warning, then the warning is displayed in the dynamic button, followed by a delay 1026. Then the dynamic button flow 1000 returns to operation 1002.

Figure 11:
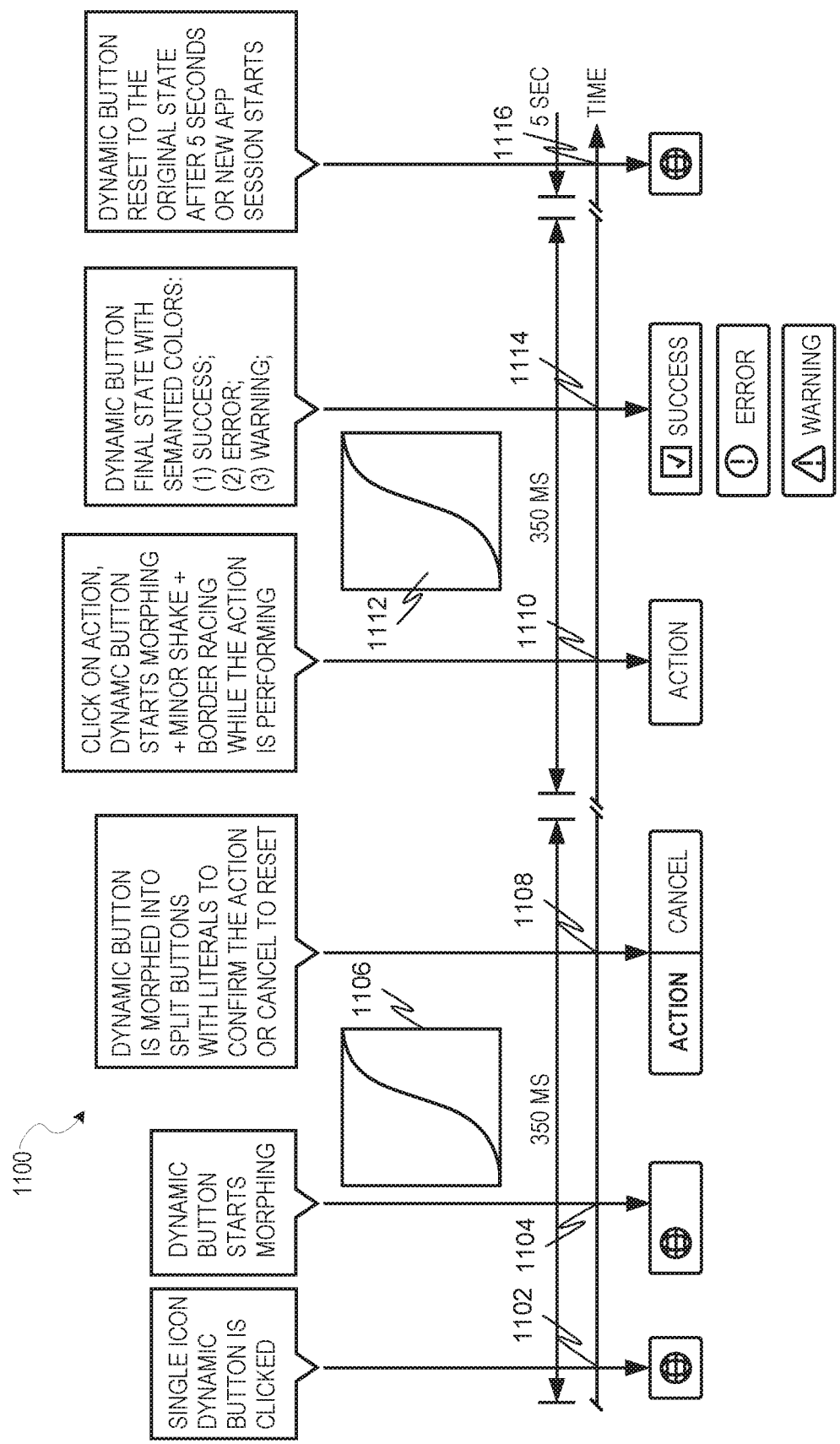
FIG. 11 is a diagram illustrating a lifecycle of a dynamic button in accordance with an example embodiment.

FIG. 11 is a diagram illustrating lifecycle 1100 of a dynamic button in accordance with an example embodiment. The lifecycle 1100 is depicted as a timeline from left to right, with the visual depiction of the dynamic button shown at the bottom of the figure. At time 1102, the single icon dynamic button is clicked. At time 1104, the dynamic button begins morphing, here growing. Then a delay 1106 occurs while the dynamic button morphs into two sub-buttons. At time 1108, the dynamic button icon has morphed into split buttons with literals to confirm the action or cancel to reset. At time 1110, the user has clicked on the action sub-button. Which causes the button to begin to morph, shake, and also have border tracing (looping effect) while the action is performing. A delay 1112 occurs while all these animations are occurring. At time 1114, the dynamic button is in its final state with semantic colors indicating (1) success; (2) error; or (3) warning. After a time has elapsed (e.g., 5 seconds) or a new application session begins, at time 1116, the dynamic button resets to the original state.

Figure 12:
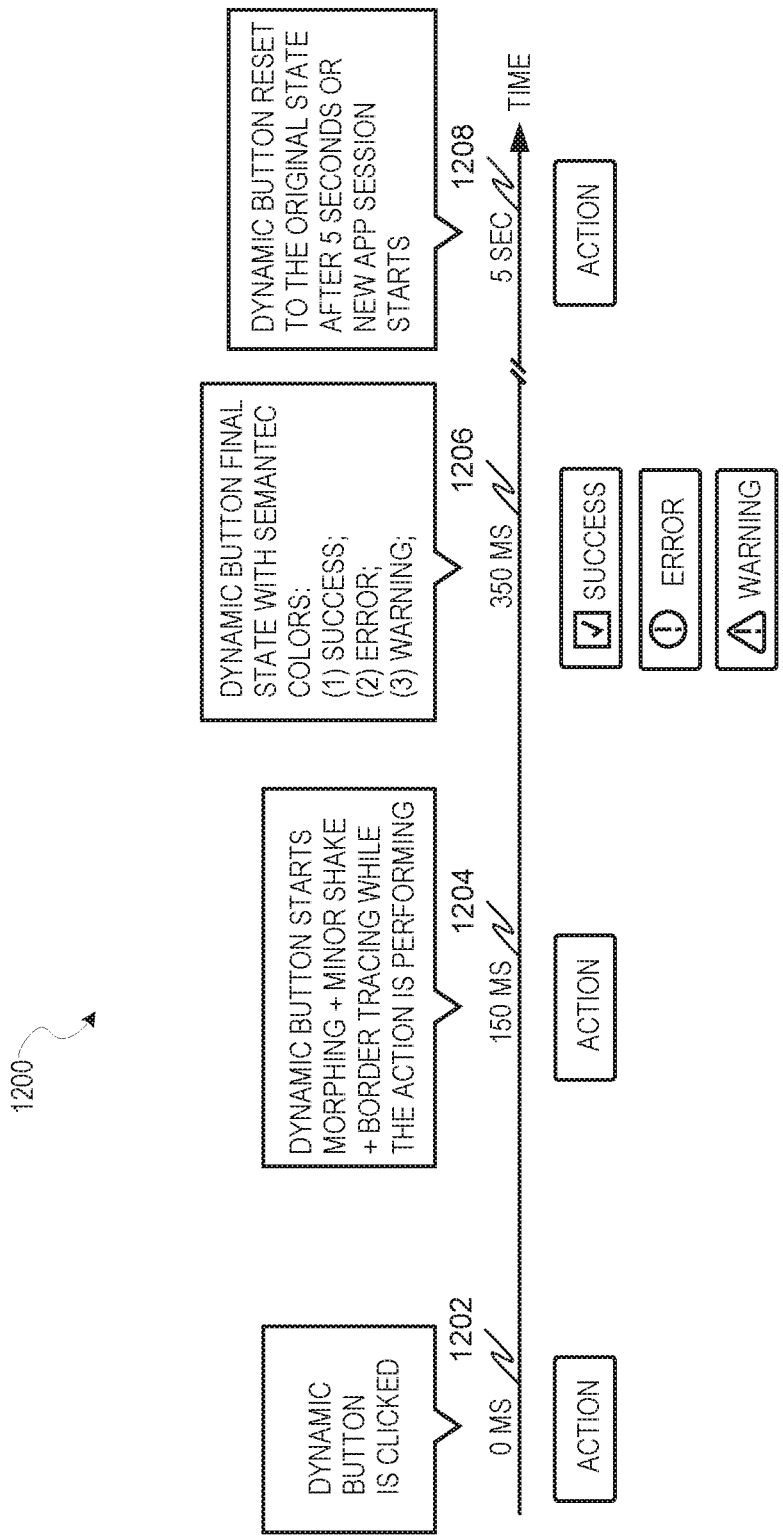
FIG. 12 is a diagram illustrating an alternative lifecycle of a dynamic button in accordance with another example embodiment.
Figure 14A:
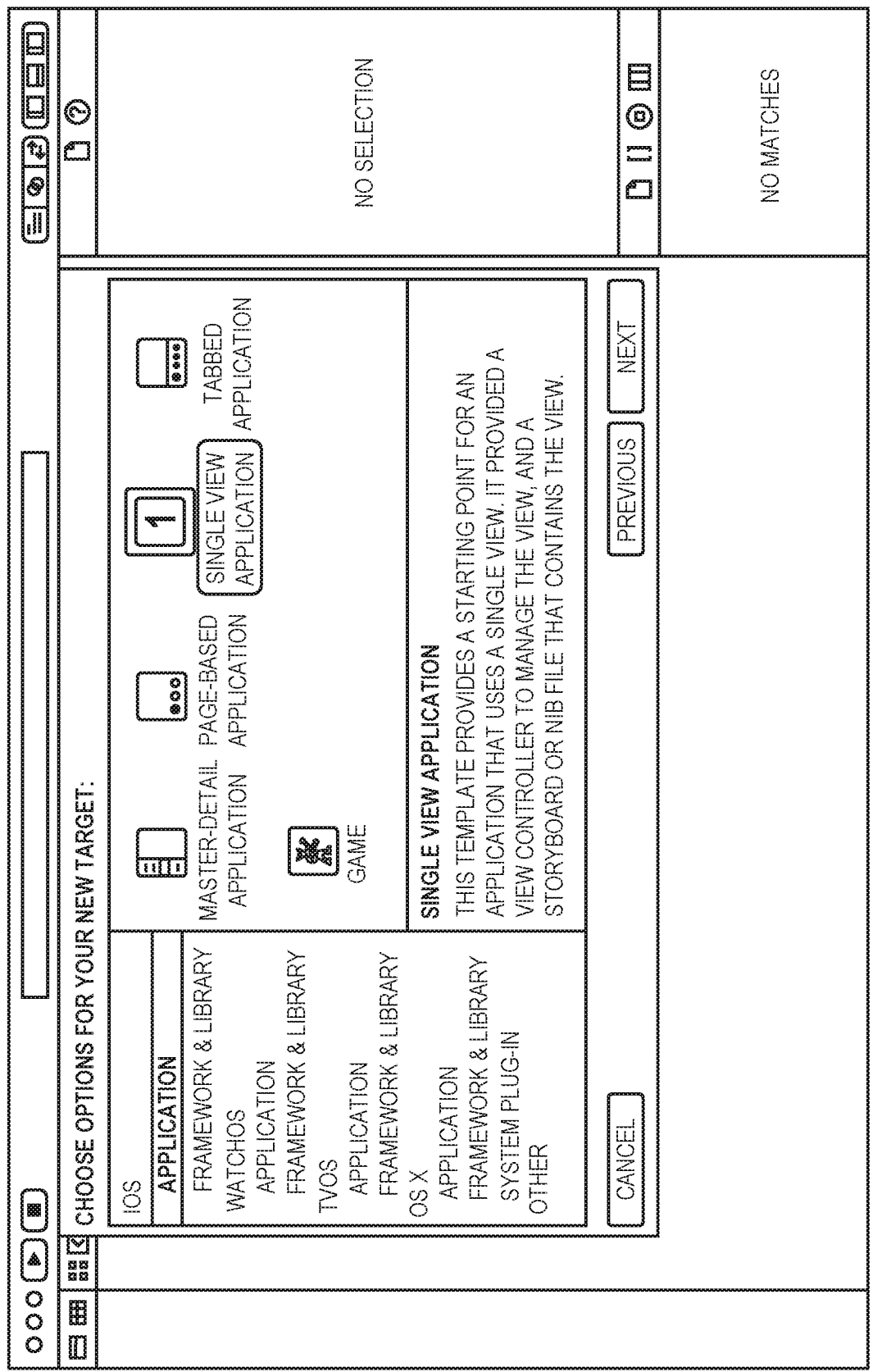
Figure 14B:
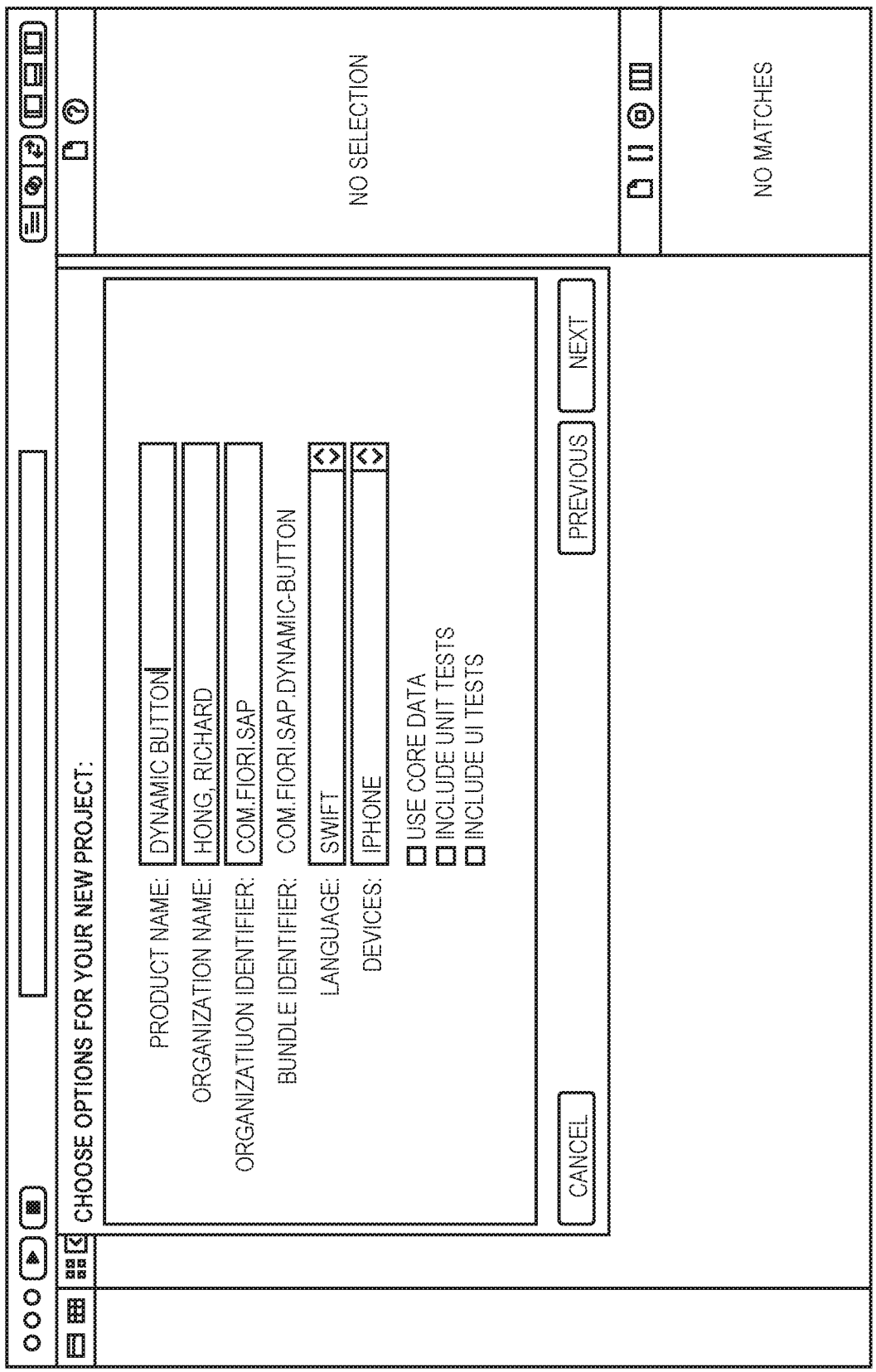
Figure 14D:
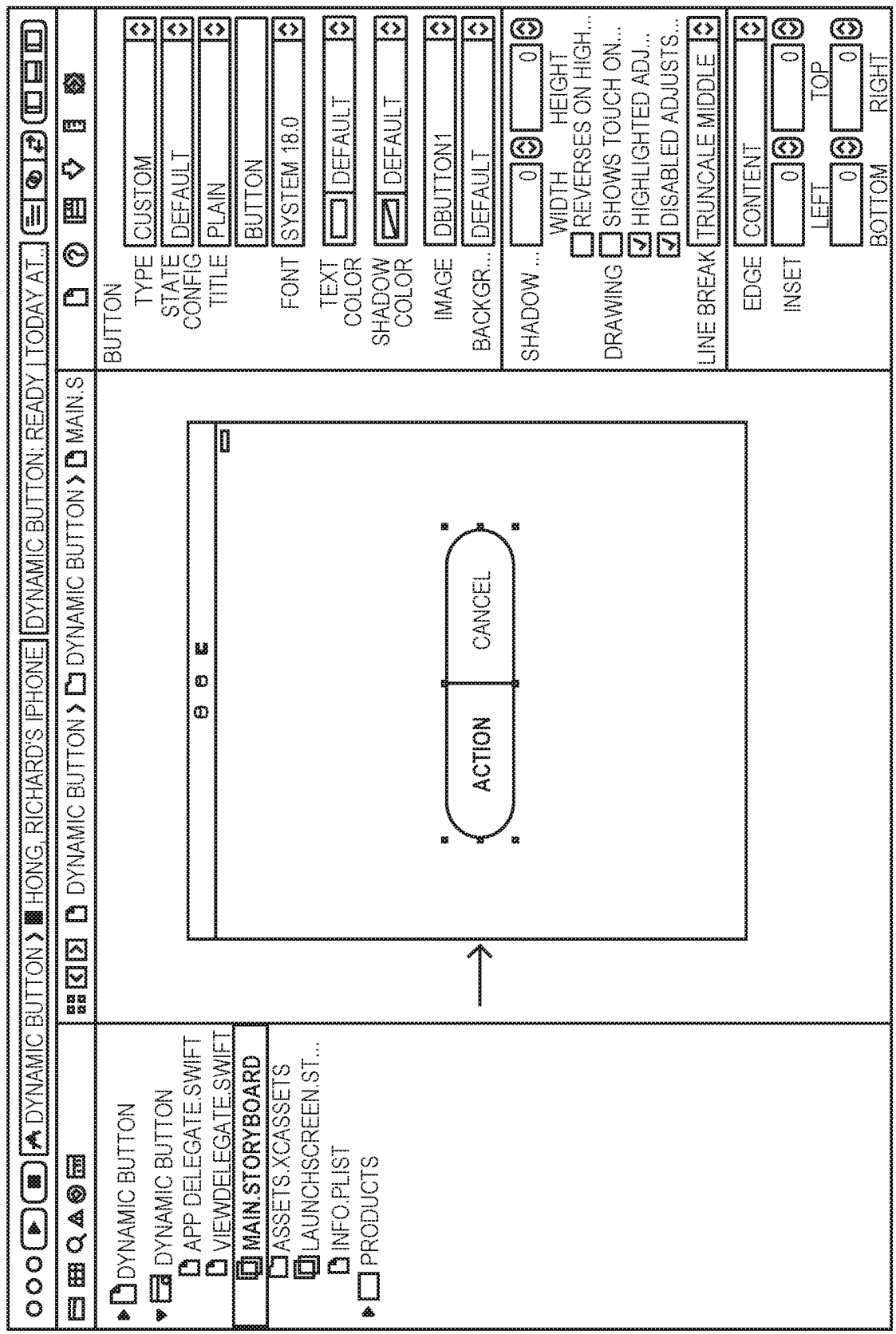

FIG. 12 is a diagram illustrating an alternative lifecycle 1200 of a dynamic button in accordance with another example embodiment. In this embodiment, no action confirmation is used. At time 1202, the dynamic button is clicked. At time 1204, the dynamic button starts morphing, shaking, and having border tracing performed. At time 1206, the dynamic button is in its final state with semantic colors indicating (1) success; (2) error; or (3) warning. After a time has elapsed (e.g., 5 seconds) or a new application session begins, at time 1208, the dynamic button resets to the original state.

In various example embodiments, the animation transition follows a mathematical pattern of a cubic Bezier curve. A Bezier curve is a parametric curve. When used in the time domain, it tends to smooth cursor trajectory in eye gaze-controlled interfaces. For example, a Bezier curve can be used to specify the velocity over time of an object such as an icon moving from A to B, rather than simply moving at a fixed number of pixels per step. A cubic Bezier curve is defined by four points in a plane. The curve starts at the first point, going towards the second point, and arrives at the fourth point coming from the direction of the third point. Typically it will not pass through the second or third points as these points provide directional information. The distance between the first and the second points determines "how far" and "how fast" the curve moves towards the second point before turning towards the third point.

As described briefly above, the dynamic button is not limited to Javascript or other web browser implementations. Embodiments are foreseen for any type of graphical user interface. Example uses include inline actions, table row level actions, simplified workflows, user interfaces where space is a concern (e.g., mobile applications). Example graphical user interfaces include stand-alone application graphical user interfaces, where the methods described above may be designed into the application graphical user interface itself. Additionally, non-Javascript browser implementations are also foreseen where, for example, the dynamic buttons are integrated into the web page itself or are part of a plug-in or other component of the web browser as opposed to being implemented in a scripting language.

FIGS. 13A-13C are diagrams illustrating code for a dynamic button control applied in a web application in accordance with example embodiments. Here, an embodiment of the web application using UI5 is provided. UI5 (also sometimes known as OpenUI5 or SAPUI5) is a Javascript UI library comprising a feature-rich core and a large number of UI controls organized into libraries. The Core includes aspects such as data bindings and models for different data sources, an efficient engine for creating and updating the code of the controls, support for a Model-View-Controller concept, support for declarative UI construction and templates, and automatic loading of appropriate language resources.

Here the code includes five different steps 1300, 1302, 1304, 1306, 1308. Referring to FIG. 13A, in the first step 1300, Bootstrapping UI5 is provided, specifying the desired UI library ("sap.m" containing the desired UI controls, the theme of the controls ("sap_bluecrystal")), and configuring the process of bootstrapping to run asynchronously. Once the core and the corresponding resources have been loaded, the core fires an init event to signal that the library is ready and can be used.

In the second step 1302, the UI5 controls are used. The code provided in this step actually performs function calls using the UI5 control that has been defined for the dynamic button.

Referring now to FIG. 13B, in the third step 1304, XML is used to separate the view declaration from the controller logic. Inside the view tax, the declarative definition of the dynamic button is added with the same properties as in the second step 1302. The XML tags are mapped to controls and the attributes are mapped to the properties of the control.

In the fourth step 1306, the controllers of the view are defined. Then, in the fifth step 1308, illustrated in FIG. 13C, data binding of two data or information sources together is performed. In this way, all changes in one source are also reflected in the other one. In data binding, a model instance and a binding instance are used. The model instance holds the data and provides methods to set the data or to retrieve the data from a server. It also provides a method for creating bindings to the data. When this method is called, a binding instance is created, which contains the binding information and provides an event, which is fired whenever the bound data changes. An element can listen to this event and update its visualization according to the new data. The UI uses data binding to bind controls to the model which holds the application data, so that the controls are updated automatically whenever application data changes.

FIGS. 14A-14E are diagrams illustrating development of an iOS™ application (also known as an "app") with a dynamic button, in accordance with an example embodiment. The iOS™ app can be developed using Swift in Xcode. The app can be run in either a device simulator or in an actual connected device. In both cases, Xcode automatically configures the app and desired extension bundles and their initial resources. These bundles are then delivered on the App Store™.

In another example embodiment, a hybrid mobile app can be developed with dynamic button control using SAPUI5 Framework. This hybrid mobile app may include a native app wrapper (e.g., PhoneGap) and an HTML viewer to display the content on the user interface. Hybrid apps have the benefit of allowing publication in app stores; also, by embedding the application code in the hybrid app and the library files in the hybrid container, the user needs to install the files only once and does not need to download them every time the application is started. Of course, since the library is installed on the user device, the library size is important, whereas in web applications the library is deployed on the server and the user device only needs to download the desired parts of the library at runtime.

Figure 15:
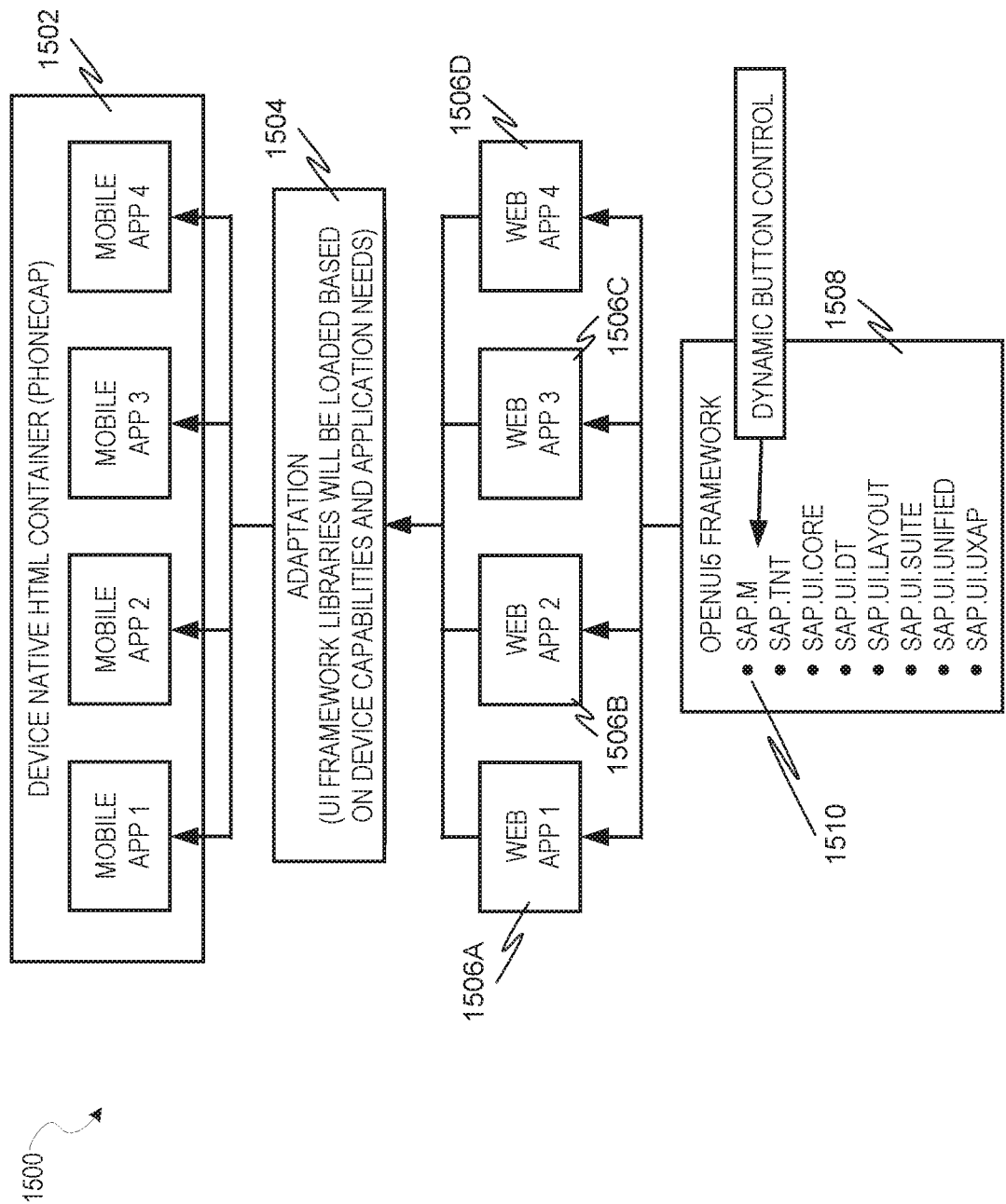
FIG. 15 is a block diagram illustrating a hybrid mobile app including a dynamic button control in accordance with an example embodiment.

FIG. 15 is a block diagram illustrating a hybrid mobile app 1500 including a dynamic button control in accordance with an example embodiment. The hybrid mobile app 1500 includes a device native HTML container 1502, such as PhoneGap, an adaptation layer 1504, and multiple apps 1506A-1506D that all utilize an OpenUI5 Framework 1508 that includes a dynamic button control 1510.

Figure 16A:
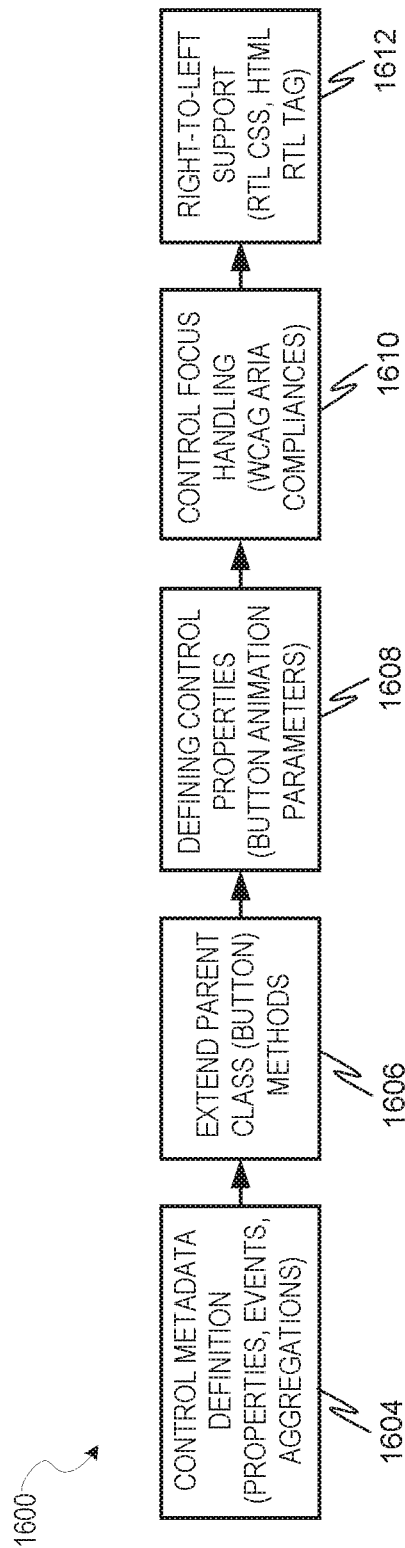

In another example embodiment, a dynamic button control may be developed to extend the UI5 framework. FIGS. 16A and 16B illustrate an example flow 1600 (16A) and code sample 1602 (16B) for such an embodiment. Similar processes can be used for other frameworks. At operation 1604, the metadata definition, including properties, events, and aggregations, can be controlled. At operation 1606, the parent class (button) methods can be extended. At operation 1608, control properties, such as button animation parameters, can be defined. At operation 1610, focus handling, including Web Content Accessibility Guidelines (WCAG) compliances, can be controlled. At operation 1612, right-to-left (RTL) support, including RTL CSS, HTML, and RTL tags, may be supported.

In another example embodiment, a watch application can be deployed that contains the dynamic button. A watch app target can be, for example, added to an existing iOS™ target, or a new iOS™ project can be created that includes a watch app. In both cases, Xcode automatically configures the watch app and WatchKit extension bundles and their initial resources. Those bundles are then delivered as part of the iOS™ app on the App Store.

Figure 17A:
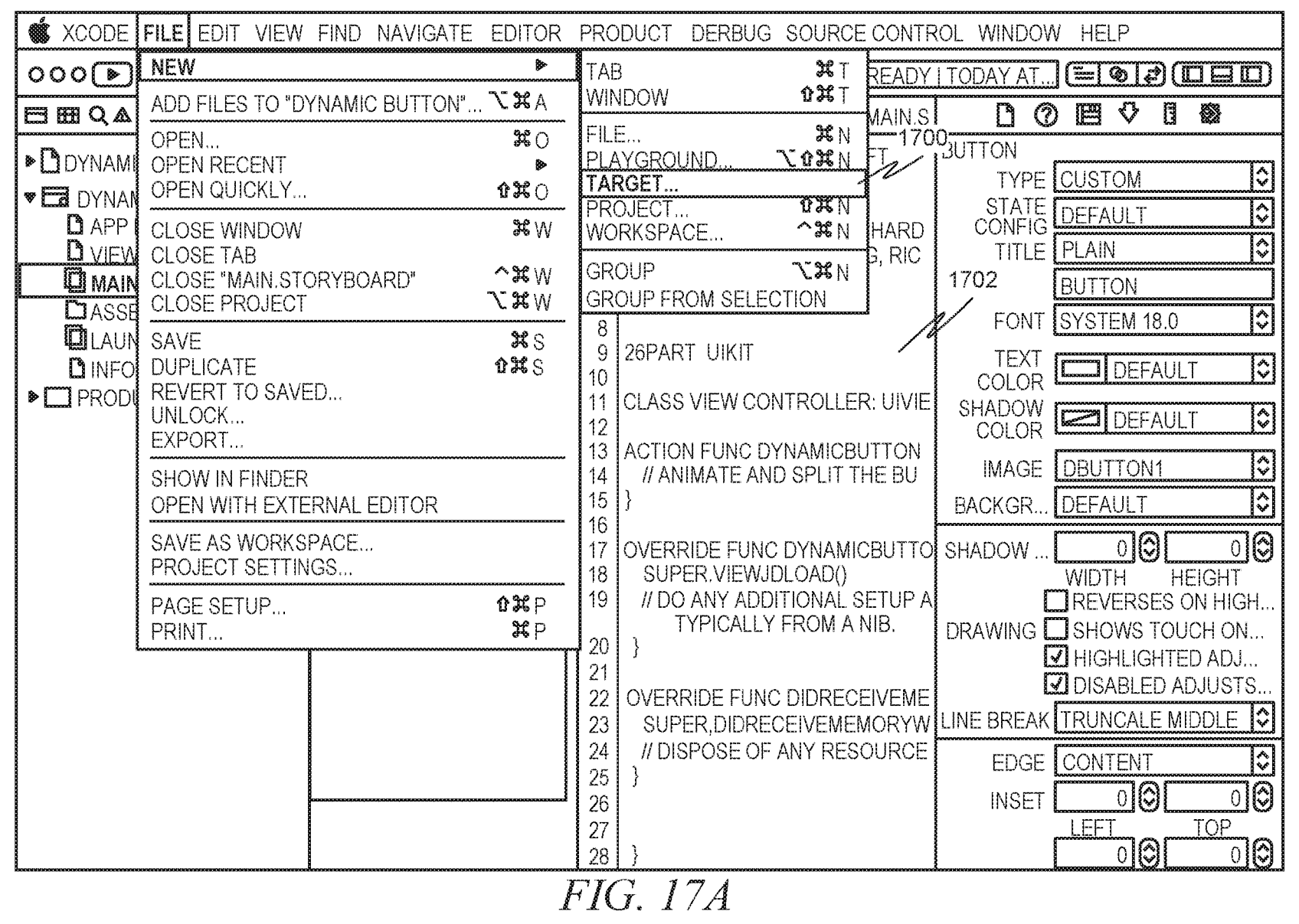
Figure 17B:
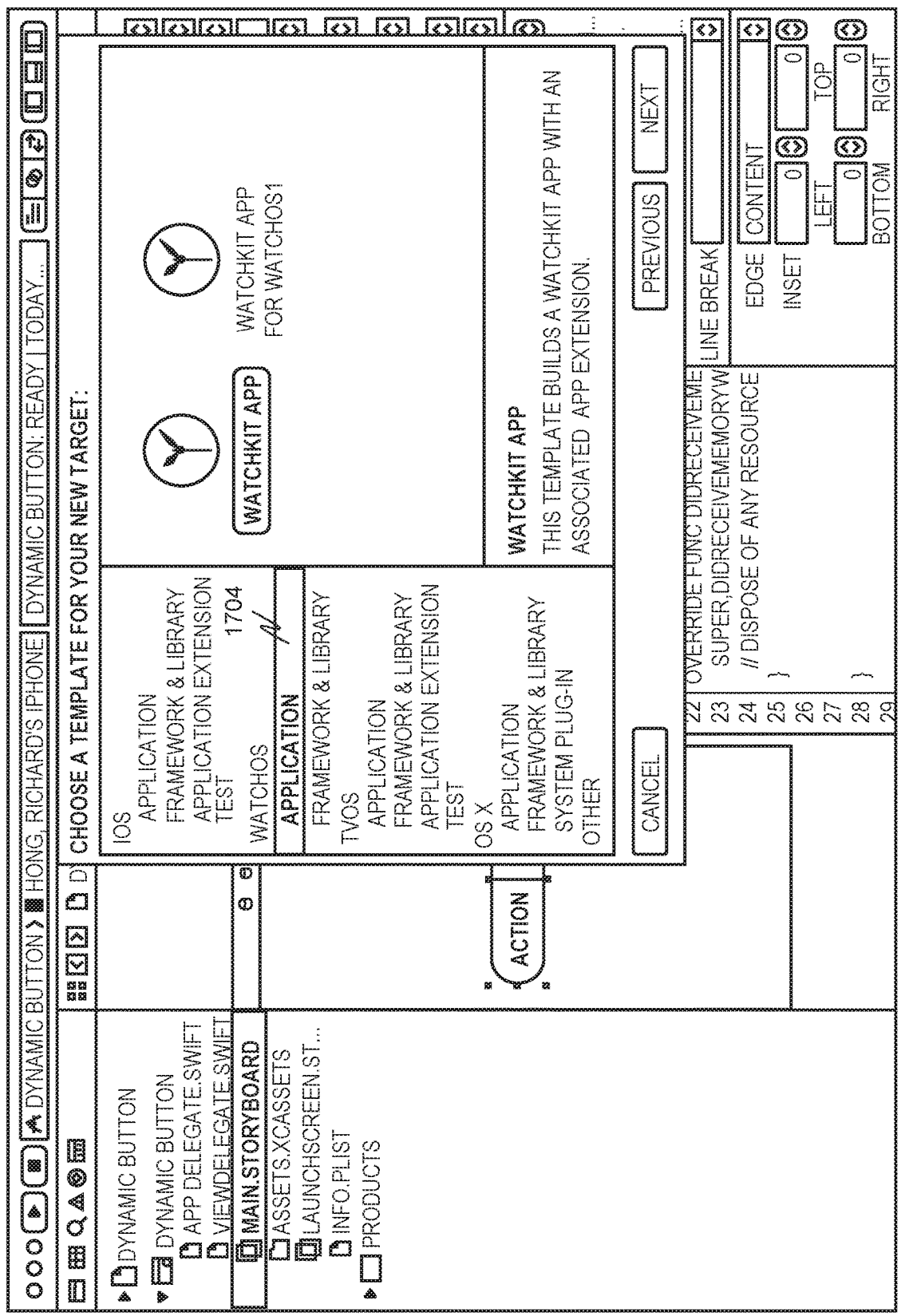
Figure 17C:
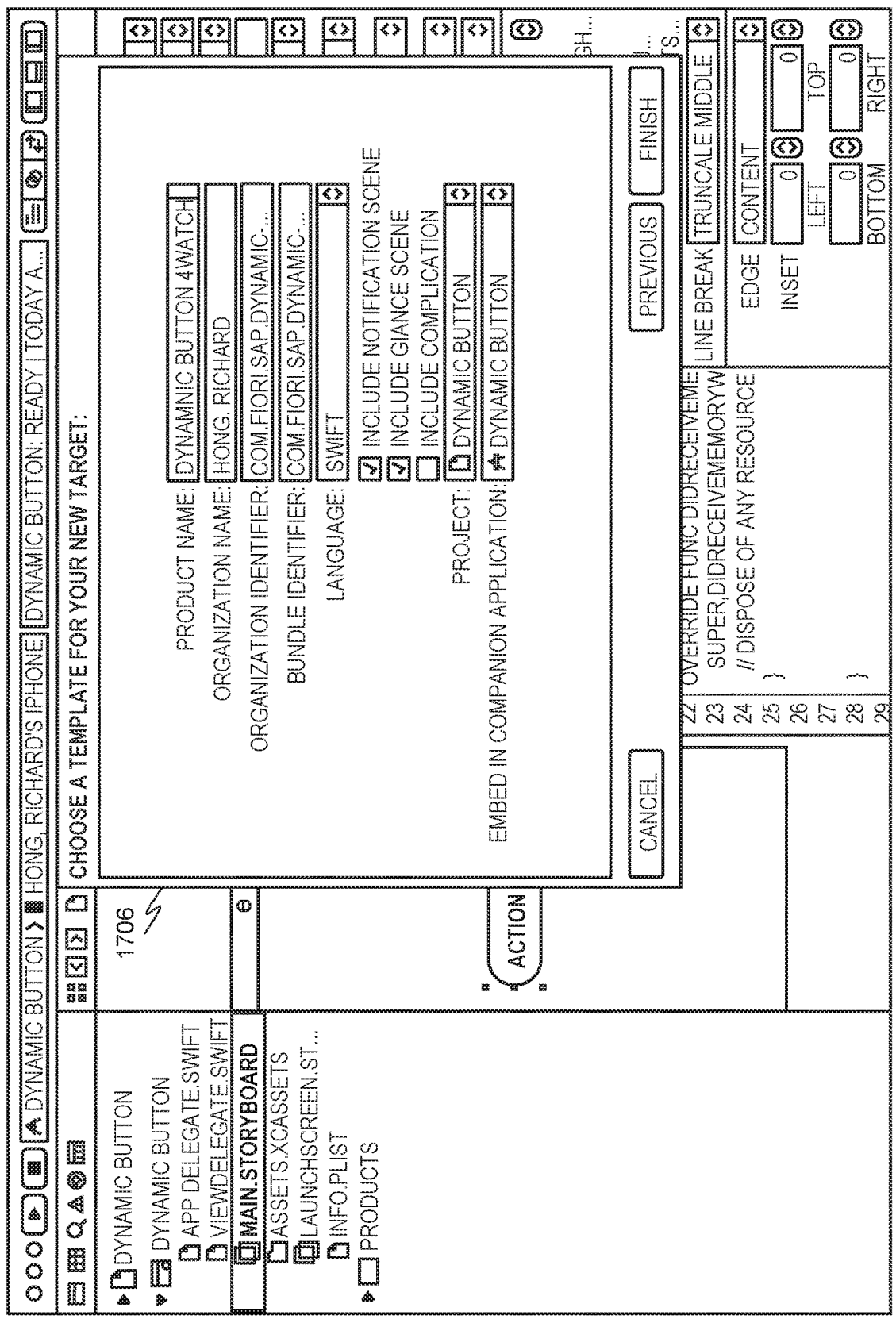
Figure 17D:
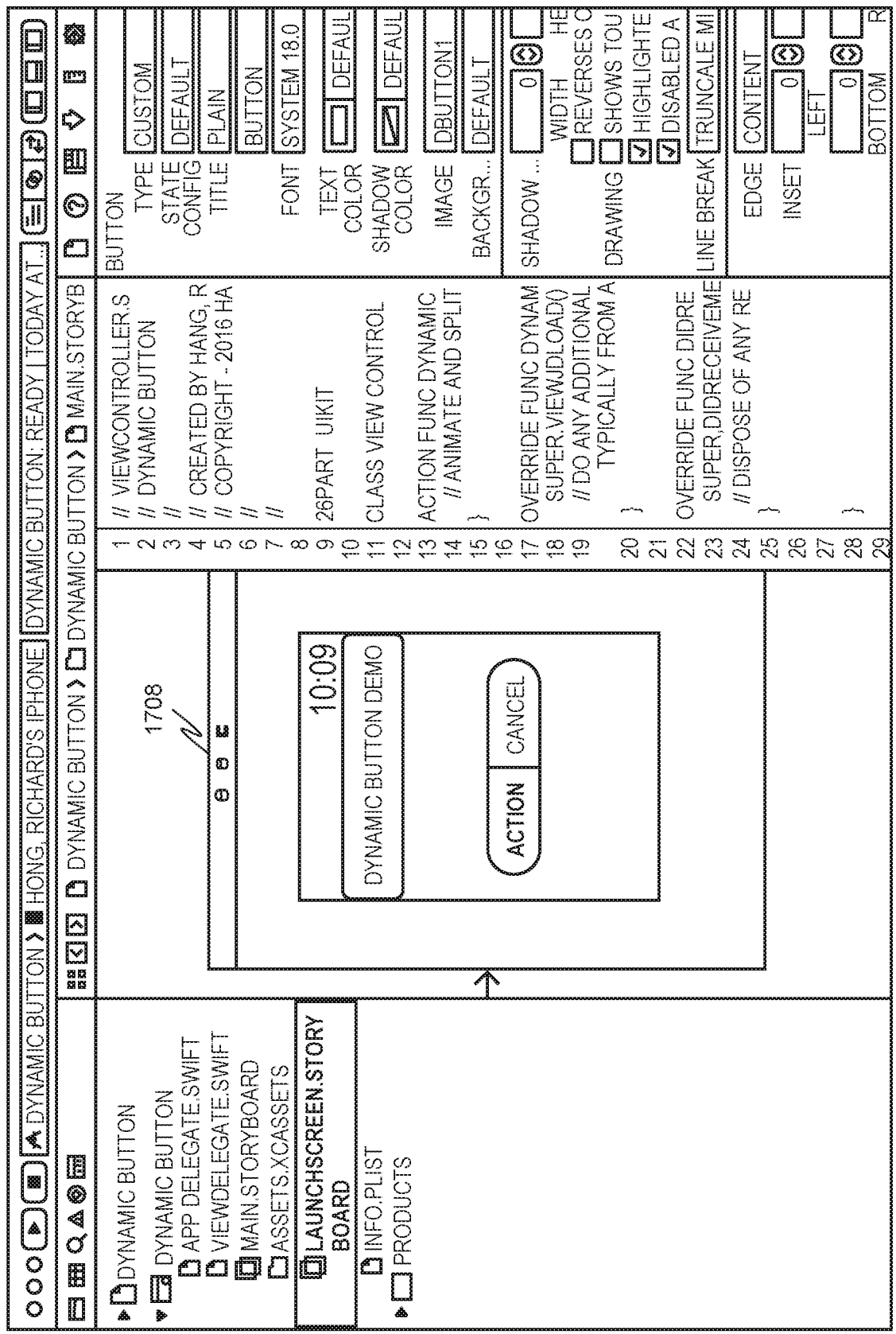

FIGS. 17A-17D are screen captures illustrating deployment of a watch application containing the dynamic button, in accordance with an example embodiment. Referring first to FIG. 17A, a developer selects target 1700 as a target application for the dynamic button control 1702. Referring to FIG. 173, a template is selected for the target application. Here, watchOS Application 1704 is selected. Referring to FIG. 17C, options 1706 for the new target 1700 may be selected. Referring to FIG. 17D, a dynamic button demo 1708 may be previewed.

Figure 18:
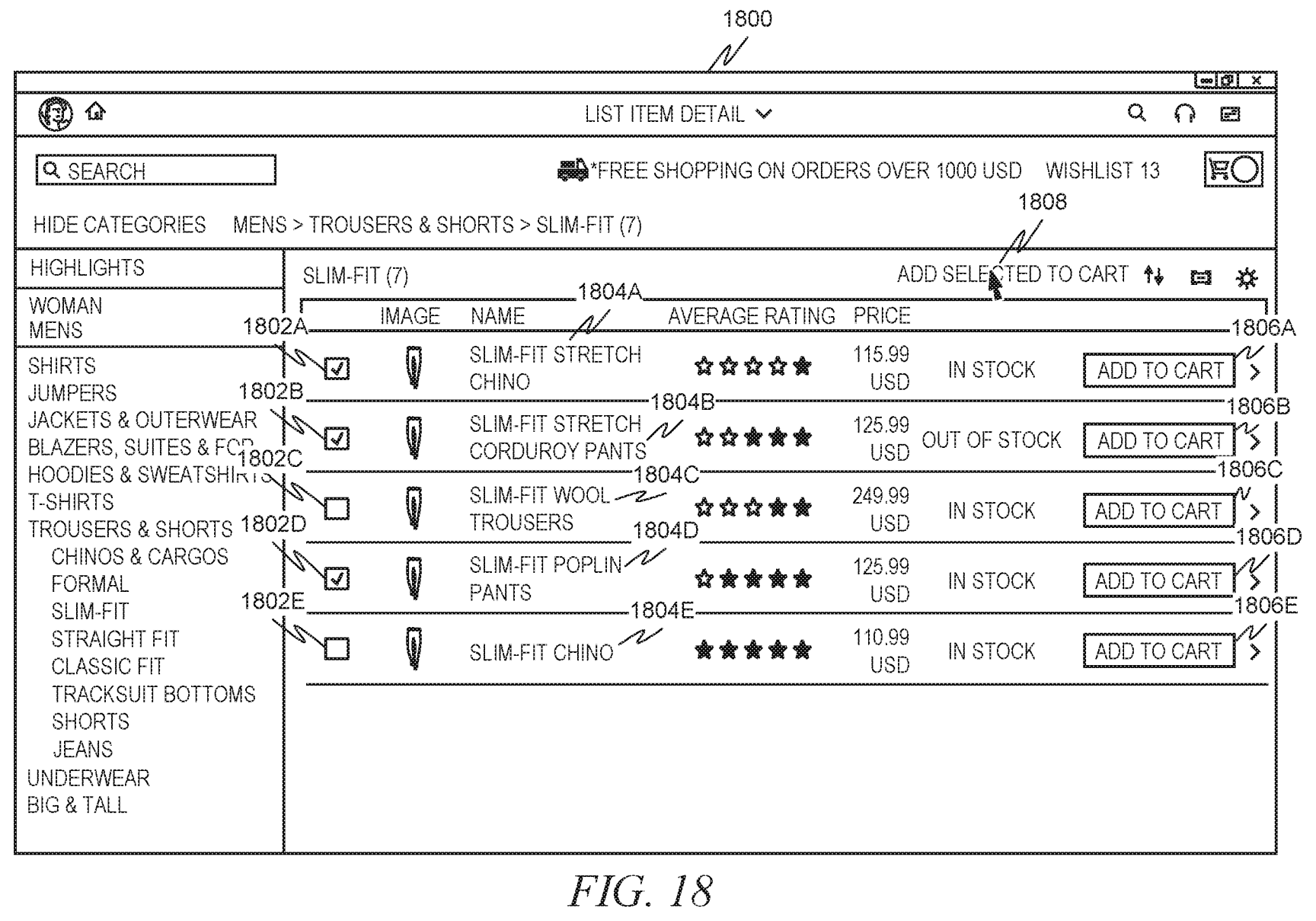

FIG. 18 is a screen capture illustrating activation of multiple dynamic buttons simultaneously in accordance with an example embodiment. User interface 1800 includes an area including checkboxes 1802A-1802E, each corresponding to a different product 1804A-1804E, respectively, and each also corresponding to a different dynamic button 1806A-1806E. The user has an option to select a dynamic button corresponding to a line item one at a time, or select one or more of the checkboxes 1802A-1802E and then press a joint activation button 1808 (here indicating "add selected to cart"). The result is that the dynamic buttons 1806A-1806E corresponding to the selected checkboxes 1802A-1802E are all selected simultaneously and proceed through their dynamic morphing and/or alerting functionality (as described in, for example, any of the preceding embodiments) simultaneously.

In a use case whereby multiple dynamic buttons are selected and different types are ultimately displayed, at about halfway through the morphing (when the dynamic button state text changes from Add to Cart to any one of Error, Warning, or Added, which is fully displayed inside the button), each of the state types display different animation sequences and durations that end in a staggered fashion. For example:

Error Type—The "Error" button, the first to start animating, rocks back and forth (right, back to level, then left, then back to its level resting place) in a seesaw fashion, bringing the user's attention to that critical state first.

Warning Type—Then after the "Error" button has rocked right then level, the "Warning" button animation starts by initially shrinking then enlarging to the default button size, ending just after the Error button animation sequence stops.

Added Type—As with the "Warning" button (after the "Error" Button has rocked right then level), the "Added" button animation starts in opposition with the Warning button animation. The Added button initially enlarges, then shrinks, then enlarges again, then finally shrinks to the default size. Because this animation sequence is two times greater than that of the Warning button, it is the last button to stop animating, which draws the user's attention to the "Add" actions last.

It should be appreciated that these subtle differences effectively provide the user with unique subliminal visual affordances for each of the button types that enable the user to differentiate between dynamic button types even though they were all initially triggered at the same time.

In some example embodiments, the morphing of multiple selected dynamic buttons may result in some of the dynamic buttons performing completely different actions or types of actions than other of the dynamic buttons. Additionally, the buttons may complete their actions at different times.

EXAMPLES

Example 1

A hybrid application comprising:
a device native container;
an adaptation layer;
one or more web applications; and
a framework including a library of controls, the library of controls including a dynamic button control configured to:
render a dynamic button as a dynamic button user interface element in a graphical user interface, the dynamic button corresponding to an application action when selected by a user via the graphical user interface;
in response to detection of selection of the dynamic button by the user via the graphical user interface:
cause the application action to be executed, producing an application action result; and
display a visual indication of the application action result inside the dynamic button user interface element.

Example 2

The hybrid application of Example 1, wherein the dynamic button control is further configured to, in response to detection of selection of the dynamic button by the user via the graphical user interface, causing a ripple effect animation to appear prior to the displaying of the visual indication, the ripple effect animation including one or more concentric circles expanding outwards from a selection area of the dynamic button until fading.

Example 3

The hybrid application of Examples 1 or 2, wherein the dynamic button control is further configured to, in response to detection of selection of the dynamic button by the user via the graphical user interface, causing a looping animation around the dynamic button user interface element prior to the displaying of the visual indication, the looping animation including a visual element encircling the dynamic button user interface element.

Example 4

The hybrid application of Example 3, wherein the looping animation is timed so that the looping animation completes one revolution around the dynamic button user interface element at the time the application action has completely finished executing.

Example 5

The hybrid application of Example 3, wherein the looping animation is depicted using a first color if the first of the sub-buttons corresponds to an approval command.

Example 6

The hybrid application of any of Examples 1 to 6, wherein the visual indication is a symbol indicating success or failure of the application action.

Example 7

The hybrid application of any of Examples 1 to 6, wherein the visual indication is a color of text indicating success or failure of the application action Example 8

A method comprising:
rendering a dynamic button as a dynamic button user interface element in a graphical user interface, the dynamic button corresponding to an application action when selected by a user via the graphical user interface;
in response to detection of selection of the dynamic button by the user via the graphical user interface:
causing the application action to be executed, producing an application action result; and
displaying a visual indication of the application action result inside the dynamic button user interface element.

Example 9

The method of Example 8, further comprising, in response to detection of selection of the dynamic button by the user via the graphical user interface, causing a ripple effect animation to appear prior to the displaying of the visual indication, the ripple effect animation including one or more concentric circles expanding outwards from a selection area of the dynamic button until fading.

Example 10

The method of Examples 8 or 9, further comprising, in response to detection of selection of the dynamic button by the user via the graphical user interface, causing a looping animation around the dynamic button user interface element prior to the displaying of the visual indication, the looping animation including a visual element encircling the dynamic button user interface element.

Example 11

The method of Example 10, wherein the looping animation is timed so that the looping animation completes one revolution around the dynamic button user interface element at the time the application action has completely finished executing.

Example 12

The method of Example 10, wherein the looping animation is depicted using a first color if the first of the sub-buttons corresponds to an approval command.

Example 13

The method of any of Examples 8 to 12, wherein the visual indication is a symbol indicating success or failure of the application action.

Example 14

The method of any of Examples 8 to 12, wherein the visual indication is a color of text indicating success or failure of the application action.

Example 15

A non-transitory machine-readable storage medium comprising instructions, which when implemented by one or more machines, cause the one or more machines to perform operations comprising:
 rendering a dynamic button as a dynamic button user interface element in a graphical user interface, the dynamic button corresponding to an application action when selected by a user via the graphical user interface;
 in response to detection of selection of the dynamic button by the user via the graphical user interface:
  causing the application action to be executed, producing an application action result; and
  displaying a visual indication of the application action result inside the dynamic button user interface element.

Example 16

The non-transitory machine-readable storage medium of Example 15, wherein the operations further comprise, in response to detection of selection of the dynamic button by the user via the graphical user interface, causing a ripple effect animation to appear prior to the displaying of the visual indication, the ripple effect animation including one or more concentric circles expanding outwards from a selection area of the dynamic button until fading.

Example 17

The non-transitory machine-readable storage medium of Examples 15 or 16, wherein the operations further comprise, in response to detection of selection of the dynamic button by the user via the graphical user interface, causing a looping animation around the dynamic button user interface element prior to the displaying of the visual indication, the looping animation including a visual element encircling the dynamic button user interface element.

Example 18

The non-transitory machine-readable storage medium of Example 17, wherein the looping animation is timed so that the looping animation completes one revolution around the dynamic button user interface element at the time the application action has completely finished executing.

Example 19

The non-transitory machine-readable storage medium of Example 17, wherein the looping animation is depicted using a first color if the first of the sub-buttons corresponds to an approval command.

Example 20

The non-transitory machine-readable storage medium of any of Examples 15-19, wherein the visual indication is a symbol indicating success or failure of the application action.

Certain embodiments are described herein as including logic or a number of components, modules, or mechanisms. Modules may constitute either software modules (e.g., code embodied on a machine-readable medium) hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-18 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 19:
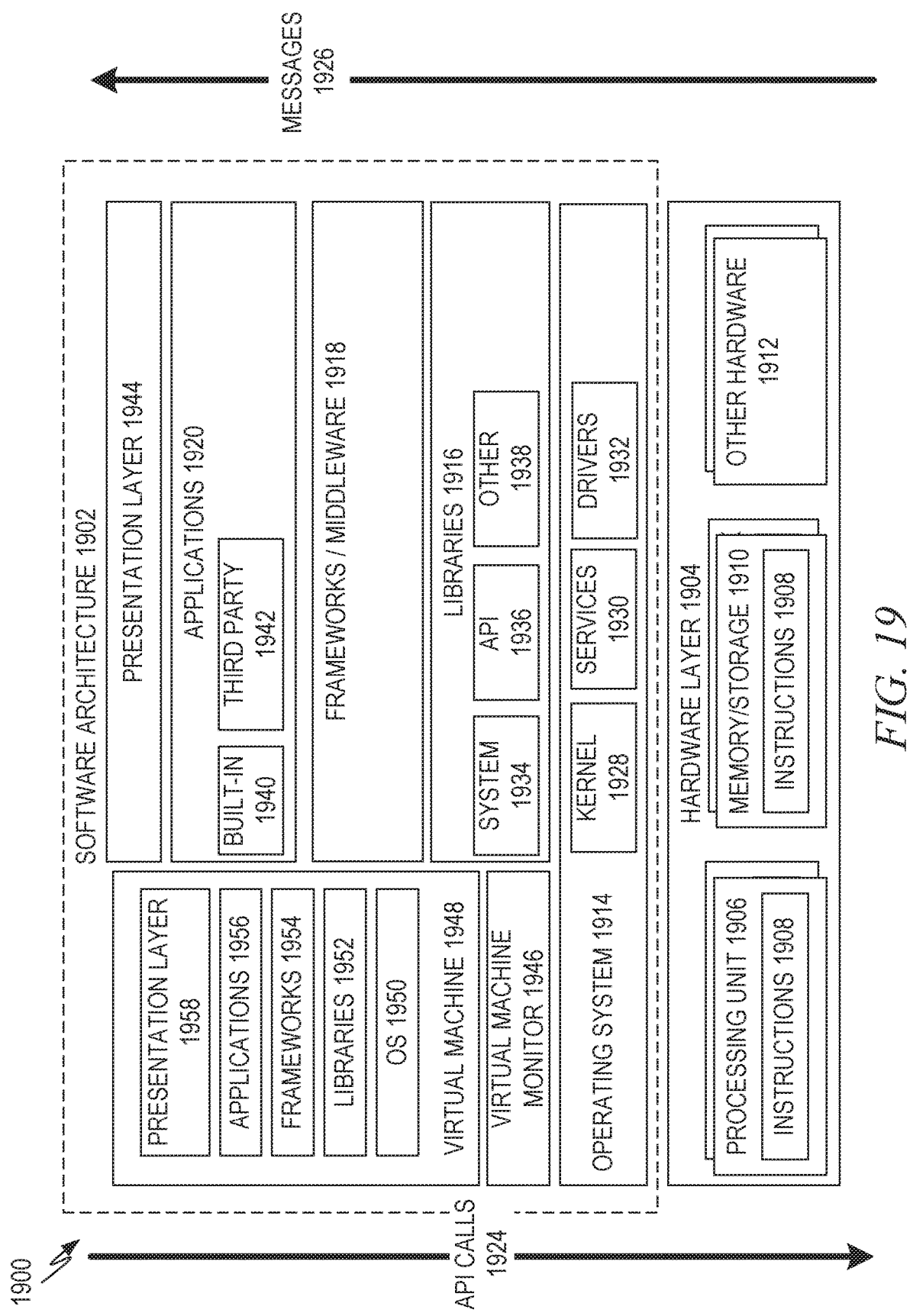
FIG. 19 is a block diagram illustrating a representative software architecture, which may be used in conjunction with various hardware architectures herein described.

FIG. 19 is a block diagram 1900 illustrating a representative software architecture 1902, which may be used in conjunction with various hardware architectures herein described. FIG. 19 is merely a non-limiting example of a software architecture, and it will be appreciated that many other architectures may be implemented to facilitate the functionality described herein. The software architecture 1902 may be executing on hardware such as a machine 2000 of FIG. 20 that includes, among other things, processors 2010, memory/storage 2030, and I/O components 2050. A representative hardware layer 1904 is illustrated and can represent, for example, the machine 2000 of FIG. 20. The representative hardware layer 1904 comprises one or more processing units 1906 having associated executable instructions 1908. The executable instructions 1908 represent the executable instructions of the software architecture 1902, including implementation of the methods, modules, and so forth of FIGS. 1-18. The hardware layer 1904 also includes memory and/or storage modules 1910, which also have the executable instructions 1908. The hardware layer 1904 may also comprise other hardware 1912, which represents any other hardware of the hardware layer 1904, such as the other hardware illustrated as part of the machine 2000.

In the example architecture of FIG. 19, the software architecture 1902 may be conceptualized as a stack of layers where each layer provides particular functionality. For example, the software architecture 1902 may include layers such as an operating system 1914, libraries 1916, frameworks/middleware 1918, applications 1920, and a presentation layer 1944. Operationally, the applications 1920 and/or other components within the layers may invoke API calls 1924 through the software stack and receive responses, returned values, and so forth, illustrated as messages 1926, in response to the API calls 1924. The layers illustrated are representative in nature and not all software architectures have all layers. For example, some mobile or special purpose operating systems may not provide a layer of frameworks/middleware 1918, while others may provide such a layer. Other software architectures may include additional or different layers.

The operating system 1914 may manage hardware resources and provide common services. The operating system 1914 may include, for example, a kernel 1928, services 1930, and drivers 1932. The kernel 1928 may act as an abstraction layer between the hardware and the other software layers. For example, the kernel 1928 may be responsible for memory management, processor management (e.g., scheduling), component management, networking, security settings, and so on. The services 1930 may provide other common services for the other software layers. The drivers 1932 may be responsible for controlling or interfacing with the underlying hardware. For instance, the drivers 1932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1916 may provide a common infrastructure that may be utilized by the applications 1920 and/or other components and/or layers. The libraries 1916 typically provide functionality that allows other software modules to perform tasks in an easier fashion than by interfacing directly with the underlying operating system 1914 functionality (e.g., kernel 1928, services 1930, and/or drivers 1932). The libraries 1916 may include system libraries 1934 (e.g., C standard library) that may provide functions such as memory allocation functions, string manipulation functions, mathematic functions, and the like. In addition, the libraries 1916 may include API libraries 1936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1916 may also include a wide variety of other libraries 1938 to provide many other APIs to the applications 1920 and other software components/modules.

The frameworks 1918 (also sometimes referred to as middleware) may provide a higher-level common infrastructure that may be utilized by the applications 1920 and/or other software components/modules. For example, the frameworks 1918 may provide various graphic user interface (GUI) functions, high-level resource management, high-level location services, and so forth. The frameworks 1918 may provide a broad spectrum of other APIs that may be utilized by the applications 1920 and/or other software components/modules, some of which may be specific to a particular operating system or platform.

The applications 1920 include built-in applications 1940 and/or third-party applications 1942. Examples of representative built-in applications 1940 may include, but are not limited to, a contacts application, a browser application, a book reader application, a location application, a media application, a messaging application, and/or a game application. The third-party applications 1942 may include any of the built-in applications 1940 as well as a broad assortment of other applications. In a specific example, the third-party application 1942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1942 may invoke the API calls 1924 provided by the mobile operating system such as the operating system 1914 to facilitate functionality described herein.

The applications 1920 may utilize built-in operating system 1914 functions (e.g., kernel 1928, services 1930, and/or drivers 1932), libraries 1916 (e.g., system libraries 1934, API libraries 1936, and other libraries 1938), and frameworks/middleware 1918 to create user interfaces to interact with users of the system. Alternatively, or additionally, in some systems, interactions with a user may occur through a presentation layer, such as the presentation layer 1944. In these systems, the application/module "logic" can be separated from the aspects of the application/module that interact with a user.

Some software architectures utilize virtual machines. In the example of FIG. 19, this is illustrated by a virtual machine 1948. A virtual machine creates a software environment where applications/modules can execute as if they were executing on a hardware machine (such as the machine 2000 of FIG. 20, for example). A virtual machine is hosted by a host operating system (e.g., operating system 1914 in FIG. 19) and typically, although not always, has a virtual machine monitor 1946, which manages the operation of the virtual machine 1948 as well as the interface with the host operating system (e.g., operating system 1914). A software architecture executes within the virtual machine 1948, such as an operating system 1950, libraries 1952, frameworks/middleware 1954, applications 1956, and/or a presentation layer 1958. These layers of software architecture executing within the virtual machine 1948 can be the same as corresponding layers previously described or may be different.

Example Machine Architecture and Machine-Readable Medium

Figure 20:
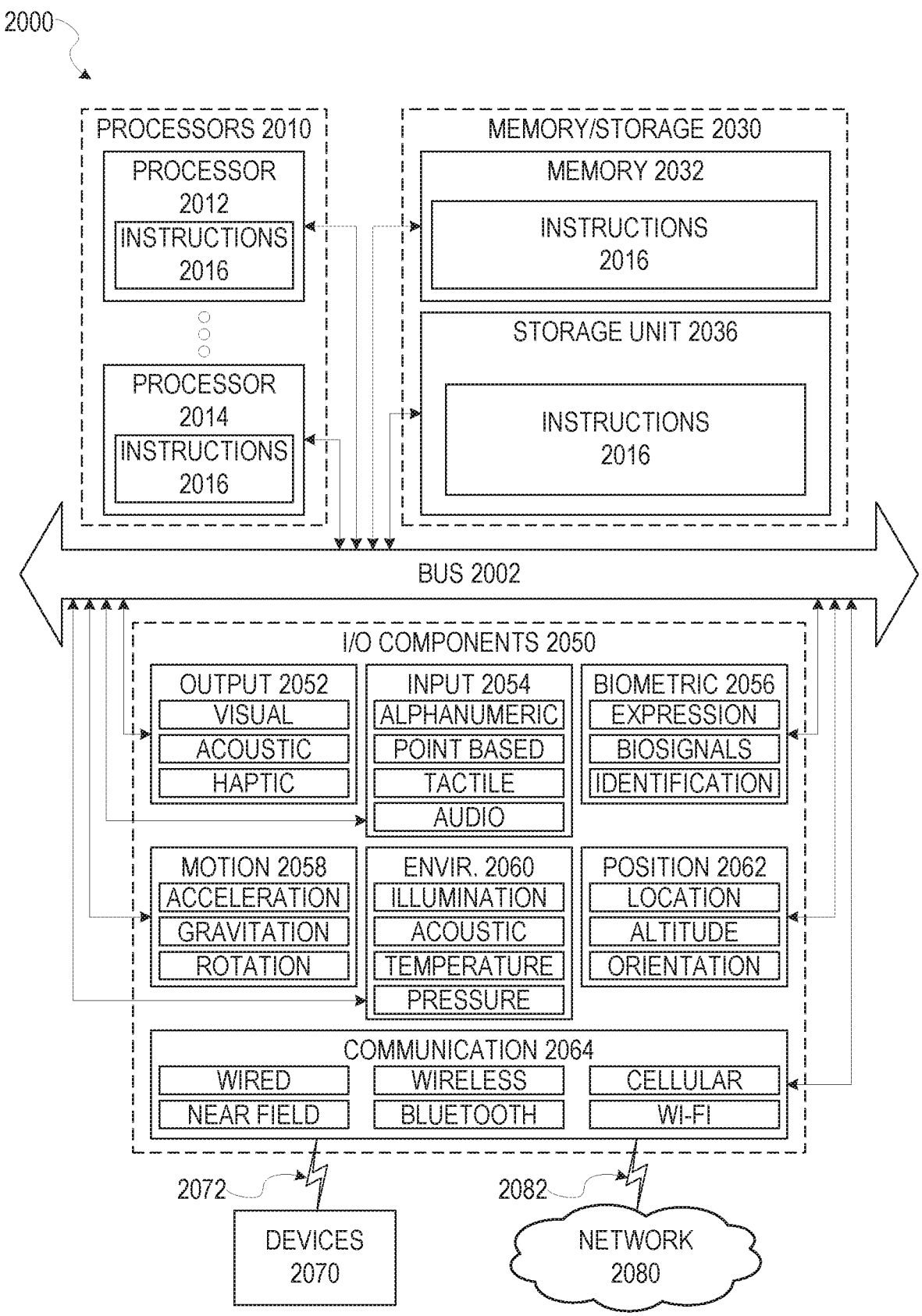
FIG. 20 is a block diagram illustrating components of a machine, according to some example embodiments, able to read instructions from a machine-readable medium (e.g., a machine-readable storage medium) and perform any one or more of the methodologies discussed herein.

FIG. 20 is a block diagram illustrating components of a machine 2000, according to some example embodiments, able to read instructions from a machine-readable medium (e.g., a machine-readable storage medium) and perform any one or more of the methodologies discussed herein. Specifically, FIG. 20 shows a diagrammatic representation of the machine 2000 in the example form of a computer system, within which instructions 2016 (e.g., software, a program, an application, an applet, an app, or other executable code) for causing the machine 2000 to perform any one or more of the methodologies discussed herein may be executed. The instructions 2016 transform the general, non-programmed machine into a particular machine programmed to carry out the described and illustrated functions in the manner described. In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2016, sequentially or otherwise, that specify actions to be taken by the machine 2000. Further, while only a single machine 2000 is illustrated, the term "machine" shall also be taken to include a collection of machines 2000 that individually or jointly execute the instructions 2016 to perform any one or more of the methodologies discussed herein.

The machine 2000 may include processors 2010, memory/storage 2030, and I/O components 2050, which may be configured to communicate with each other such as via a bus 2002. In an example embodiment, the processors 2010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2012 and a processor 2014 that may execute the instructions 2016. The term "processor" is intended to include multi-core processors that may comprise two or more independent processors (sometimes referred to as "cores") that may execute instructions 2016 contemporaneously. Although FIG. 20 shows multiple processors 2010, the machine 2000 may include a single processor with a single core, a single processor with multiple cores (e.g., a multi-core processor), multiple processors with a single core, multiple processors multiples cores, or any combination thereof.

The memory/storage 2030 may include a memory 2032, such as a main memory, or other memory storage, and a storage unit 2036, both accessible to the processors 2010 such as via the bus 2002. The storage unit 2036 and memory 2032 store the instructions 2016 embodying any one or more of the methodologies or functions described herein. The instructions 2016 may also reside, completely or partially, within the memory 2032, within the storage unit 2036, within at least one of the processors 2010 (e.g., within the processor's cache memory), or any suitable combination thereof, during execution thereof by the machine 2000. Accordingly, the memory 2032, the storage unit 2036, and the memory of the processors 2010 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 2016. The term "machine-readable medium" shall also be taken to include any medium, or combination of multiple media, that is capable of storing instructions (e.g., instructions 2016) for execution by a machine (e.g., machine 2000), such that the instructions, when executed by one or more processors of the machine (e.g., processors 2010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2050 may include a wide variety of components to receive input, provide output, produce output, transmit information, exchange information, capture measurements, and so on. The specific I/O components 2050 that are included in a particular machine will depend on the type of machine. For example, portable machines such as mobile phones will likely include a touch input device or other such input mechanisms, while a headless server machine will likely not include such a touch input device. It will be appreciated that the I/O components 2050 may include many other components that are not shown in FIG. 20. The I/O components 2050 are grouped according to functionality merely for simplifying the following discussion and the grouping is in no way limiting. In various example embodiments, the I/O components 2050 may include output components 2052 and input components 2054. The output components 2052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2050 may include biometric components 2056, motion components 2058, environmental components 2060, or position components 2062, among a wide array of other components. For example, the biometric components 2056 may include components to detect expressions (e.g., hand expressions, facial expressions, vocal expressions, body gestures, or eye tracking), measure biosignals (e.g., blood pressure, heart rate, body temperature, perspiration, or brain waves), identify a person voice identification, retinal identification, facial identification, fingerprint identification, or electroencephalogram based identification), and the like. The motion components 2058 may include acceleration sensor components (e.g., accelerometer), gravitation sensor components, rotation sensor components (e.g., gyroscope), and so forth. The environmental components 2060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2050 may include communication components 2064 operable to couple the machine 2000 to a network 2080 or devices 2070 via a coupling 2082 and a coupling 2072, respectively. For example, the communication components 2064 may include a network interface component or other suitable device to interface with the network 2080. In further examples, the communication components 2064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2070 may be another machine or any of a wide variety of peripheral devices (e.g., a peripheral device coupled via a USB).

Moreover, the communication components 2064 may detect identifiers or include components operable to detect identifiers. For example, the communication components 2064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2064, such as location via Internet Protocol (IP) geolocation, location via. Wi-Fi® signal triangulation, location via detecting an NFC beacon signal a may indicate a particular location, and so forth.

Transmission Medium

In various example embodiments, one or more portions of the network 2080 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2080 or a portion of the network 2080 may include a wireless or cellular network and the coupling 2082 may be a Code Division Multiple Access (CDMA) connection, a Global System for Mobile communications (GSM) connection, or another type of cellular or wireless coupling. In this example, the coupling 2082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2016 may be transmitted or received over the network 2080 using a transmission medium via a network interface device (e.g., a network interface component included in the communication components 2064) and utilizing any one of a number of well-known transfer protocols (e.g., HTTP). Similarly, the instructions 2016 may be transmitted or received using a transmission medium via the coupling 2072 (e.g., a peer-to-peer coupling) to the devices 2070. The term "transmission medium" shall be taken to include any intangible medium that is capable of storing, encoding, or carrying the instructions 2016 for execution h the machine 2000, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component tray be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more hardware processors;

a hybrid application comprising:
a device native container;
an adaptation layer;
one or more web applications; and
a framework including a library of controls, the library of controls defining a plurality of different snippets of code available for use by a programmer, each snippet corresponding to a different type of control utilized in a web application, the library of controls including a dynamic button control with a data binding to application data and an event, the data binding causing the event to be generated whenever the application data changes, and wherein the dynamic button control, when placed in a web application by a programmer and executed by the one or more hardware processors in response to one or more actions by a user of the web application, is further configured to perform operations comprising:
rendering a dynamic button as a dynamic button user interface element in a graphical user interface, the dynamic button corresponding to an application action in the application data when selected by a user via the graphical user interface;
in response to detection of selection of the dynamic button by the user via the graphical user interface:
causing the application action to be attempted to be executed, producing an application action result, wherein the application action result is an error preventing the execution of the application action, the error causing a first change in the application data;
firing the event responsive to the first change in the application data; and
updating the dynamic button user interface element with a display of a visual indication of the application action result completely contained inside the dynamic button user interface element.

2. The system of claim 1, wherein the dynamic button control is further configured to, in response to detection of selection of the dynamic button by the user via the graphical user interface, causing a ripple effect animation to appear prior to the displaying of the visual indication, the ripple effect animation including one or more concentric circles expanding outwards from a selection area of the dynamic button until fading.

3. The system of claim 1, wherein the dynamic button control is further configured to, in response to detection of selection of the dynamic button by the user via the graphical user interface, causing a looping animation around the dynamic button user interface element prior to the displaying of the visual indication, the looping animation including a visual element encircling the dynamic button user interface element.

4. The system of claim 3, wherein the looping animation is timed so that the looping animation completes one revolution around the dynamic button user interface element at the time the application action has completely finished executing.

5. The system of claim 3, wherein the looping animation is depicted using a first color if the dynamic button corresponds to an approval command.

6. The system of claim 1, wherein the visual indication is a symbol indicating success or failure of the application action.

7. The system of claim 1, wherein the visual indication is a color of text indicating success or failure of the application action.

8. A method comprising:
causing a dynamic button control, stored in a library of controls defining a plurality of different snippets of code available for use by a programmer, to be placed in a web application, each snippet corresponding to a different type of control utilized in a web application, the dynamic button control including a data binding to application data and an event, the data binding causing the event to be generated whenever the application data changes, and wherein the dynamic button control, when executed in response to one or more actions by a user of the web application, is further configured to perform operations comprising:
rendering of a dynamic button as a dynamic button user interface element in the graphical user interface, the dynamic button corresponding to an application action when selected by a user via the graphical user interface,
in response to detection of selection of the dynamic button by the user via the graphical user interface:
causing the application action to be attempted to be executed, producing an application action result in the application data, wherein the application action result includes an error preventing the execution of the application action, the error causing a first change in the application data,
firing the event responsive to the first change in the application data, and
updating the dynamic button user interface element with a display of a visual indication of the application action result completely contained inside the dynamic button user interface element;
receiving an indication from the web application that the application action result has been attempted to be executed; and
in response to the receiving of the indication, returning an application action result including the error preventing the execution of the application action to the web application.

9. The method of claim 8, further comprising, in response to detection of selection of the dynamic button by the user via the graphical user interface, causing a ripple effect animation to appear prior to the displaying of the visual indication, the ripple effect animation including one or more concentric circles expanding outwards from a selection area of the dynamic button until fading.

10. The method of claim 8, further comprising, in response to detection of selection of the dynamic button by the user via the graphical user interface, causing a looping animation around the dynamic button user interface element prior to the displaying of the visual indication, the looping animation including a visual element encircling the dynamic button user interface element.

11. The method of claim 10, wherein the looping animation is timed so that the looping animation completes one revolution around the dynamic button user interface element at the time the application action has completely finished executing.

12. The method of claim 10, wherein the looping animation is depicted using a first color if the dynamic button corresponds to an approval command.

13. The method of claim 8, wherein the visual indication is a symbol indicating success or failure of the application action.

14. The method of claim 8, wherein the visual indication is a color of text indicating success or failure of the application action.

15. A non-transitory machine-readable storage medium comprising instructions, which when implemented by one or more machines, cause the one or more machines to perform operations comprising:

executing a dynamic button control stored in a library of controls defining a plurality of different snippets of code available for use by a programmer, each snippet corresponding to a different type of control utilized in a web application, the dynamic button control including a data binding to application data and an event, the data binding causing the event to be generated whenever the application data changes, and wherein the dynamic button control, when placed in a web application by a programmer and executed by the one or more hardware processors in response to one or more actions by a user of the web application, is further configured to perform operations comprising:

rendering of a dynamic button as a dynamic button user interface element in the graphical user interface, the dynamic button corresponding to an application action when selected by a user via the graphical user interface;

in response to detection of selection of the dynamic button by the user via the graphical user interface:

causing the application action to be attempted to be executed, producing an application action result in the application data, wherein the application action result includes an error preventing the execution of the application action, the error causing a first change in the application data;

firing the event responsive to the first change in the application data; and updating the dynamic button user interface element with a display of a visual indication of the application action result completely contained inside the dynamic button user interface element.

16. The non-transitory machine-readable storage medium of claim 15, wherein the operations further comprise, in response to detection of selection of the dynamic button by the user via the graphical user interface, causing a ripple effect animation to appear prior to the displaying of the visual indication, the ripple effect animation including one or more concentric circles expanding outwards from a selection area of the dynamic button until fading.

17. The non-transitory machine-readable storage medium of claim 15, wherein the operations further comprise, in response to detection of selection of the dynamic button by the user via the graphical user interface, causing a looping animation around the dynamic button user interface element prior to the displaying of the visual indication, the looping animation including a visual element encircling the dynamic button user interface element.

18. The non-transitory machine-readable storage medium of claim 17, wherein the looping animation is timed so that the looping animation completes one revolution around the dynamic button user interface element at the time the application action has completely finished executing.

19. The non-transitory machine-readable storage medium of claim 17, wherein the looping animation is depicted using a first color if the dynamic button corresponds to an approval command.

20. The non-transitory machine-readable storage medium of claim 15, wherein the visual indication is a symbol indicating success or failure of the application action.

* * * * *